United States Patent
Kim et al.

(10) Patent No.: US 9,804,635 B2
(45) Date of Patent: Oct. 31, 2017

(54) ELECTRONIC DEVICE AND METHOD FOR CONTROLLING DISPLAYS

(71) Applicant: Samsung Electronics Co., Ltd., Suwon-si, Gyeonggi-do (KR)

(72) Inventors: Seong Eun Kim, Hwaseong-si (KR); Seon Il Kim, Gwacheon-si (KR); Young Hoon Kim, Suwon-si (KR); Jung Han Kim, Suwon-si (KR); Ju Nyun Kim, Yongin-si (KR); Jung Sik Park, Suwon-si (KR); Do Hun Cha, Yongin-si (KR); Seung Ki Choi, Hwaseong-si (KR); Soo Hyung Kim, Hwaseong-si (KR); Chang Wan Lee, Seoul (KR); Myung Gon Hong, Seongnam-si (KR); Hyun Ju Hong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

(21) Appl. No.: 14/614,883

(22) Filed: Feb. 5, 2015

(65) Prior Publication Data
US 2015/0220299 A1    Aug. 6, 2015

(30) Foreign Application Priority Data

Feb. 6, 2014  (KR) .................. 10-2014-0013875
May 13, 2014  (KR) .................. 10-2014-0056983

(51) Int. Cl.
*G06F 3/14*     (2006.01)
*G06F 1/16*     (2006.01)
(Continued)

(52) U.S. Cl.
CPC .......... *G06F 1/1605* (2013.01); *G06F 1/1626* (2013.01); *G06F 1/1632* (2013.01);
(Continued)

(58) Field of Classification Search
CPC combination set(s) only.
See application file for complete search history.

(56) References Cited

U.S. PATENT DOCUMENTS 7,205,959 B2    4/2007  Henriksson
8,614,683 B2   12/2013  Ng et al.
(Continued)

FOREIGN PATENT DOCUMENTS

EP    2129084 A1    2/2009
EP    2296355 A2    3/2011
(Continued)

OTHER PUBLICATIONS

DigInfo TV: "1mm thick piezo film speaker from Kyocera used in LG's curved-screen OLED TV #DigInfo", Sep. 1, 2013 (Sep. 1, 2013), XP054975984, Retrieved from the Internet: URL:https://www.youtube.com/watch?v=K2NG0eNabhQ.

*Primary Examiner* — Van Chow
(74) *Attorney, Agent, or Firm* — Jefferson IP Law, LLP

(57) ABSTRACT

An electronic device and a method for controlling displaying of information in the electronic device are provided. The electronic device includes a first display formed on at least a portion of a body of the electronic device, and a second display formed on at least a portion of a cover functionally connected to the body and including a transparent display area.

19 Claims, 44 Drawing Sheets

(51) Int. Cl.
*G09G 5/14* (2006.01)
*G06F 3/0488* (2013.01)
*G06F 1/32* (2006.01)
*G06F 3/01* (2006.01)

(52) U.S. Cl.
CPC .......... *G06F 1/1635* (2013.01); *G06F 1/1641* (2013.01); *G06F 1/1643* (2013.01); *G06F 1/1647* (2013.01); *G06F 1/1688* (2013.01); *G06F 1/1694* (2013.01); *G06F 1/3265* (2013.01); *G06F 3/013* (2013.01); *G06F 3/017* (2013.01); *G06F 3/0488* (2013.01); *G06F 3/1438* (2013.01); *G06F 3/1446* (2013.01); *G09G 5/14* (2013.01); *G06F 2200/1634* (2013.01); *G06F 2203/04101* (2013.01); *G09G 2300/023* (2013.01); *G09G 2354/00* (2013.01); *G09G 2360/04* (2013.01); *G09G 2370/20* (2013.01); *Y02B 60/1242* (2013.01)

(56) References Cited

U.S. PATENT DOCUMENTS

| | | | |
|---|---|---|---|
| 8,624,797 B2 | 1/2014 | Lee et al. | |
| 8,675,019 B1* | 3/2014 | Feinstein | G09G 5/026 345/589 |
| 2005/0052341 A1 | 3/2005 | Henriksson | |
| 2007/0134645 A1 | 6/2007 | Henriksson | |
| 2008/0129647 A1 | 6/2008 | Canova | |
| 2009/0295731 A1* | 12/2009 | Kim | G06F 1/1616 345/168 |
| 2010/0328223 A1 | 12/2010 | Mockarram-Dorri et al. | |
| 2011/0039603 A1* | 2/2011 | Kim | G06F 1/1632 455/566 |
| 2011/0063325 A1* | 3/2011 | Saunders | G09G 5/00 345/639 |
| 2011/0065474 A1* | 3/2011 | Won | H02J 7/355 455/556.1 |
| 2011/0084893 A1* | 4/2011 | Lee | G06F 1/1649 345/6 |
| 2012/0026290 A1* | 2/2012 | Lim | H04N 13/0239 348/46 |
| 2012/0032972 A1* | 2/2012 | Hwang | G06F 3/0488 345/592 |
| 2013/0148002 A1 | 6/2013 | Kim et al. | |
| 2013/0314338 A1 | 11/2013 | Nam et al. | |
| 2015/0324162 A1* | 11/2015 | Kim | G06F 3/1438 345/169 |
| 2015/0338888 A1* | 11/2015 | Kim | G06F 1/1677 345/156 |

FOREIGN PATENT DOCUMENTS

| | | |
|---|---|---|
| EP | 2309768 A | 4/2011 |
| EP | 2 426 597 A1 | 3/2012 |
| EP | 2605508 A2 | 6/2013 |
| EP | 2 626 852 A2 | 8/2013 |
| EP | 2 693 331 A2 | 2/2014 |
| KR | 10-2011-0049542 A | 5/2011 |
| KR | 10-2012-0032659 A | 4/2012 |
| KR | 10-1188978 B1 | 10/2012 |
| KR | 20-0470477 Y1 | 12/2013 |

* cited by examiner

ELECTRONIC DEVICE AND METHOD FOR CONTROLLING DISPLAYS

CROSS-REFERENCE TO RELATED APPLICATION(S)

This application claims the benefit under 35 U.S.C. §119(a) of a Korean patent application filed on Feb. 6, 2014 in the Korean Intellectual Property Office and assigned Serial number 10-2014-0013875, and a Korean patent application filed on May 13, 2014 in the Korean Intellectual Property Office, and assigned Serial number 10-2014-0056983, the entire disclosure of each of which is hereby incorporated by reference.

TECHNICAL FIELD

The present disclosure relates to an electronic device and a method for controlling displaying of information in the electronic device. More particularly, the present disclosure relates to an electronic device and a method for forming a transparent display area on at least one display among a plurality of displays and performing a control to allow at least part of information to be displayed on another display to be shown or hidden by using the transparent display.

BACKGROUND

With the development of information and communication industry, electronic devices are vital in delivering a variety of information to users. Electronic devices may output a variety of information through a display. Furthermore, electronic devices may provide a graphical user interface (GUI) by using a display for user convenience. In order to provide more information to a user, an electronic device may include a plurality of displays. Such an electronic device may provide a user interface with improved user convenience, for example, a user interface for executing a plurality of different applications through a plurality of displays.

According to methods of the related art, when a plurality of displays functionally connected to an electronic device overlap each other, in some cases, information displayed on a specific display may be hidden by another display. Therefore, information may not be delivered accurately. Furthermore, as information displayed on a specific display is hidden by another display, unseen information may be displayed to a user. As a result, power consumption may be wasted unnecessarily.

Therefore, a need exists for an electronic device and a method for forming a transparent display area on at least one display among a plurality of displays and performing a control to allow at least part of information to be displayed on another display to be shown or hidden by using the transparent display.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for forming a transparent display area on at least one display among a plurality of displays and performing a control to allow at least part of information to be displayed on another display to be shown or hidden by using the transparent display.

Another aspect of the present disclosure is to provide a method and an electronic device with a user interface for selectively overlapping and displaying at least part of information to deliver more a variety of information and improve user convenience by using the fact that it is possible to display a plurality of displays to overlap each other.

In accordance with an aspect of the present disclosure, an electronic device for controlling a plurality of displays is provided. The electronic device includes a first display configured to display information and a second display of which position is changeable with respect to the first display. The second display may include a transparent display area of which visibility for at least part of the information is adjusted.

In accordance with another aspect of the present disclosure, an electronic device for controlling a plurality of displays is provided. The electronic device includes a first display formed on at least a portion of the body of the electronic device and a second display formed on at least a portion of a cover functionally connected to the body and including a transparent display area.

In accordance with another aspect of the present disclosure, a display device is provided. The display device includes a cover part detachable from an electronic device and covering at least a partial area of the outer surface of the electronic device and a display formed in at least a partial area of the cover part to include a transparent display area.

In accordance with another aspect of the present disclosure, a method for controlling displaying of information in an electronic device is provided. The method includes displaying first information through a first display functionally connected to the electronic device and when at least part of the first information is displayed partially through a transparent display area of a second display functionally connected to the electronic device to change a position for the first display, additionally displaying second information in relation to the at least part of the information through the transparent display area.

In accordance with another aspect of the present disclosure, a method for controlling displaying of information in an electronic device is provided. The method includes displaying first information through a first display functionally connected to the electronic device and when at least part of the first information is displayed partially through a transparent display area of a second display functionally connected to the electronic device to change a position for the first display, automatically changing a setting of at least a partial area corresponding to the transparent display area in the first display based on an input for the transparent display area (for example, a touch input, a key input, or bio information (such as fingerprint, iris, body temperature, heart rate, skin aging index, skin moisture index, electrocardiogram, and the like)).

In accordance with another aspect of the present disclosure, an electronic device for controlling a plurality of displays is provided. The electronic device includes a first display formed on at least a portion of the body of the electronic device and a second display formed on at least a portion of a cover functionally connected to the body and including a transparent display area. A displaying method of the electronic device includes obtaining second information relating to first information transmitted through the transparent display area and seen by using a sensor functionally connected to the electronic device and displaying the second information through the transparent display area.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
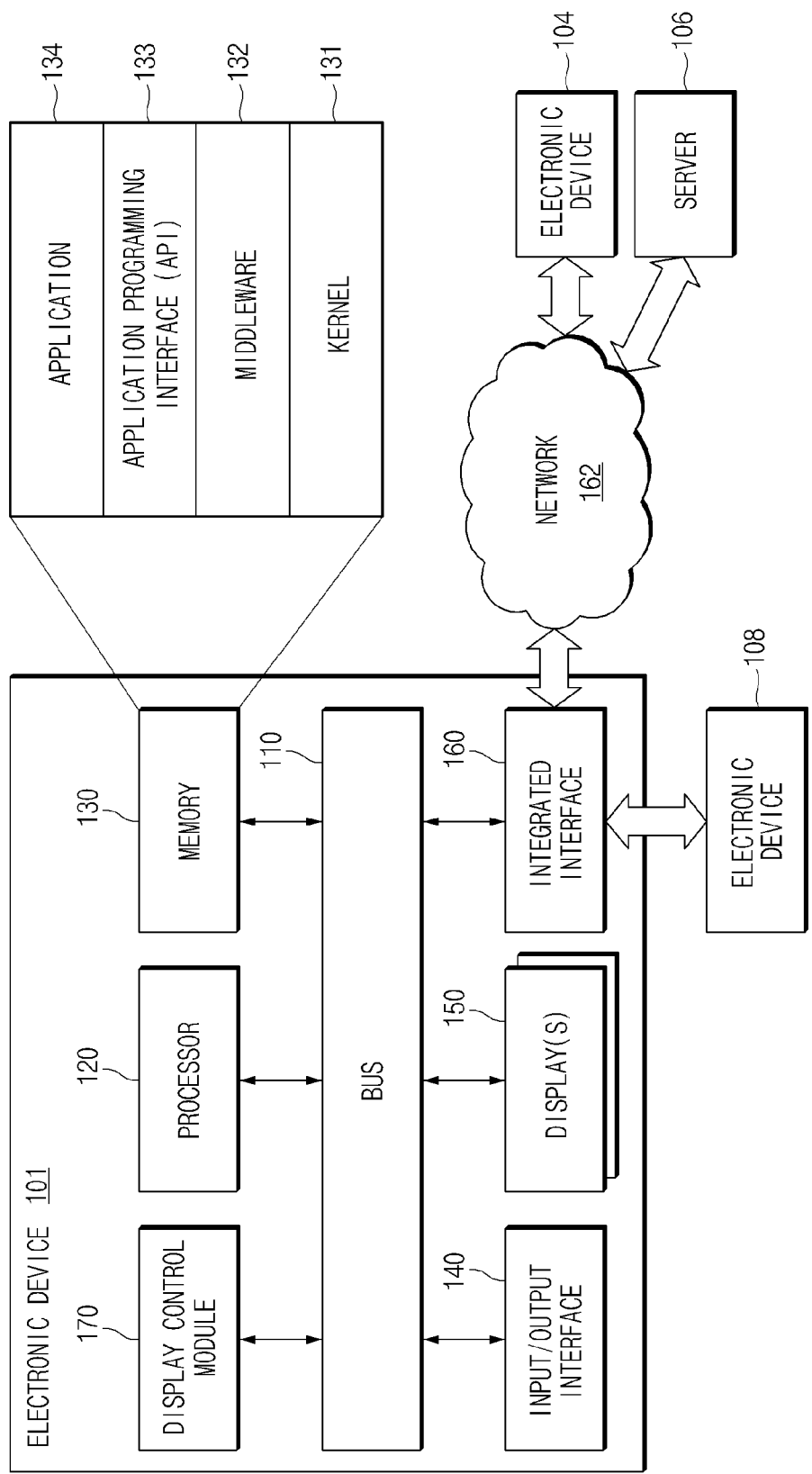
FIG. 1A is a view illustrating a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The terms "include," "comprise," and "have", or "may include," or "may comprise" and "may have" used herein indicate disclosed functions, operations, or existence of elements but does not exclude other functions, operations or elements. Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

The meaning of the term "or" used herein includes any or all combinations of the words connected by the term "or". For instance, the expression "A or B" may indicate include A, B, or both A and B.

The terms such as "1st", "2nd", "first", "second", and the like used herein may refer to modifying various different elements of various embodiments, but do not limit the elements. For instance, such terms do not limit the order and/or priority of the elements. Furthermore, such terms may be used to distinguish one element from another element. For instance, both "a first user device" and "a second user device" indicate a user device but indicate different user devices from each other. For example, a first component may be referred to as a second component and vice versa without departing from the scope of the inventive concept.

In this disclosure below, when one part (or element, device, and the like) is referred to as being 'connected' to another part (or element, device, and the like), it should be understood that the former can be 'directly connected' to the latter, or 'electrically connected' to the latter via an intervening part (or element, device, and the like). In contrast, when an element is referred to as being "directly connected" or "directly coupled" to another element, there are no intervening elements present.

Terms used in this specification are used to describe specific embodiments, and are not intended to limit the scope of the present disclosure.

Unless otherwise defined herein, all the terms used herein, which include technical or scientific terms, may have the same meaning that is generally understood by a person skilled in the art. It will be further understood that terms, which are defined in the dictionary and in commonly used, should also be interpreted as is customary in the relevant related art and not in an idealized or overly formal sense unless expressly so defined herein in various embodiments of the present disclosure.

An electronic device according to various embodiments of the present disclosure may have a communication function. For instance, electronic devices may include at least one of smartphones, tablet personal computers (PCs), mobile phones, video phones, electronic book (e-book) readers, desktop PCs, laptop PCs, netbook computers, personal digital assistants (PDAs), portable multimedia player (PMPs), Motion Pictures Expert Group (MPEG-1 or MPEG-2) Audio Layer 3 (MP3) players, mobile medical devices, cameras, and wearable devices (e.g., head-mounted-devices (HMDs), such as electronic glasses, electronic apparel, electronic bracelets, electronic necklaces, electronic accessories, smart watches, and the like).

According to various embodiments of the present disclosure, an electronic device may be smart home appliances having a communication function. The smart home appliances may include at least one of, for example, televisions (TVs), digital video disk (DVD) players, audios, refrigerators, air conditioners, cleaners, ovens, microwave ovens, washing machines, air cleaners, set-top boxes, TV boxes (e.g., Samsung HomeSync™, Apple TV™ or Google TV™), game consoles, electronic dictionaries, electronic keys, camcorders, and electronic picture frames.

According to various embodiments of the present disclosure, an electronic device may include at least one of various medical devices (for example, magnetic resonance angiography (MRA) devices, magnetic resonance imaging (MRI) devices, computed tomography (CT) devices, medical imaging devices, ultrasonic devices, and the like), navigation devices, global positioning system (GPS) receivers, event data recorders (EDRs), flight data recorders (FDRs), vehicle infotainment devices, marine electronic equipment (for example, marine navigation systems, gyro compasses, and the like), avionics, security equipment, and industrial or household robots.

According to an embodiment of the present disclosure, an electronic device may include at least one of furniture or buildings/structures having a communication function, electronic boards, electronic signature receiving devices, projectors, or various measuring instruments (for example, water, electricity, gas, or radio signal measuring instruments). An electronic device according to an embodiment of the present disclosure may be one of the above-mentioned various devices or a combination thereof. Furthermore, it is apparent to those skilled in the art that an electronic device according to an embodiment of the present disclosure is not limited to the above-mentioned devices.

Hereinafter, an electronic device according to various embodiments of the present disclosure will be described with reference to the accompanying drawings. The term "user" in various embodiments may refer to a person using an electronic device or a device using an electronic device (for example, an artificial intelligent electronic device).

FIG. 1A is a view illustrating a network environment including an electronic device according to various embodiments of the present disclosure.

Referring to FIG. 1A, an electronic device 101 may include a bus 110, a processor 120, a memory 130, an input/output interface 140, a display 150, a communication interface 160, and a display control module 170.

The bus 110 may be a circuit connecting the above-mentioned components to each other and delivering a communication signal (for example, a control message) therebetween.

The processor 120, for example, receives an instruction from the above other components (for example, the memory 130, the input/output interface 140, the display 150, the communication interface 160, or the display control module 170) through the bus 110, interprets the received instruction, and performs operations and data processing in response to the interpreted instruction.

The memory 130 may store an instruction or data received from the processor 120 or other components (for example, the input/output interface 140, the display 150, the communication interface 160, or the display control module 170) or an instruction or data generated from the processor 120 or other components. The memory 130, for example, may include programming modules, for example, a kernel 131, a middleware 132, an application programming interface (API) 133, and an application 134. Each of the above-mentioned programming modules may be configured with software, firmware, hardware, or a combination thereof.

The kernel 131 may control or manage system resources (for example, the bus 110, the processor 120, or the memory 130) used for performing operation or functions implemented by the remaining other programming modules, for example, the middleware 132, the API 133, or the application 134. Additionally, the kernel 131 may provide an interface for accessing an individual component of the electronic device 101 from the middleware 132, the API 133, or the application 134 and controlling or managing the individual component.

The middleware 132 may serve as an intermediary role for exchanging data between the API 133 or the application 134 and the kernel 131 through communication. Additionally, in relation to job requests received from the application 134, the middleware 132 may perform a control function (for example, scheduling or load balancing) for the job requests by using a method of assigning a priority for using a system resource (for example, the bus 110, the processor 120, or the memory 130) of the electronic device 101 to at least one application among the applications 120.

The API 133, as an interface through which the application 134 controls a function provided from the kernel 131 or the middleware 132, may include at least one interface or function (for example, an instruction) for file control, window control, image processing, or character control.

According to various embodiments of the present disclosure, the application 134 may include an Short Message Service (SMS)/Multimedia Messaging Service (MMS) application, an e-mail application, a calendar application, an alarm application, a health care application (for example, an application for measuring an exercise amount or blood sugar), or an environmental information application (for example, an application for providing pressure, moisture, or temperature information). Additionally or alternatively, the application 134 may be an application relating to information exchange between the electronic device 101 and an external electronic device (for example, the electronic device 104 or the electronic device 108). The application relating to information exchange, for example, may include a notification relay application for delivering specific information to the external electronic device or a device management application for managing the external electronic device.

For example, the notification relay application may have a function for delivering to an external electronic device (for example, the electronic device 104 or the electronic device 108) notification information occurring from another application (for example, an SMS/MMS application, an e-mail application, a health care application, or an environmental information application) of the electronic device 101. Additionally or alternatively, the notification relay application 134 may receive notification information from an external electronic device (for example, the electronic device 104 or the electronic device 108) and may then provide the received notification information to a user. The device management application, for example, may manage (for example, install, delete, or update) a function (for example, turning on/off an external electronic device itself (or some components) or adjusting the brightness (or resolution) of a display) for at least part of an external electronic device (for example, the electronic device 104 or the electronic device 108) communicating with the electronic device 104, an application operating in the external electronic device, or a service (for example, a call service or a message service) provided from the external electronic device.

According to various embodiments of the present disclosure, the application 134 may include an application specified according to the attribute (for example, a type of an electronic device) of the external electronic device (for example, the electronic device 104 or the electronic device 108). For example, when an external electronic device is an MP3 player, the application 134 may include an application relating to music playback. Similarly, when an external electronic device is a mobile medical device, the application 134 may include an application relating to heath care. According to an embodiment of the present disclosure, the application 134 may include at least one of an application specified to the electronic device 101 or an application received from an external electronic device (for example, a server 106 or the electronic device 104).

The input/output interface 140 may deliver an instruction or data inputted from a user through an input/output device (for example, a sensor, a keyboard, or a touch screen), to the processor 120, the memory 130, the communication interface 160, or the display control module 170 through the bus 110. For example, the input/output interface 140 may provide data on a user's touch inputted through a touch screen to the processor 120. Additionally, the input/output interface 140 may output an instruction or data received from the processor 120, the memory 130, the communication interface 160, or the display control module 170 through the bus 110, through the input/output device (for example, a speaker or a display). For example, the input/output interface 140 may output voice data processed through the processor 120 to a user through a speaker.

The display 150 may display a variety of information (for example, multimedia data or text data) to a user. According to an embodiment, the display 150 may include a plurality of displays. According to an embodiment, a plurality of displays may be set to their relative positions to be changeable, for example. According to an embodiment, at least one among a plurality of displays may include at least one transparent display area or at least one mirror display area.

According to an embodiment, the transparent display area refers to a display area having a characteristic that transmits light while displaying information on a display screen. The transparent display area, for example, allows a user at the front of the transparent display area to recognize an object at the back of the transparent display area visually. According to an embodiment, the transparent display area, for example, may be implemented using a form including a transparent oxide semiconductor layer and also may be implemented to be allowed for transparency adjustment.

According to an embodiment, the mirror display area refers to a display area having a characteristic that reflects light while displaying information on a display screen. The mirror display area, for example, allows a user at the front of the mirror display area to recognize the user himself/herself visually. According to an embodiment, the mirror display area, for example, may be implemented by adjusting the transparency or reflectivity of the transparent display area.

According to an embodiment, the transparent area, for example, may be set to adjust a state (visibility) in which at least part of information displayed on a display other than a display having a transparent display area among a plurality of displays to be shown or hidden.

The communication interface 160 may connect a communication between the electronic device 101 and an external device (for example, the electronic device 104, the electronic device 108, or the server 106). For example, the communication interface 160 may communicate with an external electronic device (for example, the electronic device 104, the electronic device 108, or the server 106) by directly connecting to an external electronic device (for example, the electronic device 108) through wireless communication or wired communication or connecting to an external electronic device (for example, the electronic device 104, the electronic device 108, or the server 106) via a network 162. The wireless communication may include at least one of wireless fidelity (WiFi), Bluetooth (BT), near field communication (NFC), GPS, or cellular communication (for example, Long Term Evolution (LTE), Long Term Evolution-Advanced (LTE-A), Code Division Multiple Access (CDMA), Wideband Code Division Multiple Access (WCDMA), Universal Mobile Telecommunications System (UMTS), Wireless Broadband (WiBro), or Global System for Mobile Communications (GSM)). The wired communication may include at least one of universal serial bus (USB), high definition multimedia interface (HDMI), recommended standard 232 (RS-232), or plain old telephone service (POTS), for example.

According to an embodiment of the present disclosure, the network 162 may be telecommunications network. The telecommunications network may include at least one of computer network, internet, internet of things, or telephone network. According to an embodiment of the present disclosure, a protocol (for example, transport layer protocol, data link layer protocol, or physical layer protocol) for communication between the electronic device 101 and an external device may be supported by at least one of the application 134, the API 133, the middleware 132, the kernel 131, or the communication interface 160.

The display control module 170 may process at least part of information obtained from other components (for example, the processor 120, the memory 130, the input/output interface 140, or the communication interface 160) and may perform a control function on other components (for example, display(s) 150) to provide the processed information to a user through various methods. For example, the display control module 170 may generate information to be displayed through the display 150 and may then determine the position of the generated information by using the processor 120 or being separated from the processor 120. For example, when the display 150 includes a plurality of displays, the display control module 170 may display information on at least one of a plurality of displays.

According to an embodiment, at least part of the display control module 170, for example, may be a graphic processor. According to an embodiment, at least part of the display control module 170 may be included as part performed by the processor 120. Additional information on the display control module 170 is provided through FIGS. 1B and 1C.

Figure 1B:
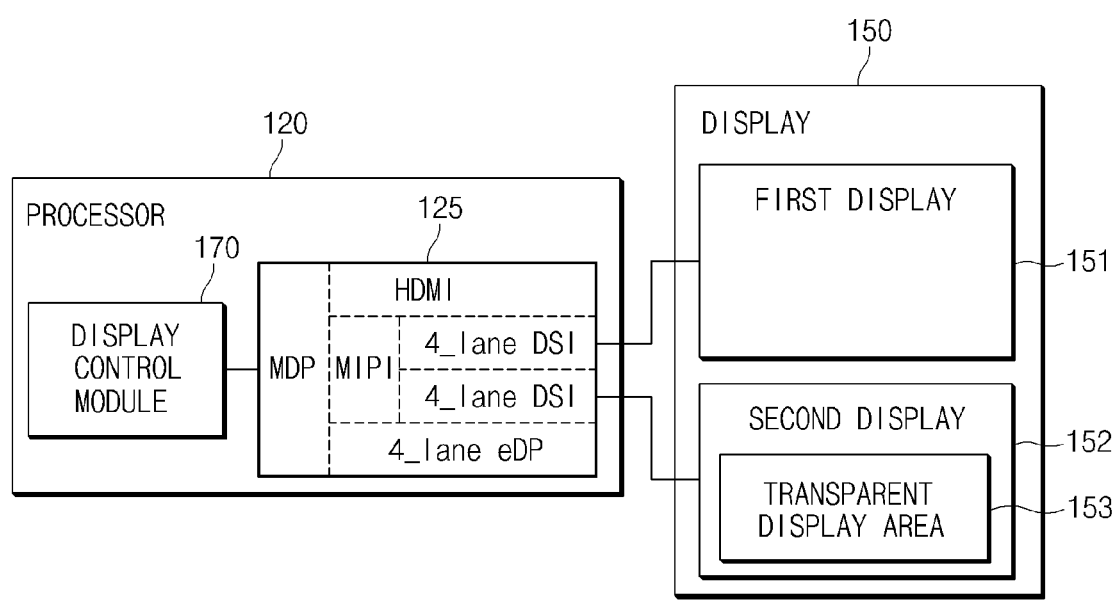
FIG. 1B is a view illustrating a hardware structure for a display module of an electronic device according to various embodiments of the present disclosure.

FIG. 1B is a view illustrating a hardware structure for a display module of an electronic device according to various embodiments of the present disclosure.

Referring to FIG. 1B, the display control module 170 may be included as part of the logic performed by the processor 120. The display 150, for example, may include a first display 151 and a second display 152. The second display 152, for example, may include a transparent display area 153. In addition to the display control module 170, the processor 120 may further include an interface circuit 125 for delivering a control signal, generated from the display control module 170, to external another component (for example, the first display 151 or the second display 152). The display control module 170 may perform a control function on at least one of the first display 151 and the second display 152 to display information on at least one of the first display 151 or the second display 152.

According to an embodiment, the display control module 170 may adjust at least one property of the first display 151 and the second display 152, for example, size, shape, brightness, luminance, color, saturation, sharpness, transparency, gamma, resolution, contrast ratio, viewing angle, color reproducibility, color temperature, tone linearity, permeability, or the contrast. For example, the display control module

170 may adjust the transparency of the transparent display area 153 to the stages of scale 0 to 10. According to an embodiment, according to the relative positions of the first display 151 and the second display 152, when at least a portion of the first display 151 is overlaid with the transparent display area 153, at least part of information displayed on the first display 151 may be seen through the transparent display area 153. The display control module 170 may perform a control function on the second display 152 to display information different from the at least part of the information in addition to or instead of the at least part of the information through the transparent display area 153.

The case that the transparent display area overlaps at least a portion of the first display 151 may include (1) the case that the transparent display area 153 contacts a portion of the first display 151 so that information displayed in the contact area of the first display 151 is transmitted and seen and (2) the case that while the transparent display area 153 is spaced a certain distance or angle from at least a portion of the first display 151, information displayed in a partial area of the first display 151 is transmitted and seen based on the viewing angle of the first display 151 (for example, a cover having a transparent display area is opened about 10% to about 45%).

According to various embodiments of the present disclosure, the display control module 170 may determine information and another information to be displayed on the first display 151 based on at least one of the relative position between the first display 151 and the second display 152, an opened/closed state of a cover for the body of the electronic device 101, information to be displayed on the first display 151, a function or application to be executed through the first display 151, information to be displayed on the second display 152, a function or application to be executed through the second display 152, or a user input. The display control module 170 may perform a control function on the second display 152 to display the other information in addition to or instead of the at least part of the information through the transparent display area 153.

According to various embodiments of the present disclosure, the display control module 170 may determine the other information based on at least one of power status information of the electronic device 101, communication status information between the electronic device 101 and the external electronic device (for example, the electronic device 104 or 108), external environment information of the electronic device 101, and situation recognition information relating to a user. The display control module 170 may perform a control function on the second display 152 to display information different from the at least part of the information in addition to or instead of the at least part of the information through the transparent display area 153.

According to various embodiments of the present disclosure, the display control module 170 may generate a first control signal relating to the first display 151 and/or a second control signal relating to the second display 152. According to an embodiment, the first control signal may include a turn-on/turn-off control signal for the first display 151 and/or first information to be displayed on the first display 151. According to an embodiment, at least part of the first information may include a specific webpage and/or specific function execution screen outputted to the first display 151. Alternatively, at least part of the first information may include a background image of a screen, a list, an icon or item, an object, and/or a preview image, outputted to the first display 151. Alternatively, at least part of the first information may include an image or text outputted to the first display 151 in response to a user's input.

According to an embodiment, the second control signal may include a turn-on/turn-off control signal for at least a portion (for example, the transparent display area 153) of the second display 152 and/or second information to be displayed on the second display 152. According to an embodiment, at least part of the second information may include a specific webpage and/or specific function execution screen outputted to at least a portion (for example, the transparent display area 153) of the second display 152. Alternatively, at least part of the second information may include a background image of a screen, a list, an icon or item, an object, and/or a preview image, outputted to at least a portion (for example, the transparent display area 153) of the second display 152. Alternatively, at least part of the second information may include data for adjusting the transparency of at least a portion of the transparent display area 153.

According to an embodiment, each of the first information and the second information may include data for executing different applications or playing different content in the first display 151 and the transparent display area 153. According to an embodiment, at least part of the second information may include at least one of transparency adjustment data of the transparent display area 153, 3-Dimensional (3D) rendering related data, and/or augmented reality processing data. According to an embodiment, at least part of the second information may include data for setting at least a portion of the transparent display area 153, data relating to at least one object to be displayed on the first display 151 and/or the transparent display area 153, data for displaying an area corresponding to at least one object and/or the remaining area except at least one object to be transparent or opaque, and information adjusting the display property (for example, color, transparency, size, or sharpness) of information (for example, image or content) to be displayed on the first display 151. According to various embodiments, the display control module 170 may perform a control function on the first display 151 and the second display 152 to provide dual content set to display at least part of information through different displays. The dual content may be image content set to display the same image frame at the same time through the first display 151 and the transparent display area 153. Alternatively, the dual content may be content set to display at least part of content through the first display 151 and output another part of the content through the transparent display area 153. Alternatively, the dual content may be content that include a graphic interface object (for example, icon or menu) and a background image and is set to display the background image through the first display 151 and display the graphic interface object through the transparent display area 153. Alternatively, the dual content may be content that include main content and additional content for displaying additional information relating to the main content and is set to display the main content through the first display 151 and display the additional content through the transparent display area 153.

According to various embodiments of the present disclosure, the dual content may include first content designed to match at least one property (for example, size, shape, brightness, luminance, color, saturation, sharpness, transparency, gamma, resolution, contrast ratio, viewing angle, color reproducibility, color temperature, tone linearity, data scanning speed, or contrast) of the first display 151 and second content designed to match at least one property (for example, size, shape, brightness, luminance, color, saturation, sharpness, transparency, gamma, resolution, contrast ratio, viewing angle, color reproducibility, color temperature, tone linearity, data scanning speed, or contrast) of the transparent display area 153. According to an embodiment, the first content and the second content may have the same source or different objects. The first content may include a parameter value set to match the display characteristic (for example, resolution) of the first display 151 and content (for example, image or text) to be displayed on the first display 151. The second content may include a parameter value set to match at least one property (for example, size, shape, brightness, luminance, color, saturation, sharpness, transparency, gamma, resolution, contrast ratio, viewing angle, color reproducibility, color temperature, tone linearity, permeability, contrast, or data scanning speed) of the transparent display area 153 and content (for example, image or text) to be displayed on the transparent display area 153. The parameter value may include a value relating at least one of clarity, sharpness, color, color sense, contrast, luminosity, shading, or saturation of content to be outputted to the first display 151 and/or the transparent display area 153.

Figure 1C:
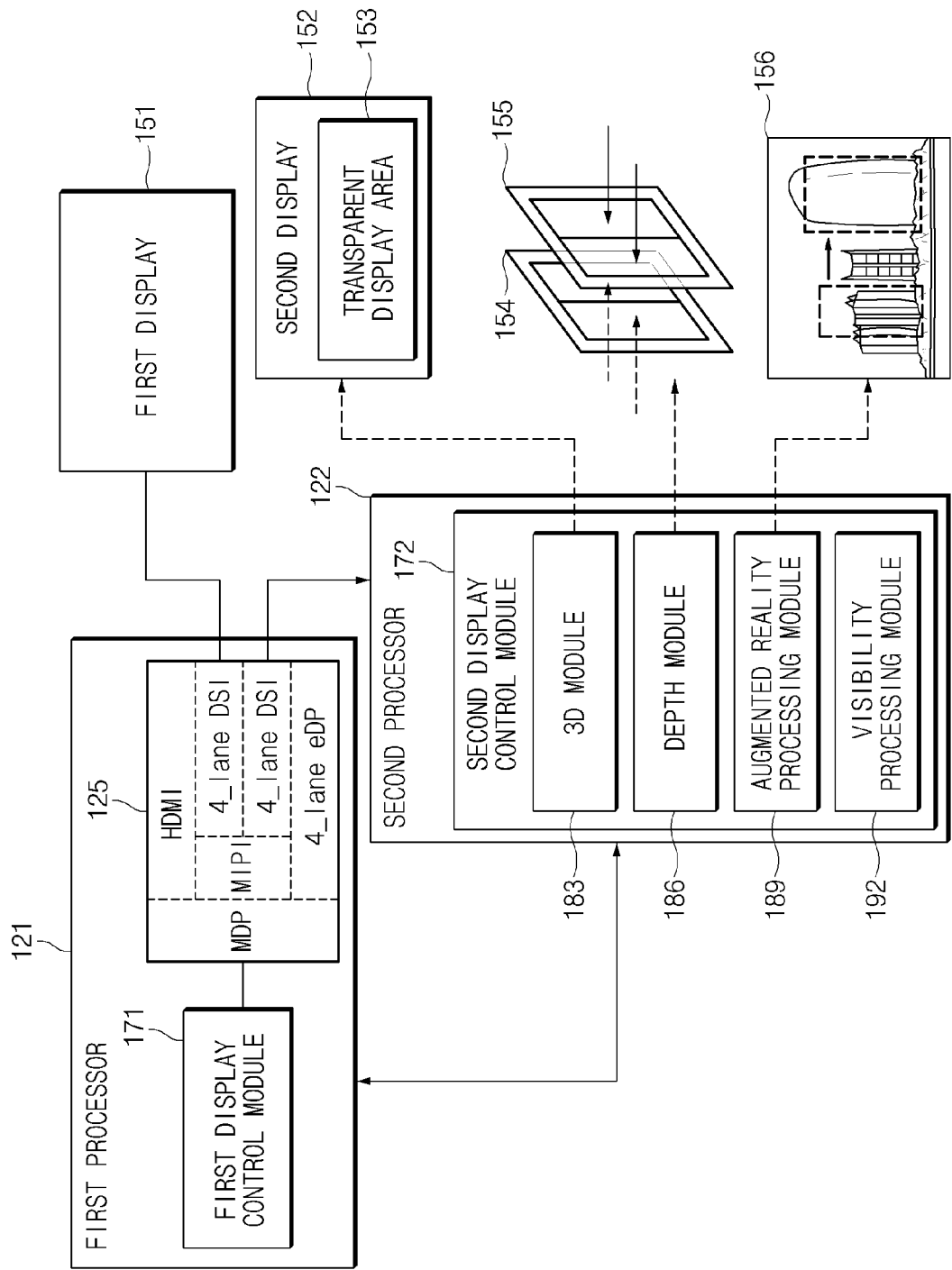
FIG. 1C is a view illustrating a hardware structure for a processor and a display module of an electronic device according to various embodiments of the present disclosure.

FIG. 1C is a view illustrating a hardware structure for a processor and a display control module of an electronic device according to various embodiments of the present disclosure.

Referring to FIG. 1C, the processor (for example, the processor 120) may include a first processor 121 (for example, application processor (AP)) and a second processor 122. The display control module (for example, the display control module 170) may include a first display control module 171 for controlling a first display 151 and a second display control module 172 for controlling a second display 152. The first display control module 171 and the second display control module 172 may be included as parts of the logic performed by the first processor 121 and the second processor 122, respectively. The first display control module 171 may be connected to the second display control module 172 of the second processor 122 through an internal interface circuit 125 of the first processor 121.

According to various embodiments of the present disclosure, the first display control module 171 may control information display through the first display 151 based on (or in response to) at least one of events occurring from the electronic device 101, for example, the relative position between the first display 151 and the second display 152, an opened/closed state of a cover for the body of the electronic device 101, information to be displayed on the first display 151, a function or application to be executed through the first display 151, information to be displayed on the second display 152, a function or application to be executed through the second display 152, or a user input.

According to various embodiments of the present disclosure, like the first display control module 171, the second display control module 172 may control information display through at least a portion (for example, the transparent display area 153) of the second display 152 based on (or in response to) various events occurring from the electronic device 101. According to an embodiment, the second display control module 172 may adjust the transparency of the transparent display area 153 in response to a specific event. According to an embodiment, the second display control module 172 may control a screen change of the transparent display area 153 in response to a specific event. The second display control module 172 may control the transparent display area 153 so that at least a partial area of the transparent display area 153 displays an object (for example, image or text) in an opaque state and the remaining partial area has a transparent state. According to an embodiment, the second display control module 172 may generate an image obtained by capturing a screen outputted to the transparent display area 153 in response to a specific event. The second display control module 172 may be implemented in a chip form (for example, the second processor 122) separated from the first display control module 171 and may then be disposed at one of the body or cover of the electronic device 101.

According to an embodiment, the second display control module 172 may include a 3D module 183, a depth module 186, an augmented reality processing module 189, and/or a visibility processing module 192. According to an embodiment, when at least a portion of an image displayed on the first display 151 is seen through the transparent display area 153, in order to provide the visual effect that a corresponding image is seen in 3D, the 3D module 183 may apply image processing (for example, shift) for 3D effect to the corresponding image to display it in the transparent display area 153. The 3D module 183 may shift a screen outputted to the first display 151 to display it in the transparent display area 153. The 3D module 183 may adjust the resolution of a screen outputted to the first display 151 or the thickness or brightness of a border to display the screen in the transparent display area 153. The image processing for 3D effect applied by the 3D module 183 may include equalization, sharpening, noise reduction, histogram conversion (image quality improvement), face recognition, high frequency cut-off filtering (blurring), high frequency enhancement filtering (sharpening), angle conversion, size conversion, saturation conversion, brightness conversion, or template matching in addition to image shift. Herein, the template matching function may be a function for processing a specific object in an image to be highlighted when an image outputted through the first display 151 and an image outputted through the transparent display area 153 overlap partially with each other.

According to an embodiment, when at least a portion of an image displayed on the first display 151 is seen through the transparent display area 153, in order to provide the visual effect that a corresponding image is seen in 3D, the depth module 186 may apply image processing to a corresponding image to generate images to be displayed on a top surface 154 and a bottom surface 155 of the transparent display area 153 so as to express the depth of the corresponding image. The depth module 186 may adjust the size, shape, color, brightness, contrast, or border processing of a first image to be displayed through the first display 151 according to the display characteristic of the first display 151 so as to generate a second image that gives depth to the first image. According to an embodiment, the second image may be an image obtained by reducing the first image at a certain ratio. The depth module 186 performs a control on the second image obtained by applying image processing to the first image to be outputted through the transparent display area 153, so that the second image is expressed to be seen in 3D to a user by using the first image displayed on the first display 151.

According to an embodiment, when the transparent display area 153 is configured with a multilayer, the depth module 186 may generate a second image and a third image, which are obtained by reducing the first image at different ratios. For example, the transparent display area 153 of a multilayer structure may include at least a first transparent display layer and a second transparent display layer. The first image may be outputted from the first display 151, and then may pass through the transparent display area 153 and be seen. Simultaneously, the second image may be outputted through the first transparent display layer and the third image may be outputted through the second transparent display layer. The second image and the third image together with the first image, as 3D images, may be visually recognized by a user.

According to an embodiment, in order for the perspective recognition of the first image, the depth module 186 may reduce the brightness of a screen outputted to the first display 151, blur the border of the first image, or soften the color. Alternatively, the depth module 186 may deepen the color of the second image or process the border more clearly.

According to an embodiment, the image processing for 3D effect applied by the depth module 186 may include shift, equalization, sharpening, noise reduction, histogram conversion (image quality improvement), face recognition, high frequency cut-off filtering (blurring), high frequency enhancement filtering (sharpening), angle conversion, size conversion, saturation conversion, brightness conversion, or template matching.

According to an embodiment, when it is determined that a user sees an external object or place through the transparent display area 153, the augmented reality processing module 189 may display additional information 156 relating to an object or place within a user's view in the transparent display area 153. The augmented reality processing module 189 may obtain additional information relating to an object or place within a user's view based on context information or user's view or face recognition information obtained using a sensor (for example, a rear camera sensor) functionally connected to an electronic device.

According to an embodiment, the augmented reality processing module 189 transmits a preview image captured using a rear camera sensor to an external server to obtain prediction information relating to an object or place within a user's view or additional information to be displayed in the transparent display area 153, from the external server. The additional information may include information on the position and height of a building, and a store or a restaurant in a building within a user's view. According to an embodiment, in order to reduce internal data processing of the augmented reality processing module 189, the augmented reality processing module 189 may receive information to be displayed in the transparent display area 153 from an external server and may then display the received information as it is in the transparent display area 153 without additional processing. Through such real-time processing, the augmented reality processing module 189 may reduce time delay or information distortion, each occurring during augmented reality processing.

According to an embodiment, the visibility processing module 192 may perform image processing for the visibility improvement of information displayed through the transparent display area 153 and/or information passing through the transparent display area 153 to be seen.

The visibility of the same information outputted through the first display 151 and the transparent display area 153 may vary. In the transparent display area 153, due to the light transmission, the sharpness of information displayed may be lower compared to an opaque display area. According to an embodiment, although information of the same color is inputted through the first display 151 and the transparent display area 153, the color displayed through the transparent display area 153 may be lighter than the color displayed through the first display 151. In relation to this, the visibility processing module 192 may perform image processing of various methods on information to be displayed through the transparent display area 153 based on the transparency characteristic of the transparent display area 153.

Additionally, according to whether information displayed on the first display 151 passes through the transparent display area 153, the visibility of information displayed on the first display 151 may vary. When the information displayed on the first display 151 passes through the transparent display area 253 to be seen, relatively lower sharpness may be provided compared to when the information does not pass through the transparent display area 153 and is delivered directly. According to an embodiment, in the case that a specific color is displayed on the first display 151, when the displayed specific color passes through the transparent display area 153 to be seen, a user may recognize a color lighter than the specific color. In relation to this, the visibility processing module 192 may perform image processing of various methods on information to be displayed through the first display 151 based on the transparency characteristic of the transparent display area 153.

According to an embodiment, the visibility processing module 192 may clearly process the border area of an object, such as an image or text, in a screen to be displayed through the first display 151 and/or the transparent display area 153. The visibility processing module 192 may apply sharpness effect to the border area of an object. According to an embodiment, the visibility processing module 192 may process darker the color or color sense of a screen to be displayed through the first display 151 and/or the transparent display area 153. According to another embodiment, the visibility processing module 192 may process relatively darker color or color sense of a screen to be displayed on the first display 151 compared to a screen displayed through the transparent display area 153. According to another embodiment, the alternative is possible.

According to an embodiment, the visibility processing module 192 may generate second information (for example, a second screen) to be displayed in the transparent display area 153 by applying a specified transparency adjustment value to first information (for example, a first screen) to be displayed on the first display 151. According to an embodiment, the visibility processing module 192 may generate second information (for example, a second screen) to be displayed in the transparent display area 153 by applying a specified contrast adjustment value to first information (for example, a first screen) to be displayed on the first display 151. The contrast adjustment value may be a value (for example, statistical or experimental value) set to have the visibility of more than a certain criterion while the first screen passes through the transparent display area 153 to be seen.

According to an embodiment, when the transparent display area 153 has a multilayer structure including at least a first transparent display panel and a second transparent display panel, the visibility processing module 192 may specify at least one of the first transparent display panel and the second transparent display panel as a panel outputting second information. Alternatively, the visibility processing module 192 may output the second information to the first transparent display panel and the second transparent display panel at the same time.

According to an embodiment, the visibility processing module 192 may determine the output direction of the second information in the transparent display area 153. The visibility processing module 192 may determine the output direction of the second information based on the relative position relationship of the first display 151 and the second display 152. When the first display 151 and the transparent display area 153 are disposed to overlap at least partially with each other, the visibility processing module 192 may output the second information in a horizontal direction. Alternatively, when the first display 151 and the transparent display area 153 are disposed parallel to each other, the visibility processing module 192 may output the second information in a reverse horizontal direction. Alternatively, the visibility processing module 192 may dynamically adjust the output direction of the second information according to an angle between the first display 151 and the second display 152.

According to an embodiment, when the resolution of the first display 151 and the resolution of the transparent display area 153 are different from each other, the visibility processing module 192 may adjust the size of the second information (for example, a second screen) outputted to the transparent display area 153 to match the size of the first information (for example, a first screen) outputted to the first display 151. Additionally, the visibility processing module 192 may perform image processing on the first information and/or the second information in order to allow the color, shading, contrast, or saturation of the second information (for example, a second screen) outputted to the transparent display area 153 to be similar to the color, shading, contrast, or saturation of the second information (for example, a first screen) outputted to the first display 151.

According to an embodiment, the visibility processing module 192 may change the second information being outputted to the transparent display area 153 in response to an event recognized by a motion sensor relating to the second display 152. For example, the visibility processing module 192 may dynamically adjust at least one of the sharpness, luminosity, contrast, or color of the second information (for example, a second screen) being outputted to the transparent display area 153 in response to a bending or hinge operation of the second display 152. Alternatively, the visibility processing module 192 may dynamically adjust the transparency for at least a partial area of the transparent display area 153 in response to a bending or hinge operation of the second display 152.

In the above embodiments, although it is disclosed that the second display control module 172 includes all the 3D module 183, the depth module 186, the augmented reality processing module 189, and the visibility processing module 192, various embodiments are not limited thereto. For example, the second display control module 172 may include at least one of the 3D module 183, the depth module 186, the augmented reality processing module 189, and the visibility processing module 192. Hereinafter, additional information on the electronic device 101 is provided through the drawings described later.

FIGS. 2A, 2B, 2C and 2D are views illustrating electronic devices having a plurality of functionally connected displays according to various embodiments of the present disclosure.

Figure 2A:
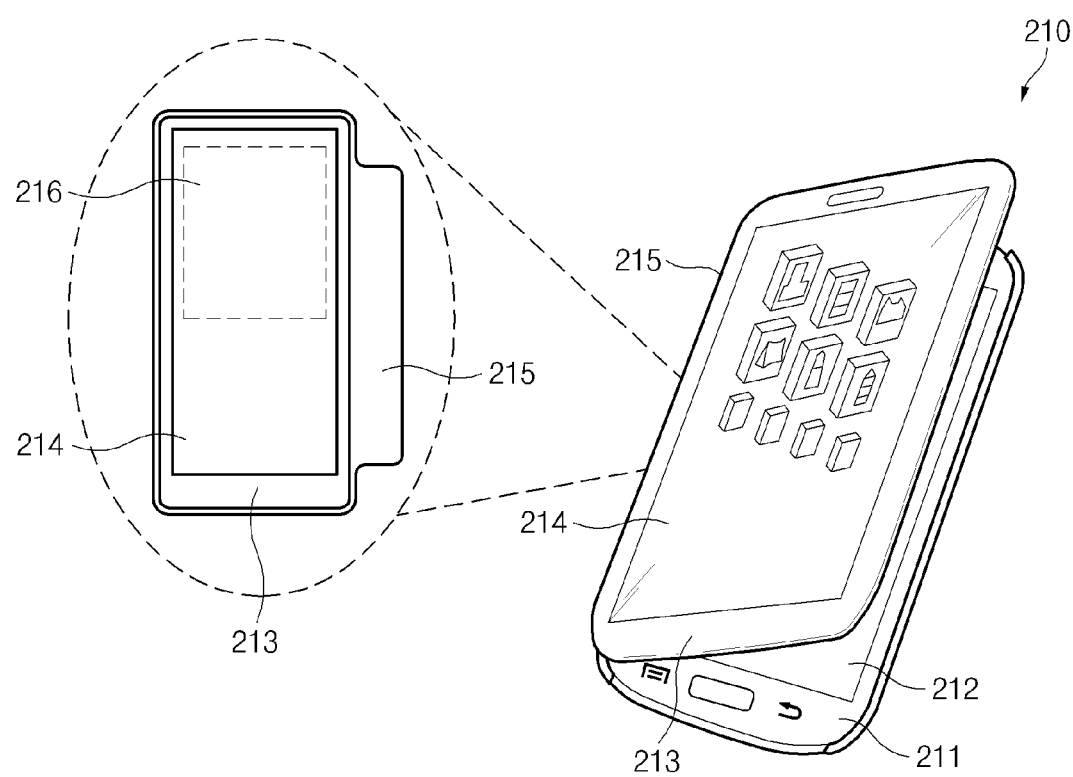
FIG. 2A is a view illustrating a folder type electronic device according to various embodiments of the present disclosure.

FIG. 2A is a view illustrating a folder type electronic device according to various embodiments of the present disclosure.

Referring to FIG. 2A, an electronic device 210 includes a first body part 211, a first display 212, a second body part 213, a second display 214, and a folder connection part 215. According to an embodiment, the first body part 211 may include the first display 212. The first display 212 may be formed on at least a portion of one surface (for example, a front) of the first body part 211. According to an embodiment, the second body part 213 may include the second display 214. The second display 214 may be formed on at least a portion of one surface (for example, a top surface) of the second body part 213.

According to an embodiment, the folder connection part 215 may be coupled to the first body part 211 and the second body part 213. The first body part 211 and the second body part 213 may be connected to each other through the folder connection part 215. According to an embodiment, depending on a relative position relationship between the first body part 211 and the second body part 213, the first display 212 included in the first body part 211 and the second display included in the second body part 213 may be disposed at a position where they overlap partially with each other with respect to a user of the electronic device 210.

According to an embodiment, the folder connection part 214 may be formed of a flexible material. For example, the outer layer and the inner layer of the folder connection part 215 may be formed of at least one of materials, such as leather, artificial leather, wool, carbon fiber reinforced plastics (CFRP), glass fiber reinforced plastics (GFRP), polycarbonate (PC), glass, sapphire, and the like. According to an embodiment, the folder connection part 215 may include a circuit (for example, a flexible printed circuit board (FPCB)) for electrical connection between components (for example, the first display 212) of the first body part 211 and components (for example, the second display 214) of the second body part 213.

According to an embodiment, the folder connection part 215 is coupled to each of the first body part 211 and the second body part 213 through a hinge to allow the first body part 211 and the second body part 213 to be rotatable independently with respect to the folder connection part 215. By the rotation of at least one of the first body part 211 and the second body part 213, a relative position between the first body part 211 and the second body part 213 may be changed. The second display 214 may be disposed to at least partially overlap the first display 212, may be disposed parallel to the first display 212, or may be disposed to have a specific angle with the first display 212. Additionally, as a relative position between the first body part 211 and the second body part 213 changes, the position or size of at least a partially overlapping area between the first display 212 and the second display 214 may be changed with respect to a user of the electronic device 210.

According to an embodiment, the folder connection part 215 may further include a sensor for sensing information relating to hinge coupling with the first body part 211 and/or the second body part 214, for example, whether a hinge is coupled to the first body part 211 and/or the second body part 214 and/or an angle at which the hinge is coupled. The information relating to hinge coupling may be converted into signals relating to a control of the first display 212 and/or the second display by an internal component (for example, the display control module 170) of the electronic device 210. The electronic device 210 may display information through at least a portion of the first display 212 or the second display 214. According to an embodiment, at least a portion of at least one display (for example, the second display 214 formed at the second body part 213) of the first display 212 or the second display 214 may include a transparent display area 216. The transparent display area 216 may be set to allow at least part of information displayed on another display (for example, the first display 212) other than a display having a corresponding transparent display area 216 to pass through the corresponding transparent display area 216 optically to be seen to a user of an electronic device. The information transmitted through the transparent display area 216 and seen may include at least part of information corresponding to a partial overlapping area between the first display 212 and the transparent display area 216 in the information displayed on the first display 212.

According to an embodiment, a cushion member (not shown) may be disposed on at least a portion of the first body part 211 and/or the second body part 213. The cushion member may be formed of an elastic material. When the first display 212 and the transparent display area 216 are disposed to overlap with each other, the cushion member may be disposed on at least a portion of surfaces facing each other between the first display 212 and the transparent display area 216. The cushion member may minimize the impact or damage caused by contact or collision between the first display 212 and the transparent display area 216. Additionally, the cushion member may maximize 3D effect by maintaining a constant interval between the first display 212 and the transparent display area 216.

Figure 2B:
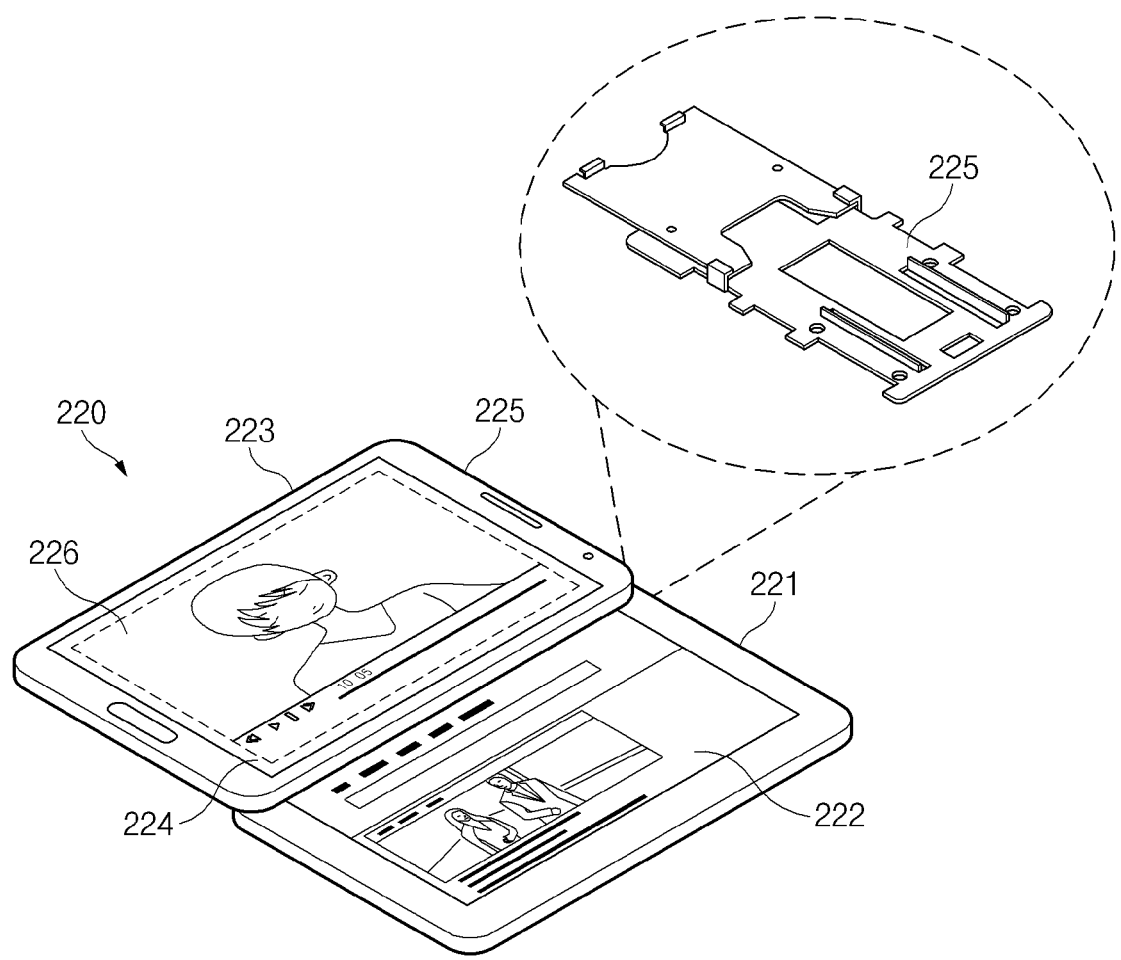
FIG. 2B is a view illustrating a slide type electronic device according to various embodiments of the present disclosure.

FIG. 2B is a view illustrating a slide type electronic device according to various embodiments of the present disclosure.

Referring to FIG. 2B, an electronic device 220 includes a first body part 221, a first display 222, a second body part 223, a second display 224, and a slide connection part 225. The first body part 221, the first display 222, the second body part 223, and the second display 224, which are the components of the electronic device 220, as components corresponding to the first body part 211, the first display 212, the second body part 213, and the second display 214, which are components of the electronic device 210, may have the same or similar structure or may perform the same or similar function.

According to an embodiment, the slide connection part 225 may be coupled to the first body part 221 and the second body part 223. According to an embodiment, the slider connection part 225 may be set to allow the first body part 221 and the second body part 223 to move slidably and separately while the first body part 221 and the second body part 223 are connected to each other. By the sliding movement of at least one of the first body part 221 and the second body part 223, the position or size of an area opened to a user of the electronic device 220 in the first display 222 and the second display 224 may be changed. The electronic device 220 may display information through at least a portion of an area opened to a user of the electronic device 220 in the first display 222 or the second display 224.

According to an embodiment, at least a portion of at least one display (for example, the second display 224) of the first display 222 and the second display 224 may include a transparent display area 226. The transparent display area 226 may be set to allow at least part of information displayed in an area closed to a user of the electronic device 220 in another display (for example, the first display 222) other than a display having a corresponding transparent display area 226 to pass through the corresponding transparent display area 226 optically to be seen to the user of the electronic device 220. The information transmitted through the transparent display area 226 and seen may include at least part of information corresponding to an overlapping area between the first display 222 and the transparent display area 226 in the information displayed on the first display 222.

Figure 2C:
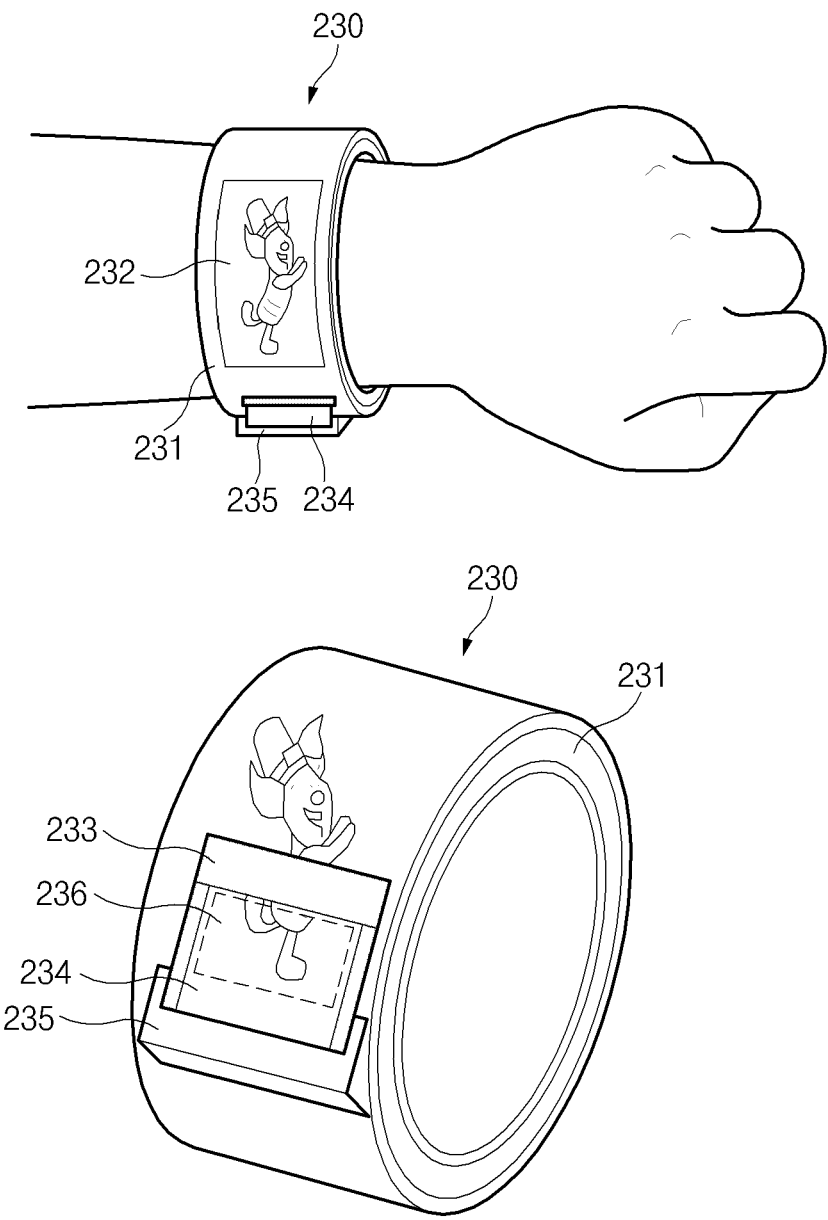
FIG. 2C is a view illustrating a wearable type electronic device according to various embodiments of the present disclosure.

FIG. 2C is a view illustrating a wearable type electronic device according to various embodiments of the present disclosure.

Referring to FIG. 2C, an electronic device 230 includes a first body part 231, a first display 232, a second body part 233, a second display 234, and an opening/closing connection part 235. The first body part 231, the first display 232, the second body part 233, the second display 234, and the opening/closing connection part 235, which are the components of the electronic device 230, as components corresponding to the first body part 211, the first display 212, the second body part 213, the second display 214, and the folder connection part 215, which are components of the electronic device 210, may have the same or similar structure or may perform the same or similar function.

The electronic device 230 may be a device wearable on a user's body. According to an embodiment, the first body part 231 may include a frame wearable on a user's body. Such a frame may be formed with a similar structure to bracelets, bands, or watches wearable on a user's wrist as shown in FIG. 2C. The frame may be formed with a structure of various other devices (for example, glasses, clothes, headsets, or earphones) wearable on a user's body according to the type of an electronic device. For example, in the case of an electronic glasses, a glass part of the electronic glass may correspond to the first display 232, and an additional glass or a (retractable or rollable) flexible display, which is connected to at least one side of the frame of the electronic glasses to change its position to be overlapped above or below the glass part, may correspond to the second display 234. According to an embodiment, such a wearable device may include an auxiliary display (for example, the second display 234) without a main display (for example, the first display 232).

According to an embodiment, the opening/closing connection part 235 may be formed on at least a portion of the first body part 231 and may be detachably coupled to the second body part 233. The opening/closing part 235 may be set to allow the second body part 233 to rotate with respect to the first body part 231 or move slidably in at least one direction of up, down, left, and right while the first body part 231 and the second body part 233 are connected to each other. By the movement of the second body part 233, the position or size of an area opened to a user of the electronic device 230 in the first display 232 and the second display 234 may be changed. The electronic device 230 may display information through at least a portion of an area opened to a user of the electronic device 230 in the first display 232 or the second display 234.

According to an embodiment, at least a portion of at least one display (for example, the second display 234) of the first display 232 and the second display 234 may include a transparent display area 236. The transparent display area 236 may be set to allow at least part of information displayed in an area closed to a user of the electronic device 220 in another display (for example, the first display 232) other than a display having a corresponding transparent display area 236 to pass through the corresponding transparent display area 236 optically to be seen to the user of the electronic device 230. The information transmitted through the transparent display area 236 and seen may be at least part of information corresponding to an overlapping area between the first display 232 and the transparent display area 236 in the information displayed on the first display 232.

Figure 2D:
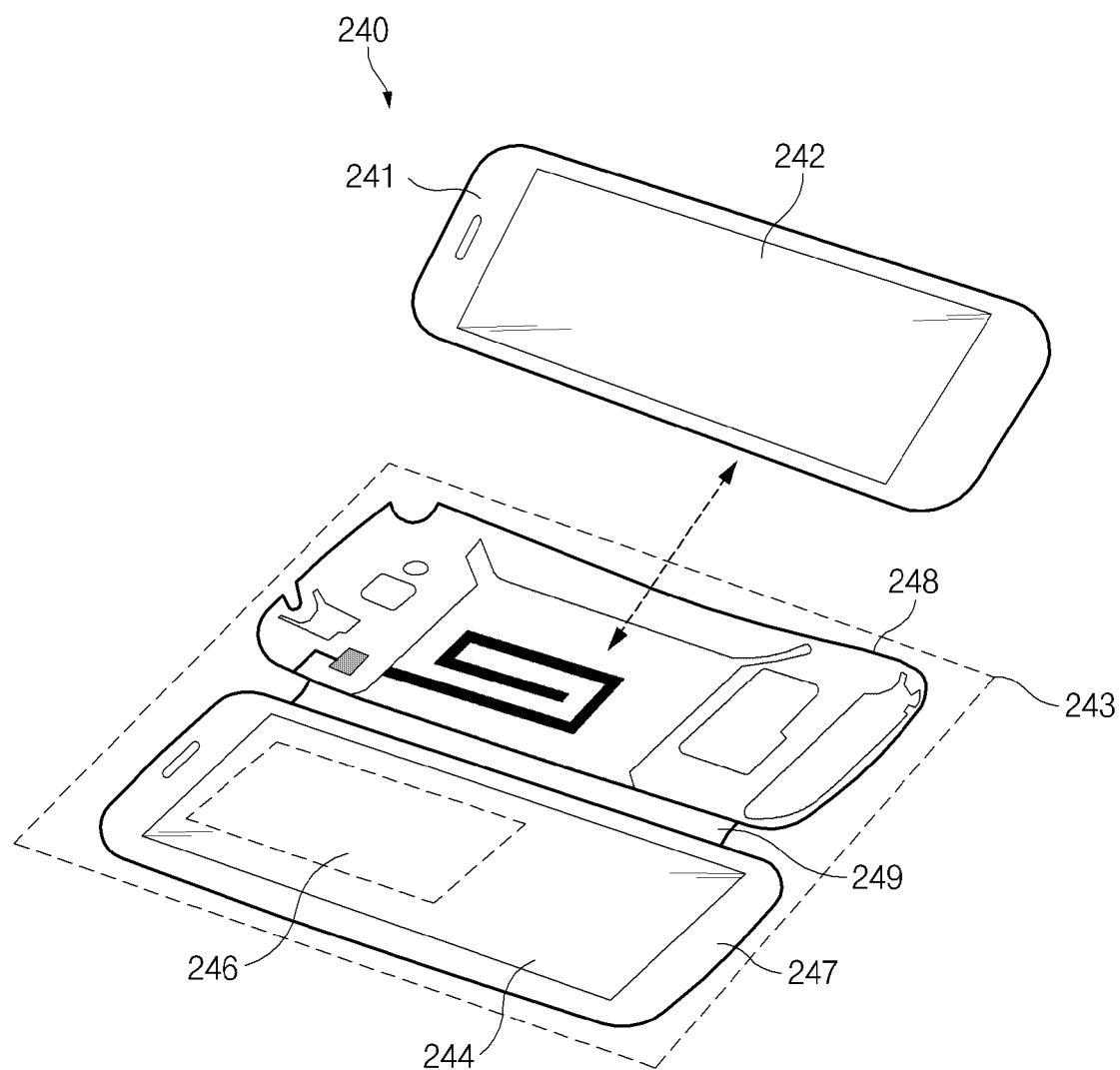
FIG. 2D is a view illustrating a cover detachable type electronic device according to various embodiments of the present disclosure.

FIG. 2D is a view illustrating a cover detachable type electronic device according to various embodiments of the present disclosure.

Referring to FIG. 2D, an electronic device 240 includes a first display 242 formed at one side (for example, front) of the body, a cover 243 detachable from the electronic device 240, and a second display 244 formed at one side of the cover 243. A body part 241, the first display 242, the cover 243, and the second display 244 formed at one side of the cover 243, which are the components of the electronic device 240, as components corresponding to the first body part 211, the first display 212, the second body part 213, and the second display 214, which are components of the electronic device 210, may have the same or similar structure or may perform the same or similar function.

According to an embodiment, the cover 243 may include a frame detachable from the body 241. When the cover 243 is attached to the body 241 through a frame, it may cover at least a portion (for example, the front or back) of the body 241. According to an embodiment, the frame may be detachably coupled to at least a portion of the main body 241 or may be formed to fix at least a portion of the body 241. The frame may be formed on at least a portion of a back cover 248 described later.

According to an embodiment, the cover 243 may include at least one of a front cover 247 for protecting a component (for example, the first display 242) formed at the front of the body 241 and a back cover 248 for protecting a component (for example, a battery) formed at the back of the body 241. According to an embodiment, when the cover 243 includes both the front cover 247 and the back cover 248, it may further include a side cover 249 for connecting the front cover 247 and the back cover 248 and protecting a side (for example, the left side or the right side) of the body 241 from external impact.

According to an embodiment, at least a portion of the side cover 249 may be formed of an elastic material, for example, various materials, such as leather material and/or polyurethane material. According to an embodiment, at least a portion of the side cover 249 may be formed of a rigid material, for example, various materials, such as plastic material and/or metal material. The side cover 249 may be bent at a certain angle unit by a material having a certain rigidity. According to an embodiment, an electronic device may include a sensor for sensing information on a bending state of the side cover 249 at one side thereof, for example, whether the side cover 249 is bent and/or a bent angle.

According to an embodiment, the second display 244 may be formed on at least a portion of one surface (for example, an upper or bottom surface) of the front cover 247. The second display 244, for example, may include a transparent display area 246. When the cover 243 is mounted at the body 241 so that at least a portion of the cover 243 covers the body 241, the transparent display area 246 may be set to allow part of information displayed by the first display 242 to pass through the corresponding transparent display area 246 optically and then be seen to a user of the electronic device 240 visually.

According to an embodiment, the electronic device 240 may further include a third display (not shown). The third display may be formed at another portion of the first cover 247 or at least one portion of a back cover. According to an embodiment, when a third display (not shown) is formed on at least a portion of a back cover, the electronic device 240 may display a specific color, a specific pattern, or a specific image through the third display. According to an embodiment, the electronic device 240 may perform a control function on the third display to operate in a turn-on or turn-off state.

According to various embodiments of the present disclosure, the cover 243 may be formed with the following display layered structure (not shown).

TABLE 1

| Type | Outer input/output device | | | Inner input/output device | | |
|---|---|---|---|---|---|---|
| 1 | e-ink | touch panel | digitizer | color display | touch panel | digitizer |
| 2 | e-ink | — | digitizer | color display | touch panel | digitizer |
| 3 | e-ink | touch panel | — | color display | touch panel | — |
| 4 | e-ink | — | — | color display | touch panel | — |
| 5 | — | — | — | color display | touch panel | digitizer |
| 6 | — | — | — | color display | touch panel | — |
| 7 | e-ink | touch panel | digitizer | — | — | — |
| 8 | e-ink | — | digitizer | — | — | — |

According to an embodiment, the cover 243 may be formed by stacking input/output layers at the outside and the inside. Each of the input/output layers may selectively include a display and a touch input means (for example, a touch panel and a digitizer). According to another embodiment, the cover 243 may be formed by stacking a single input/output layer at one of the outside and the inside. The cover 243 may further include various other components or may be configured by deleting or combining some of the above-mentioned components.

Figure 2E:
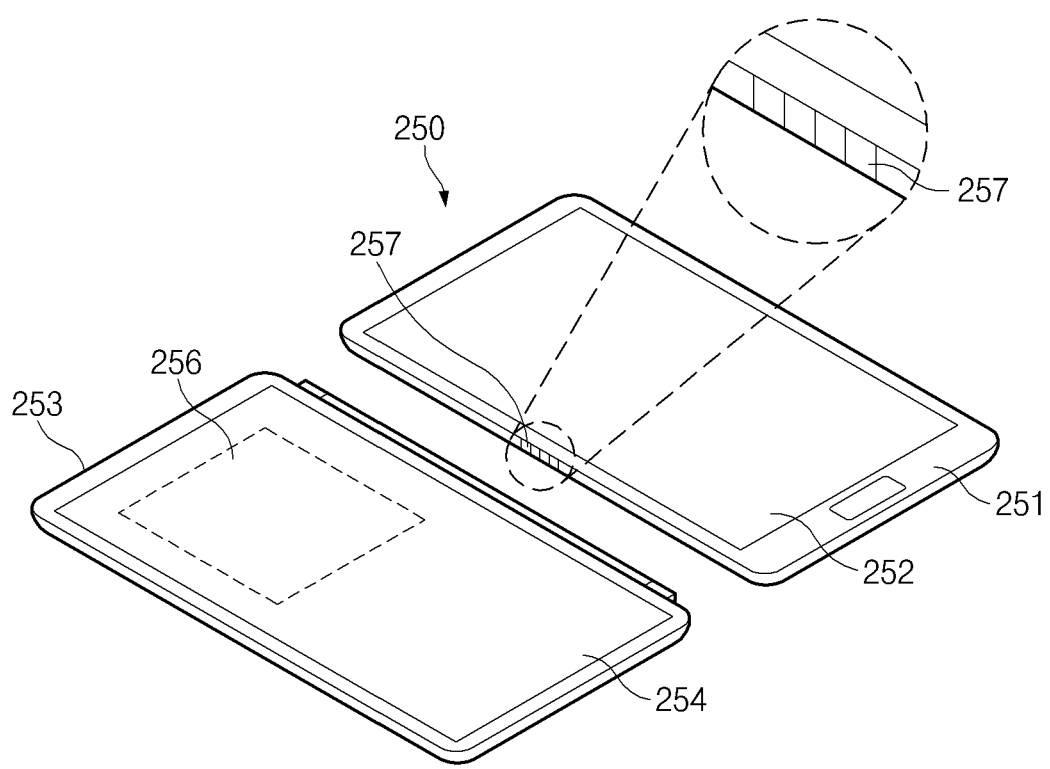
FIG. 2E is a view illustrating a pogo connection type electronic device according to various embodiments of the present disclosure.

FIG. 2E is a view illustrating a pogo connection type electronic device according to various embodiments of the present disclosure.

Referring to FIG. 2E, an electronic device 250 includes a first body part 251, a first display 252, a second body part 253, and a second display 254. The body part 251, the first display 252, the cover 253, and the second display 254, which are the components of the electronic device 250, as components corresponding to the first body part 211, the first display 212, the second body part 213, and the second display 214, which are components of the electronic device 210, may have the same or similar structure or may perform the same or similar function. The second display 254, for example, may include a transparent display area 256. When the cover 253 is mounted at the first body 251 so that at least a portion of the cover 253 covers the first body 251, the transparent display area 256 may be set to allow part of information displayed by the first display 252 to pass through the corresponding transparent display area 246 optically and then be seen to a user of the electronic device 250 visually.

According to an embodiment, the first body part 251 may include a first connection part 257 detachably connected to at least a portion (for example, a side) of the second body part 253. According to an embodiment, the first body part 253 may include a first connection part 259 detachably connected to at least a portion (for example, a side) of the first body part 251. According to an embodiment, the second connection part 259 may have a rotatable hinge structure and may be hinged to the first body part 251 to allow each of the first body part 251 and the second body part 251 to be rotatable by using the second connection part 259. According to an embodiment, at least one of the first connection part 257 and the second connection part 259 may include a magnet detachably connecting the first body part 251 and the second body part 253 by using magnetic force. According to an embodiment, of the first connection part 257 and the second connection part 259 may be formed with a detachable physical structure.

According to an embodiment, the detachable physical structure may connect the first connection part 257 and the second connection part 259 by using a connector (for example, a connector header) or a connector socket. According to another embodiment, the detachable physical structure may connect the first connection part 257 and the second connection part 259 by using a contact (for example, a pogo pin, a spring pin, and a plate spring).

According to an embodiment, the first body part 251 and the second body part 253 may be connected to each other in a detached state through wireless communication. For example, each of the first body part 251 and the second body part 253 includes a first communication module (not shown) and a second communication module (not shown) and thus may transmit/receive a control command for display control on at least one of the first display 252 and the second display 254 or information to be displayed on at least one of the first display 252 and the second display 254. According to an embodiment, a first communication module (not shown) and a second communication module (not shown) may support a short range communication protocol (for example, WiFi, WiFi-direct, wireless gigabit alliance (WiGig), BT, Bluetooth low energy (BLE), Zigbee, ultra wideband (UWB), NFC, radio frequency identification (RFID), audio synch, human body communication (HBC), or visible light communications (VLC)) or a network communication (for example, Internet, local area network (LAN), wire area network (WAN), telecommunication network, cellular network, satellite network, or POTS).

According to an embodiment, the first body part 251 may further include a frame wearable on a user's body. Such a frame may be formed with a similar structure to bracelets, bands, or watches wearable on a user's wrist as shown in FIG. 2C. The frame may be formed with a structure of various other devices (for example, glasses, clothes, headsets, or earphones) wearable on a user's body according to the type of an electronic device.

According to an embodiment, the second display 214 may be a display of an additional accessory form (for example, a card type) physically separated from the electronic device 210. For example, while a user carries a display in accessory form being separated from the electronic device 210, when necessary, by partially overlapping the display and the first display 212 formed at the electronic device 210, effects described above or below may be obtained. In such a case, the display in accessory form may include at least one communication interface for supporting communication with the electronic device 210, for example, BT, BLE, NFC, and WiFi. Additionally, according to an embodiment, the display in accessory form may include an additional input/output device (for example, at least one physical input key, at least one virtual input key, a touch pad detecting hovering, a camera, or sensor). Additional information on the input/output device is provided in relation to FIG. 18. Contents described in relation to FIGS. 2A, 2B, 2C, 2D, and 2E are some embodiments and a structure for applying a display with a transparent display area and a control method thereof is not limited thereto.

Figure 3A:
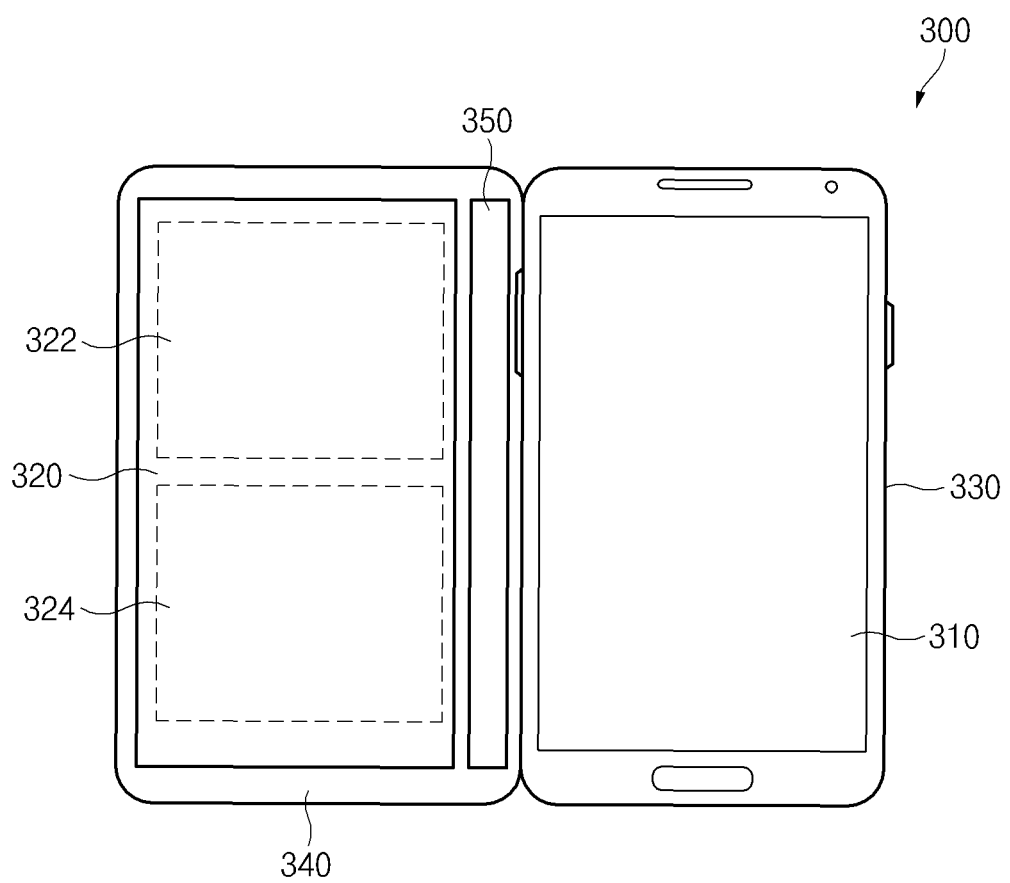
FIG. 3A is a view illustrating an electronic device having a display with a partial transparent area according to various embodiments of the present disclosure.
Figure 3B:
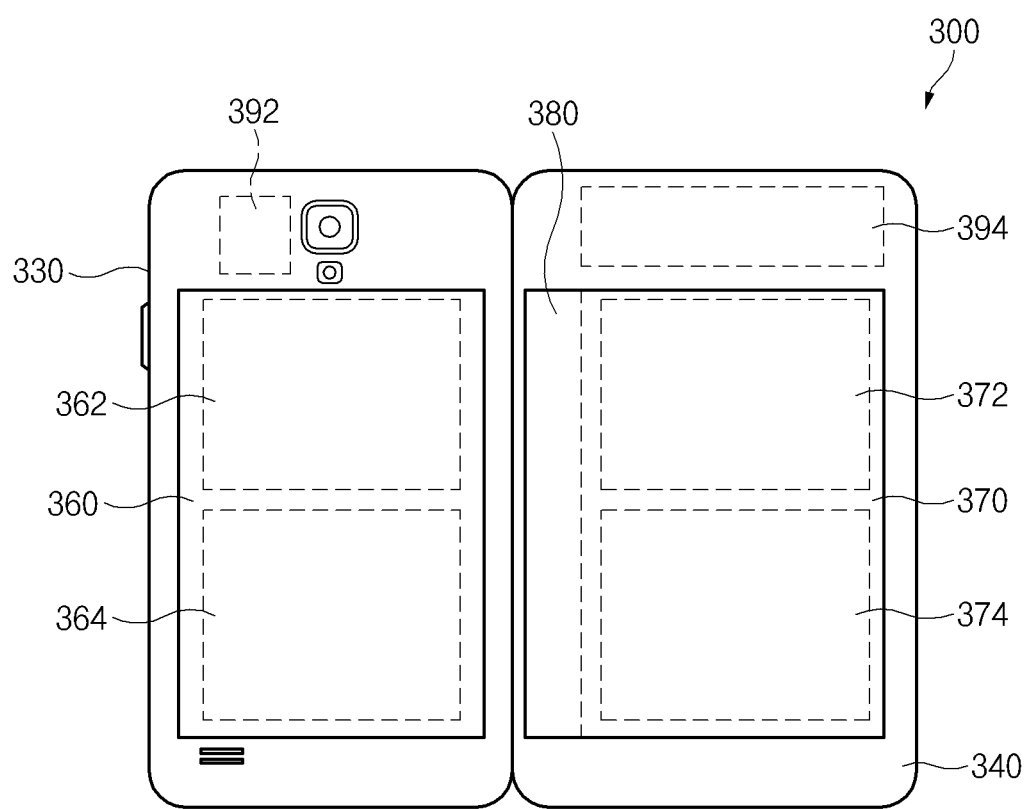
FIG. 3B is a view illustrating an electronic device having a plurality of displays with a partial transparent area according to various embodiments of the present disclosure.
Figure 3C:
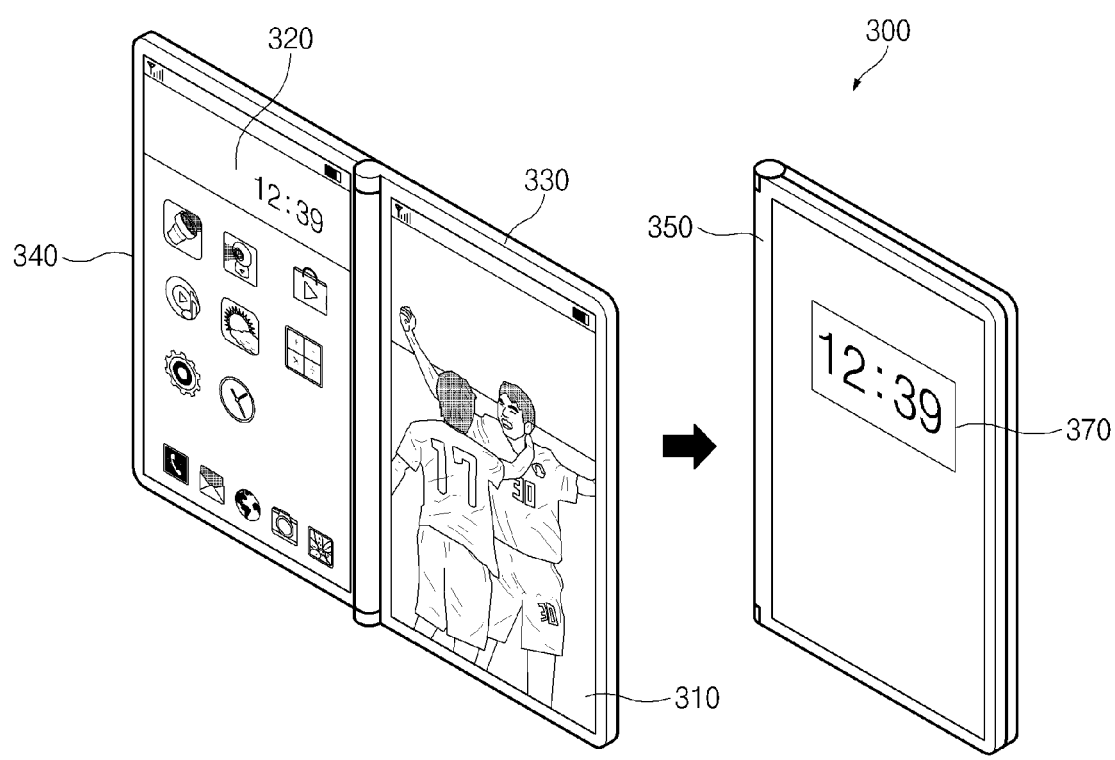
FIG. 3C is a view illustrating an electronic device having a plurality of displays with a front and back surface transparent area according to various embodiments of the present disclosure.

FIGS. 3A, 3B, and 3C are views illustrating electronic devices having a plurality of functionally connected displays according to various embodiments of the present disclosure.

FIG. 3A is a view illustrating an electronic device having a display with a partial transparent area according to various embodiments of the present disclosure.

Referring to FIG. 3A, an electronic device 300 (for example, the electronic device 101) may include a plurality of displays including at least a first display 310 and a second display 320. The first display 310 may be formed on at least a portion of a body 330 of the electronic device 300. The second display 320 may be formed on at least a portion of a cover 340 covering at least a portion of the body 330.

According to an embodiment, the second display 320 may include at least a transparent display area 322. The second display 320, for example, may include an additional display area 324. The additional display area 324 second content may have a property (for example, size, shape, brightness, color, saturation, sharpness, contrast, transparency, gamma, resolution, contrast ratio, viewing angle, color reproduction, color temperature, color tone linearity and clarity) different from the transparent display area 322 or may adjust a property (for example, size, shape, brightness, color, saturation, sharpness, contrast, permeability, gamma, resolution, contrast ratio, viewing angle, color reproduction, color temperature, color tone linearity and transparency) in the transparent display area 322 separately. According to an embodiment, the additional display area 324 may be at least one of another transparent display area or a mirror display area. An embodiment using a functionally transparent display area as a mirror display area is described with reference to FIGS. 8A, 8B, and 8C.

According to an embodiment, the electronic device 300 may further include a third display 350. The third display 350 may be formed at another portion of the cover 340 of the electronic device 300. According to an embodiment, when the second display 320 is formed on at least a portion of the top surface of the cover 340, the third display 350 may be formed at another portion of the top surface of the cover 340, at least a portion of the bottom surface of the cover 340, or at least a portion of the top surface or the bottom surface of a portion covering at least a portion of the side surface of a body in the cover 340. According to an embodiment, the third display 350 may include another transparent display area or a mirror display area.

FIG. 3B is a view illustrating an electronic device having a plurality of displays with a partial transparent area according to various embodiments of the present disclosure.

Referring to FIG. 3B, the electronic device 300 may further include at least a fourth display 360. The fourth display 360 may be formed on another surface (for example, the back) of the body 330 of the electronic device or at least a portion of the part covering at least a portion of the back of the body in the cover 340. According to an embodiment, the forth display 360 may include at least a transparent display area 362. The fourth display 360, for example, may include an additional display area 364. The additional display area 364 may have a property (for example, a display type (for instance, active matrix organic light emitting diode, a thin film transistor liquid crystal display, a transparent display or a mirror display), a pixel structure, size, shape, brightness, color, saturation, sharpness, contrast, permeability, transparency, gamma, resolution, contrast ratio, viewing angle, color reproduction, color temperature, and color tone linearity) different from the transparent display area 362 or may adjust a property (for example, a display type (for instance, active matrix organic light emitting diode, a thin film transistor liquid crystal display, a transparent display or a mirror display), a pixel structure, size, shape, brightness, color, saturation, sharpness, contrast, transmittance, or transparency) in the transparent display area 362 separately. According to an embodiment, the additional display area 364 may be at least one of another transparent display area or a mirror display area and may include areas divided in one display or physically separated displays.

According to an embodiment, a fifth display 370 may be formed on at least a portion of the top surface of the cover 340. According to another embodiment, the fifth display 370 may include at least a transparent display area 372. The fifth display 370, for example, may include an additional display area 374. The additional display area 374 may have a property (for example, a display type (for instance, active matrix organic light emitting diode, a thin film transistor liquid crystal display, a transparent display or a mirror display), a pixel structure, size, shape, brightness, color, saturation, sharpness, contrast, permeability, or transparency) different from the transparent display area 372 or may adjust a property (for example, a display type (for instance, active matrix organic light emitting diode, a thin film transistor liquid crystal display, a transparent display or a mirror display), a pixel structure, size, shape, brightness, color, saturation, sharpness, contrast, transmittance, or transparency) in the transparent display area 372 separately. According to an embodiment, the additional display area 374 may be a mirror display area and may include areas divided in one display or physically separated displays.

According to an embodiment, a sixth display 380 may be formed at another portion of the top surface of the cover 340 or at least a portion of the top surface of a portion covering at least a portion of the side surface of the body 330. According to an embodiment, the sixth display 380 may include the fifth display 370 formed on at least a portion of the top surface of the cover 340, and areas divided in one display or physically separated displays. According to another embodiment, the sixth display 380 may include the fourth display 360 formed on at least a portion of the back of the body 330, and areas divided in one display or physically separated displays. In this case, according to at least one position movement of the body 330 and the cover 340, the forth display 360, the fifth display 370, and the six display 380 may be disposed in the same plane. According to an embodiment, the sixth display 380 may include the fifth display 370, and areas divided in one display or physically separated displays.

According to an embodiment, when it is recognized that the forth display 360, the fifth display 370, and the six display 380 are disposed in the same plane or in a similar case thereto (for example, specific user input reception or command reception from an external electronic device), the electronic device 300 may perform a control function on at least one of the forth display 360, the fifth display 370, and the six display 380 by using the display control module 170 to allow them to function as one display. For example, according to a control of the display control module 170, the forth display 360, the fifth display 370, and the six display 380 may display at least one content at the same time. At this point, at least one content being displayed may be a content being displayed on at least one of the first display 310, the second display 320, the third display 350, the fourth display 360, the fifth display 370, and the sixth display 380 before they are recognized as in the same plane or a specified user input is received.

Additionally, in expressing a corresponding portion of the at least one content, at least one of the fourth display 360, the fifth display 370, and the sixth display 380 may display the same or different property than other displays (for example, size, shape, brightness, color, saturation, sharpness, contrast, permeability, transparency, gamma, resolution, contrast ratio, viewing angle, color reproduction, color temperature, or tone linearity). According to various embodiments, the electronic device 300 may further include an additional component 392 or 394 at one surface (for example, a portion having no fourth display 360 in the back of the body 330) or one surface of the cover 340 (for example, a portion having no fifth display 370). The additional component 392 or 394 may include at least one of an audio output module (for example, a thin film speaker), an energy harvester (for example, a solar cell), a storage, a sensor (for example, a bio information recognition sensor (for example, a fingerprint sensor, an electrocardiogram sensor, a temperature sensor, a pulse sensor, an oxygen saturation sensor, a body fat measurement sensors, a skin aging measurement sensor, a skin humidity measurement sensor, and a heart rate monitor (HRM) sensor), a touch sensor, a pressure sensor, an antenna, a communication module (for example, RF, WiFi, NFC, cellular communication, BT, and BLE communication), a camera, or a battery (for example, a thin film battery). According to an embodiment, one of the additional components 392 and 394 may be additionally or alternatively formed at another position of the electronic device 300 or the cover 340.

FIG. 3C is a view illustrating an electronic device having a plurality of displays with a front and back surface transparent area according to various embodiments of the present disclosure.

Referring to FIG. 3C, at least one (for example, the second display 320) of a plurality of displays in an electronic device may be formed at the inner surface of the cover 340, for example, the surface facing the body 330 when the cover 340 is closed toward the electronic device 300. Referring to FIG. 3C, another (for example, the fifth display 370) of the plurality of displays in the electronic device may be formed at the outer surface of the cover 340, for example, the surface facing the outside of the body 330 when the cover 340 is closed. According to an embodiment, the fifth display 370 may be driven with low power compared to the remaining displays. When the fifth display 370 is driven with low power and thus battery consumption is small, the fifth display 370 may be set to display specified information (for example, the current time, battery status, developments, or various notification information, such as message notification, missed calls, and the like) that is always on before receiving a specified input (for example, screen lock key input). According to an embodiment, a fifth display 370 may be set to be driven by a processor controlling overall functions of the electronic device 300. Additionally, the electronic device 300 may include an additional low power processor for driving the fifth display 370 with low power. When the electronic device 300 includes a low power processor, a function for displaying specified information through the fifth display 370 may be performed by the low power processor.

According to an embodiment, according to the opened/closed state of the cover 340, the electronic device 300 may determine one display among a plurality of displays to display specified information (for example, the current time, battery status, developments, or various notification information, such as message notification, missed calls, and the like). When the cover 340 is closed, the electronic device 300 may display the specified information through the first display 5. When the cover 340 is opened, the electronic device 300 may display the specified information through the second display 320 or a display (for example, the first display 310) formed at the body 330. According to another embodiment, when the cover 340 is closed, the electronic device 300 may perform a control function on the second display 320 or a display (for example, the first display 310) formed at the body 330 to be in a low power state (for example, a sleep state) or to allow a screen of the display to be in an off state (for example, power supplied to the display is off).

Alternatively, when the cover 340 is opened, the electronic device 300 may perform a control function on the second display 320 to be in a low power state (for example, a sleep state) or to allow a screen of the second display 320 to be in an off state (for example, power supplied to the second display 320 is off). According to various embodiments, at least one (for example, the display 320) of a plurality of displays in the electronic device 300 may be configured with a transparent display disposed at the edge of the cover 340. When the display 320 is folded to face the display 310 in the electronic device 300, the other surface of the display 320 among the plurality of displays, that is, the outer surface of the display 370, may be disposed at the facing surface of the display 320. According to an embodiment, when the cover 340 is folded to allow the display 370 to be disposed outside, the electronic device 300 may be driven with relatively low power compared to methods of driving other displays. For example, when the cover 330 and the cover 340 are aligned at a specified angle or to have a specified first angle range (for example, the cover 330 and the cover 340 are aligned at 180° or with a range of 120° to 210°), the electronic device 300 may perform a control function on the display 320 and the display 310 to be driven with a first size power.

Additionally, when the cover 330 and the cover 340 are aligned to have a specified second angle range (for example, the cover 330 and the cover 340 are aligned with a range of 0° to 30°), the electronic device 300 may perform a control function to cut off the power supplied to the display 320 and the display 310. During this operation, the electronic device 300 may perform a control function on the display 370 to be driven with a specified second size power (for example, lower power than the first size power). According to an embodiment, the display 320 and the display 370 may be configured with one transparent display physically or may be provided in the double overlapping form of the transparent display 320 and the transport display 370. When the display 320 and the display 370 are configured with one transparent display, they are configured with one piece of hardware. In correspondence to a hinge angle of the cover 340, the direction of displaying information and the size of power supplied may be defined differently. According to an embodiment, when the transparent display 320 is disposed to allow the cover 340 to have a specified first angle range, it may display an object in a first display direction (for example, text or image arrangement from the left to right direction order).

Additionally, when the cover 340 is disposed to have a specified first angle range, the transparent display 320 may be driven with the first size power. According to an embodiment, when the transparent display 320 is disposed to allow the cover 340 to have a specified second angle range, it may display an object in a second display direction (for example, text or image arrangement from the right to left direction order) as shown in the display 370 of FIG. 3C. Herein, the transparent display 320 may be driven with a different second size power than the first size power. First information outputted to the transparent display 320 (for example, the front direction) when the cover 340 is disposed in the first angle range and second information outputted to the transparent display 320 (for example, the bottom direction of the display 320 or the front direction of the display 370 in the case of a double panel structure) when the cover 340 is disposed in the second angle range may be the same or different. As mentioned above, in correspondence to a hinge state of a transparent display (for example, at least one of the display 320 or the display 370), the electronic device 300 may process driving power of a transparent display differently (for example, low power or specified normal power).

Figure 4A:
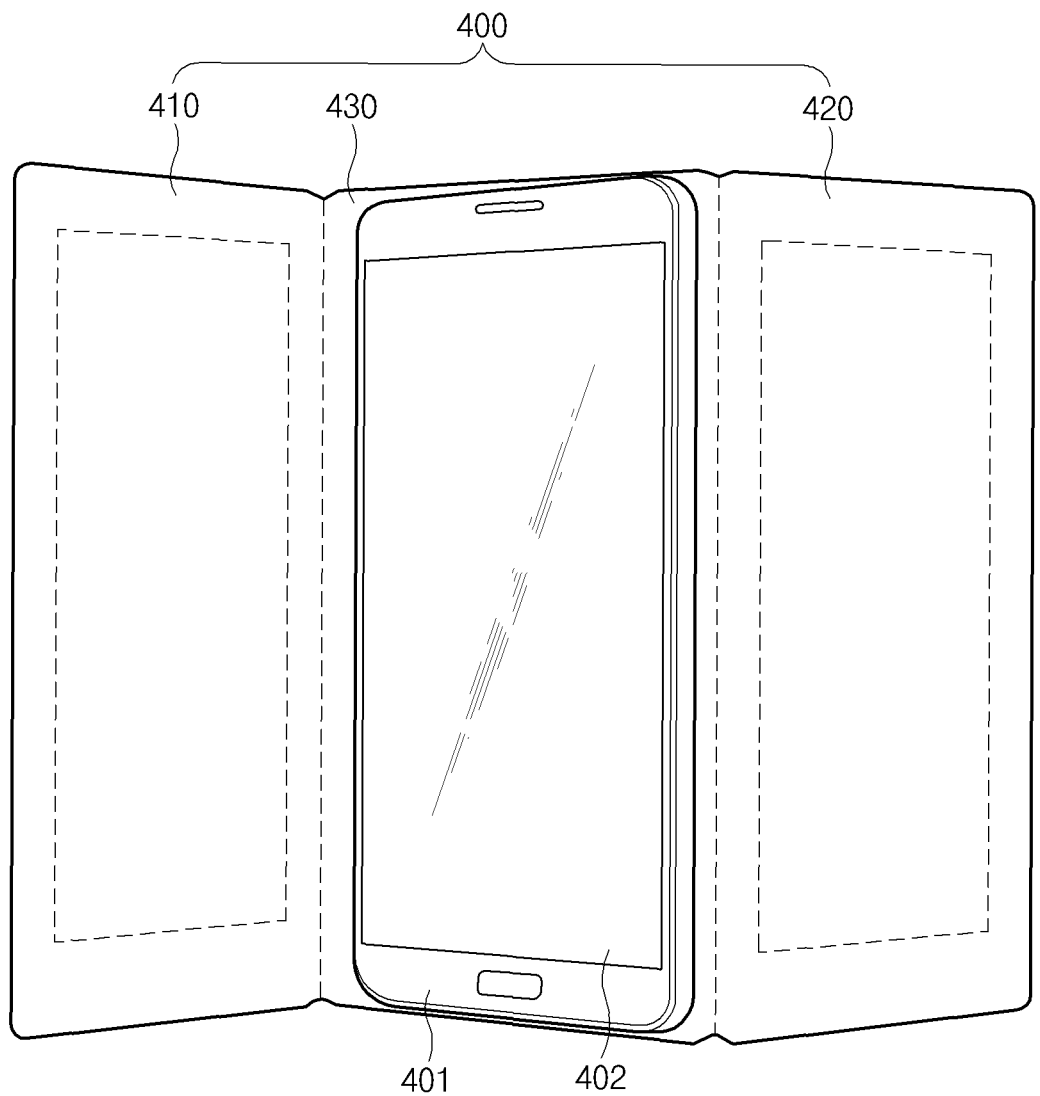
FIG. 4A is a view illustrating a three-step display according to various embodiments of the present disclosure.
Figure 4B:
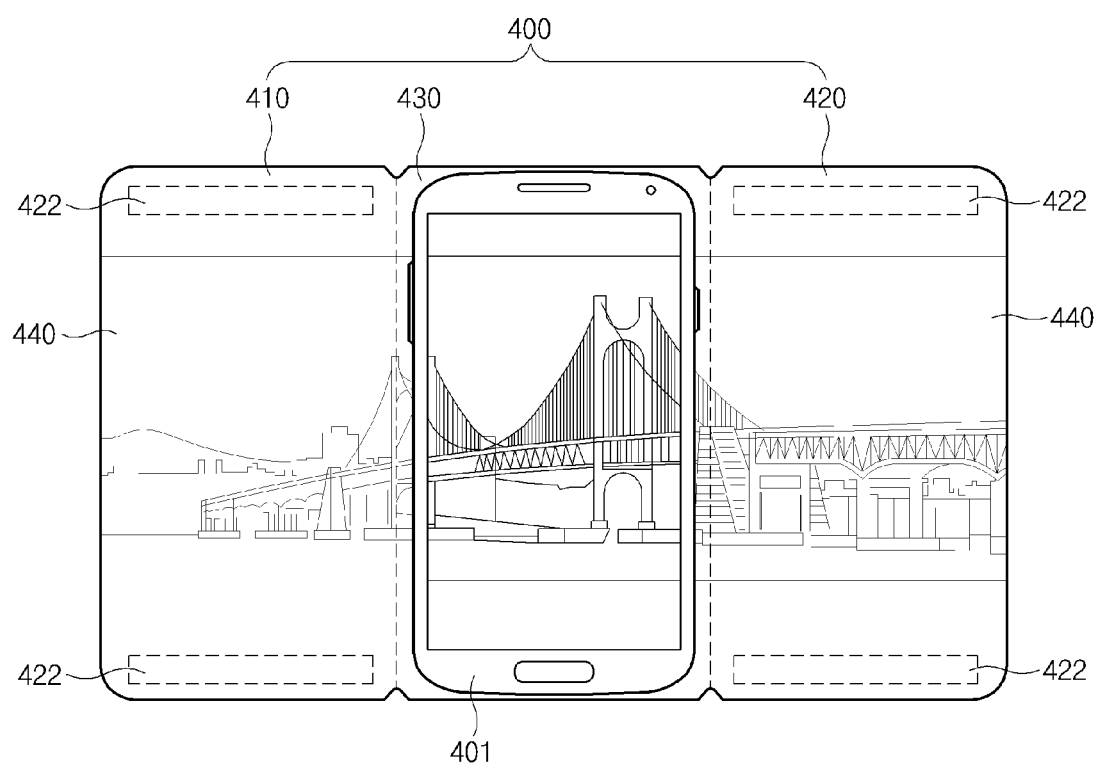
FIGS. 4B and 4C are views illustrating an electronic device displaying content on a three-step front according to various embodiments of the present disclosure.
Figure 4C:
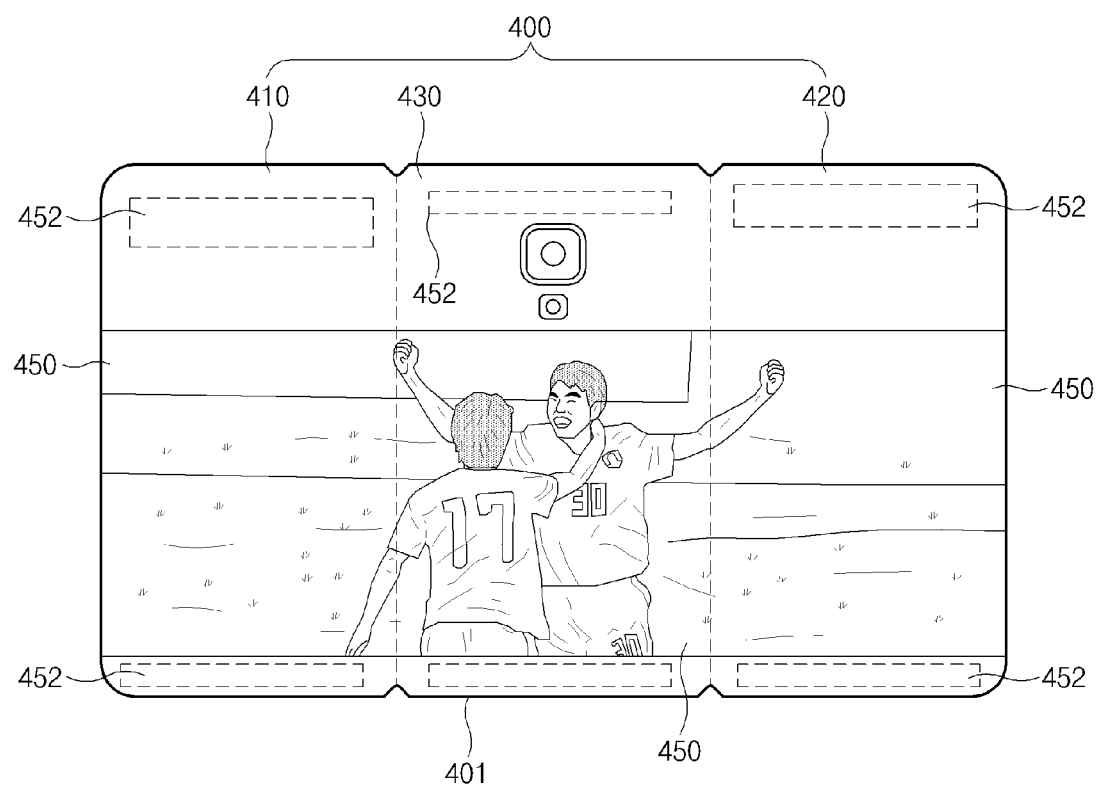

FIGS. 4A, 4B, and 4C are views illustrating electronic devices having a plurality of functionally connected displays according to various embodiments of the present disclosure.

FIG. 4A is a view illustrating a three-step display according to various embodiments of the present disclosure.

Referring to FIG. 4A, a display device 400 may be a device detachable from an electronic device 401 (for example, the electronic device 101). An electronic device 401 may include a first display 402. According to an embodiment, the display device 400 may include a plurality of cover members 410, 420, and 430. In this case, since at least a portion (for example, the front or the back) of a body of an electronic device is covered by using at least one of the plurality of cover members 410, 420, and 430, it is possible to protect the electronic device from external impact. When each of the plurality of cover members 410, 420, and 430 is mounted on the electronic device 401, they may move flexibly with respect to the electronic device 401 in an unfolding or folding form.

According to another embodiment, the display device 400 may be formed as another separate display device by combining the cover member 410 and the cover member 420 and also may be formed as another separate display device by combining an additional cover member (not shown) detachable from the back of the cover member 420 and the cover member 430. In this case, the display device 400 may be configured by using each separate another display device and another display device.

FIG. 4B is a view illustrating an electronic device displaying content on a three-step front according to various embodiments of the present disclosure.

Referring to FIG. 4B, the display device 400 may further include at least one second display 440. The second display 440 may be formed at another portion other than a portion where the body of the electronic device 401 is mounted of at least one cover member (for example, 410 or 430) of a plurality of cover members 410, 420, and 430. According to an embodiment, the cover member 430 may include an additional display (not shown). At this point, the at least one displayed content may be at least one content being displayed on at least one of the first display 402 and the second display 440 before the display device 400 is mounted on the electronic device 401 or a specified user input is received. According to an embodiment, the at least one content may be newly displayed information (for example, text, image or video) after the display device 400 is mounted on the electronic device 401.

Additionally, in expressing content through the first display 402 or the second display 440, it may display the same or different property (for example, size, shape, brightness, color, saturation, sharpness, contrast, permeability, transparency, gamma, resolution, contrast ratio, viewing angle, color reproduction, color temperature, or tone linearity). According to an embodiment, the display device 400 may further include an additional component 422 at a portion where the body of the electronic device 401 is not mounted on at least one cover member (for example, 410 or 430) among the plurality of cover members 410, 420, and 430. The additional component 422 may include at least one of an audio output module (for example, a thin film speaker), an energy harvester (for example, a solar cell), a storage, a sensor (for example, a bio information recognition sensor (for example, a fingerprint sensor, an electrocardiogram sensor, a temperature sensor, a pulse sensor, an oxygen saturation sensor, a body fat measurement sensors, a skin aging measurement sensor, a skin humidity measurement sensor, and a HRM sensor), a touch sensor, a pressure sensor, an antenna, a communication module (for example, RF, Wi-Fi, NFC, cellular communication, BT, and BLE communication), a camera, or a battery (for example, a thin film battery).

FIG. 4C is a view illustrating an electronic device displaying content on a three-step front according to various embodiments of the present disclosure.

Referring to FIG. 4C, the display device 400 may further include at least one third display 450. The third display 450 may be formed on at least a portion of the outer surface of at least one cover member (for example, 410, 420, or 430) among the plurality of cover members 410, 420, and 430. According to an embodiment, the display device 400 may further include an additional component 452 at a portion where the third display 450 is not formed in the outer surface of at least one cover member (for example, 410, 420, or 430) among the plurality of cover members 410, 420, and 430. The additional component 452 may include at least one of an audio output module (for example, a thin film speaker), an energy harvester (for example, a solar cell), a storage, a sensor (for example, a bio information recognition sensor (for example, a fingerprint sensor, an electrocardiogram sensor, a temperature sensor, a pulse sensor, an oxygen saturation sensor, a body fat measurement sensors, a skin aging measurement sensor, a skin humidity measurement sensor, and a HRM sensor), a touch sensor, a pressure sensor, an antenna, a communication module (for example, RF, WiFi, NFC, cellular communication, BT, and BLE communication), a camera, or a battery (for example, a thin film battery).

According to an embodiment, a solar cell may be disposed on at least a portion of the outer surface or the inner surface of at least one cover member (410, 420, or 430) among the plurality of cover members 410, 420, and 430. According to an embodiment, at least a portion of the solar cell is integrally configured with at least a portion (for example, a transparent display area) of a display formed at a corresponding cover member, so that it may receive solar light in relation to or being separated from the corresponding display (or a corresponding area (for example, a transparent display area) in the corresponding display). According to an embodiment, according to a coupling form or a relative position between the electronic device 401 and the cover members 410, 420, and 430, the amount of solar light to be received may vary. Accordingly, the amount of charging current charged by a solar cell may vary. According to an embodiment, in order to charge the electronic device 401 by using a solar cell, the position (for example, an opened/closed state, an angle, or a direction) of the electronic device 401 may be adjusted by a user. In such a case, when the energy received by a solar cell or the amount of charging current becomes an optimal value or more than a specified threshold, at least one of the electronic device 401 or the display device 400 may notify this to a user by using at least one of various notification expression methods, such as sound, vibration, lamp, text, image, and the like. Through this, the electronic device 401 or the display device 400 may guide a user to use a solar cell more efficiently. According to an embodiment, when the third display 450 is formed at the outer surface of at least one cover member (for example, 410, 420, or 430) among the plurality of cover members 410, 420, and 430, additional image information relating to user's context information (for example, position and time) may be displayed through the third display 450. According to an embodiment, when additional image information is configured with a repeating pattern (for example, a floral pattern, a wave pattern, a honeycomb pattern, a stripe pattern, or a specific background, such as a mountain, a sea, a sky, a forest, and the like) or has a specific color, in order to allow the pattern or color of additional image information to correspond to user's context information, it may be changed dynamically.

For example, if it is determined that the user's position is in the forest, the color of additional image information may change into green and if it is determined that the user's position is in the beach, the color of additional image information may change into blue. According to an embodiment, through a mirror image area of a corresponding display, the above-mentioned additional image information may be displayed. According to various embodiments, the same or various forms of speakers may be formed at a plurality of positions (for example, at least two of the front of back of the electronic device 401, the front or back of the cover member 410, the front or back of the cover member 420, and the front or back of the cover member 430). The electronic device 401 may select a speaker that is activated or deactivated according to information (for example, image or video) outputted through at least one display, a closing/opening state of at least a portion of a cover member, context information (for example, the position of an electronic device, such as a home, a company, a theater, and the like), a time (for example, morning—morning call), user schedule (for example, meeting or class), or a power state of an electronic device (for example, a low power state).

Additionally or alternately, the electronic device 401 may adjust at least one volume of an activated speaker(s). According to an embodiment, the electronic device 401 may adjust the directivity of sound outputted from speakers formed at a certain position (for example, the cover member 410 or 430). According to an embodiment, the electronic device 401 may control the activation of a speaker(s) according to an operating state (for example, an activation state or a deactivation state) of a display formed at a certain position (for example, the cover member 410 or 430). According to an embodiment, when at least one display among displays formed a certain position (for example, the cover member 410, 420, or 430) is activated, the electronic device 401 may control the activation of at least one speaker(s) formed at a cover member having the activated display. According to various embodiments, the electronic device 401 may provide various sound effects (for example: surround, Dolby, or stereo) through the activation or directivity control of a speaker(s) according to the coupling form or relative position between the electronic device 401 and the cover members 410, 420, and 430. The electronic device 401 may control the activation or sound directivity of at least one of a speaker(s) formed at a certain position (for example, the cover member 410, 420, or 430) according to the position (for example, opening, closing, angle, or direction) of a certain cover member (for example, 410, 420, or 430). According to an embodiment, in relation to the electronic device 401, an angle formed by one surface (for example, the inner surface) of the cover member 410 and one surface (for example, the inner surface) of the cover member 430 may be in a certain range (for example, 90° to 180°). In such a case, the activation or sound directivity of at least one speaker(s) formed at the cover member 410 and the cover member 430 may be controlled. Through the same or similar method to the above-mentioned method, the electronic device 401 may provide various sound effects (for example: surround, Dolby, or stereo) through a speaker(s) formed at the cover member 430 and the cover member 430. According to an embodiment, the electronic device 401 may select a speaker activated or deactivated according to at least a partial opened/closed state of the cover member 410 or the cover member 420. When the cover member 410 covers one surface (for example, the front) of the electronic device 401, the electronic device 401 may control the deactivation or sound directivity of at least one speaker(s) formed at one surface (for example, the inner surface) of the cover member 410 covering one surface of the electronic device 401 and may control the activation or sound directivity of at least one speaker(s) formed at one surface (for example, the outer surface) of the cover member 410. Through the same or similar method to the above-mentioned method, the electronic device 401 may control the activation or sound directivity of at least one speaker formed at one surface (for example, the inner surface or the outer surface) of the cover member 420.

Figure 5A:
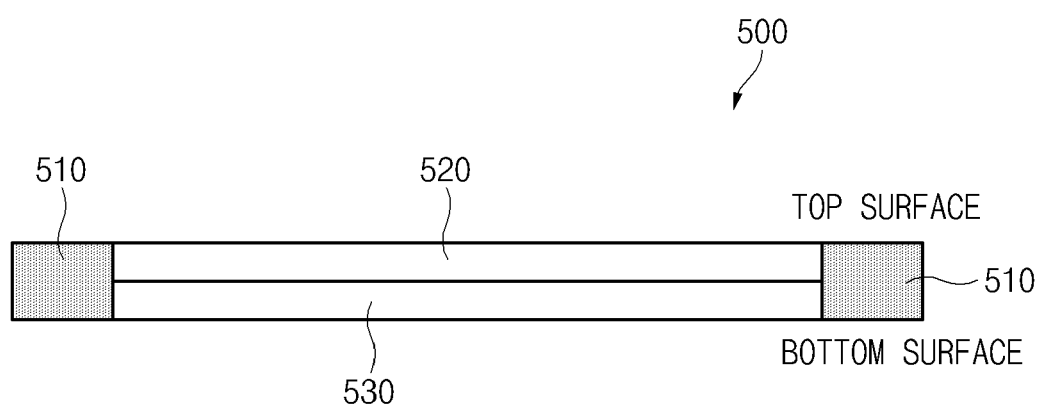
FIG. 5A is a view illustrating a multilayer transparent display according to various embodiments of the present disclosure.
Figure 5B:
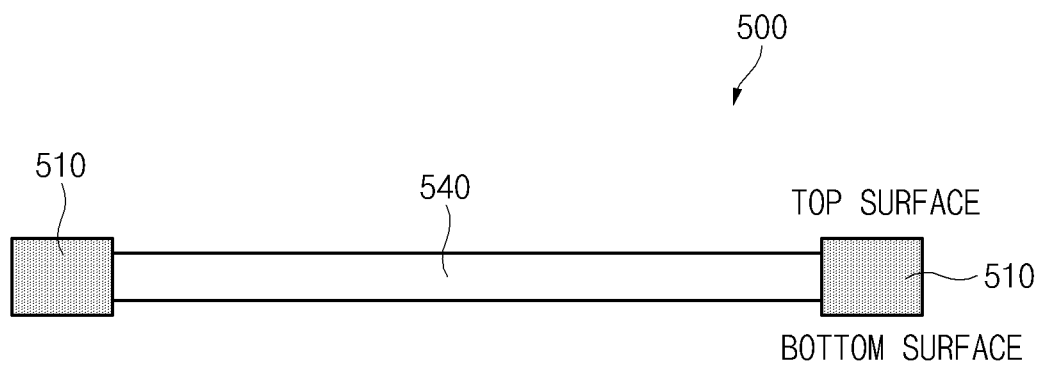
FIG. 5B is a view illustrating a single layer transparent display according to various embodiments of the present disclosure.

FIGS. 5A and 5B are views illustrating a transparent display structure of a display device according to various embodiments of the present disclosure.

FIG. 5A is a view illustrating a multilayer transparent display according to various embodiments of the present disclosure.

Referring to FIG. 5A, a display device 500 (for example, the display device 400) may have a layered structure penetrating the top surface and the bottom surface of the display device 500 through a plurality of layers (for example, a first layer 520 and a second layer 530) in an enclosure 510. According to an embodiment, the enclosure 510 may support components of the first layer 520 and the second layer 530 to allow the first layer 520 to be exposed through one surface (for example, the top surface) of the display device 500 and the second layer 530 to be exposed through the other surface (for example, the bottom surface) of the display device 500. According to an embodiment, at least one transparent display module may be disposed at the first layer 520 and the second layer 530. Each transparent display module may include at least one of a transparent display panel for displaying information or a touch sensor for recognizing a touch input or proximity input relating to a corresponding transparent display panel. According to an embodiment, a layered structure of the first layer 520 and the second layer 530 may be classified into four types according to the component of the first layer 520 and the second layer 530.

TABLE 2

| Type | First layer | Second layer |
|---|---|---|
| 1 | transparent display panel + touch sensor | touch sensor |
| 2 | transparent display panel + touch sensor | (for example, display, e-ink, digitizer, solar cell, thin film speaker, polycarbonate, acrylic, transparent plastic cover, no) |
| 3 | touch sensor | transparent display panel + touch sensor |
| 4 | (for example, display, e-ink, digitizer, solar cell, thin film speaker, polycarbonate, acrylic, transparent plastic cover, no) | transparent display panel + touch sensor |

According to an embodiment, in relation to the first type, a transparent display panel may be formed on at least a portion of the first layer 520, a touch sensor coupled to at least a portion (for example, the top surface of a transparent display) of the transparent display panel to receive an input relating to a transparent display may be included, and a touch sensor coupled to at least a portion (for example, the bottom surface of a transparent panel) of the transparent display panel formed at the first layer 520 to receive an input relating to the transparent display or touch sensor formed at the first layer 520 or anther independent input may be included.

According to an embodiment, in relation to the second type, a transparent display panel may be formed on at least a portion of the first layer 520, a touch sensor coupled to at least a portion (for example, the top surface of a transparent display) of the transparent display panel to receive an input relating to a transparent display may be included, and various forms of objects (for example, display, e-ink, digitizer, solar cell, thin film speaker, PC, acrylic, transparent plastic cover, or nothing), which are coupled to at least a portion (the bottom surface of a transparent display) of the transparent display panel formed at the second layer 530 and relate to or separated from the transparent display or touch sensor formed at the second layer 530, may be included.

According to an embodiment, in relation to the third type, a touch panel may be formed on at least a portion of the first layer 520, a transparent display panel relating to or separated from the touch panel formed at the first layer 520 is formed on at least a portion of the second layer 530, and a touch sensor coupled to at least a portion (for example, the top surface of a transparent display) of the transparent display panel to receive an input relating to a touch display may be included.

According to an embodiment, in relation to the fourth type, various forms of objects (for example, display, e-ink, digitizer, solar cell, thin film speaker, PC, acrylic, transparent plastic cover, or nothing) may be formed on at least a portion of the first layer 520, a transparent display panel relating to or separated from the various forms of objects formed at the first layer 520 may be formed on at least a portion of the second layer 530, and a touch sensor coupled to at least a portion (for example, the top surface of a transparent display) of the transparent display panel to receive an input relating to a transparent display may be included.

The above-mentioned various display structures are just one embodiment and it is apparent to those skilled in the art that various structures of display forms are configured by adding various components.

FIG. 5B is a view illustrating a single layer transparent display according to various embodiments of the present disclosure.

Referring to FIG. 5B, a display device 500 may have a single layered structure penetrating the top surface and the bottom surface of the display device 500 through one third layer 540 in an enclosure 510.

According to an embodiment, at least one transparent display module may be disposed at the third layer 540. Each transparent display module may include at least one of a transparent display panel for displaying information, or a touch sensor or a digitizer for recognizing a touch input or proximity input relating to a corresponding transparent display panel.

According to an embodiment, a layered structure of the third layer 540 may be classified into four types as follows according to the component of the third layer 540.

TABLE 3

| Type | Third layer |
|---|---|
| 1 | transparent display panel + single side touch sensor/digitizer |
| 2 | transparent display panel + both sides touch sensor/digitizer |

TABLE 3-continued

| Type | Third layer |
|---|---|
| 3 | transparent display panel |
| 4 | transparent display panel + single side touch sensor/digitizer + solar cell |

According to an embodiment, in relation to the first type, a transparent display panel may be formed on at least a portion of the third layer 540, a touch sensor coupled to at least a portion (for example, the top surface of a transparent display) of the transparent display panel to receive an input relating to a transparent display may be included, and a digitizer coupled to at least a portion (for example, the bottom surface of a transparent panel) of the transparent display panel to receive an input relating to or separated from the transparent display.

According to an embodiment, in relation to the second type, a transparent display panel may be formed on at least a portion of the third layer 540, a plurality of touch sensors coupled to at least a portion (for example, the top surface of a transparent display) of the transparent display panel to receive an input relating to a transparent display may be included, and a digitizer coupled to at least a portion (for example, the top surface or the bottom surface of a transparent panel) of the transparent display panel to receive an input relating to or separated from the transparent display.

According to an embodiment, the third type may include a transparent display panel on at least a portion of the third layer 540.

According to an embodiment, in relation to the fourth type, a transparent display panel may be formed on at least a portion of the third layer 540, a touch sensor coupled to at least a portion (for example, the top surface of a transparent display) of the transparent display panel to receive an input relating to a transparent display may be included, and a solar cell coupled to at least a portion (for example, the bottom surface of a transparent panel) of the transparent display panel to receive solar light relating to or separated from the transparent display.

For example, the above-mentioned various display structures in relation to FIGS. 5A and 5B are just one example and various structures of display forms in which some components are added, deleted, or combined may be configured. For example, at least one of the first layer 520, the second layer 530, and the third layer 540 may have the same thickness as the enclosure 510 as shown in FIG. 5A in at least one direction (for example, the top surface direction or the bottom surface direction) or may have a different thickness than the enclosure 510 as shown in FIG. 5B.

According to various embodiments of the present disclosure, a first display for displaying information and a second display of which position is changeable with respect to the first display are included. The second display may include a transparent display area of which visibility for at least part of the information is adjusted. According to an embodiment, the visibility state may be adjusted to several stages (for example, a scale of 0 to 10), for example, the at least part of the information is invisible, barely visible but illegible, barely legible, or (relatively) visible.

According to various embodiments of the present disclosure, a display control module set to automatically control the adjustment of the visibility state may be further included based on the information (to be or being displayed on the first display) or the position change of the transparent display area for the first display.

According to various embodiments of the present disclosure, the display control module may be set to selectively display at least part of information (to be or being displayed on the first display) or at least part of another information through the transparent display area.

According to various embodiments of the present disclosure, when the transparent display area is partially overlaid with the first display, the display control module may control at least one of the transparency of the transparent display area or the luminance or brightness of the first display in order to allow at least part of the information (to be or being displayed on the first display) to be transmitted through the transparent area and seen (by a user).

According to various embodiments of the present disclosure, when the transparent display area is partially overlaid with the first display, the display control module may automatically adjust at least one of the transparency of the transparent display area or the luminance or brightness of the first display in order to allow at least part of the information (to be or being displayed on the first display) to be transmitted through the transparent area and seen by a user.

According to various embodiments of the present disclosure, the second display may configure at least a portion of a cover for the electronic device.

According to various embodiments of the present disclosure, the second display may be form to be detachable from the electronic device.

According to various embodiments of the present disclosure, an electronic device includes a first display for displaying information and a second display of which position is changeable with respect to the first display. The second display may include a transparent display area of which visibility for at least part of the information is adjusted.

According to various embodiments of the present disclosure, at least one of the first display and the second display may include at least one transparent display area or at least one mirror display area.

According to various embodiments of the present disclosure, an electronic device may include a first display formed on at least a portion (for example, the front) of the body of the electronic device and a second display formed on at least a portion (for example, the top surface) of a cover functionally connected to the body and including a transparent display area.

According to various embodiments of the present disclosure, at least one of the first display and the second display may include a display area of which at least one of size, shape, brightness, color, saturation, sharpness, transparency, permeability, or contrast is changed dynamically.

According to various embodiments of the present disclosure, at least one of the first display and the second display may be configured to detect touch input or proximity input.

According to various embodiments of the present disclosure, a third display formed at another portion of the cover may be further included.

According to various embodiments, at least one of the first display, the second display, and the third display may include at least one transparent display area or at least one mirror display area.

According to various embodiments of the present disclosure, a third display formed at another portion (for example, the bottom surface) of the cover may be further included.

According to various embodiments of the present disclosure, the third display may include at least one of a transparent display area and a mirror display area.

According to various embodiments of the present disclosure, a third display formed at the part covering at least a portion of the side of the body in the at least portion (for example, the top surface) of the cover may be further included.

According to various embodiments of the present disclosure, the third display may include at least one of a transparent display area and a mirror display area.

According to various embodiments of the present disclosure, a third display formed at the part covering at least a portion of the side of the body in the bottom surface of the cover may be further included.

According to various embodiments of the present disclosure, the third display may include at least one of a transparent display area and a mirror display area.

According to various embodiments of the present disclosure, a third display formed at another portion (for example, the back) of the body may be further included.

According to various embodiments of the present disclosure, the third display may include at least one of a transparent display area and a mirror display area.

According to various embodiments of the present disclosure, a fourth display formed at the other portion (for example, the back) of the body may be further included.

According to various embodiments of the present disclosure, an audio output module formed on at least one of another portion of the top surface of the cover, at least a portion of the bottom surface of the cover, and at least a portion of the back of the body may be included.

According to various embodiments of the present disclosure, the audio output module may include a thin film speaker.

According to various embodiments, an energy harvester formed on at least one of another portion of the top surface of the cover, at least a portion of the bottom surface of the cover, and at least a portion of the back of the body may be included.

According to various embodiments of the present disclosure, the energy harvest may be set to generate power based on at least one of light, temperature, vibration, or pressures.

According to various embodiments of the present disclosure, the energy harvester may include a solar cell.

According to various embodiments of the present disclosure, an input module for recognizing an input relating to at least a portion of the transparent display area may be further included.

According to various embodiments of the present disclosure, the input module may be set to recognize at least one of a first input relating to the top surface of the cover and a second input relating to the bottom surface of the cover through the input.

According to various embodiments of the present disclosure, the input module may include at least one of a touch sensor and a pressure sensor.

According to various embodiments of the present disclosure, a display control module set to control at least one of the first display and the second display is further included. When at least part of information displayed on the first display is seen through the transparent display area, the display control module may be set to display information different from the at least part of the information through the transparent display area, in addition to or instead of the at least part of the information.

According to various embodiments of the present disclosure, the display control module may be set to determine the other information based on an opened/closed state of the front cover or the back cover for the body, information to be displayed on the first display, a function or application to be executed through the first display, information to be displayed on the second display, a function or application to be executed through the second display, and a user input.

According to various embodiments of the present disclosure, the display control module may set to determine the other information based on at least one of power status information of the electronic device, communication status information between the electronic device and an external electronic device to the electronic device, external environment information of the electronic device, and situation recognition information relating to a user of the electronic device.

According to various embodiments of the present disclosure, the cover may be detachably connected to the body.

According to various embodiments of the present disclosure, the cover may be connected to the body with at least one of folder, hinge, flip or slide structures to allow the cover to be opened/closed with respect to the body.

According to various embodiments of the present disclosure, a solar cell integrally formed with the second display may be further included.

According to various embodiments of the present disclosure, a display device may include a cover part detachable from an electronic device and covering at least a partial area of the outer surface of the electronic device and a display formed in at least a partial area of the cover part to include a transparent display area.

According to various embodiments of the present disclosure, a communication unit communicating with at least one of the electronic device and an external device to the electronic device may be further included.

According to various embodiments of the present disclosure, at least one of the size, shape, brightness, color, saturation, sharpness, transparency, or contrast of the transparent display area may be changed dynamically.

According to various embodiments of the present disclosure, the display may further include a mirror display area.

According to various embodiments of the present disclosure, an electronic device includes a first display for displaying information on a user and a second display of which position is changeable with respect to the first display. The second display may include a transparent display area of which visibility for at least part of the information is adjusted for the user.

According to various embodiments of the present disclosure, an electronic device may include a first display and a second display set to display at least part of information displayed through the first display when it is closed for the first display and display another information when it is partially opened with respect to the first display.

According to various embodiments of the present disclosure, a display device may be set to display an object or information when the first side faces the front, and may be set to display another information when the second side faces the front.

Figure 6A:
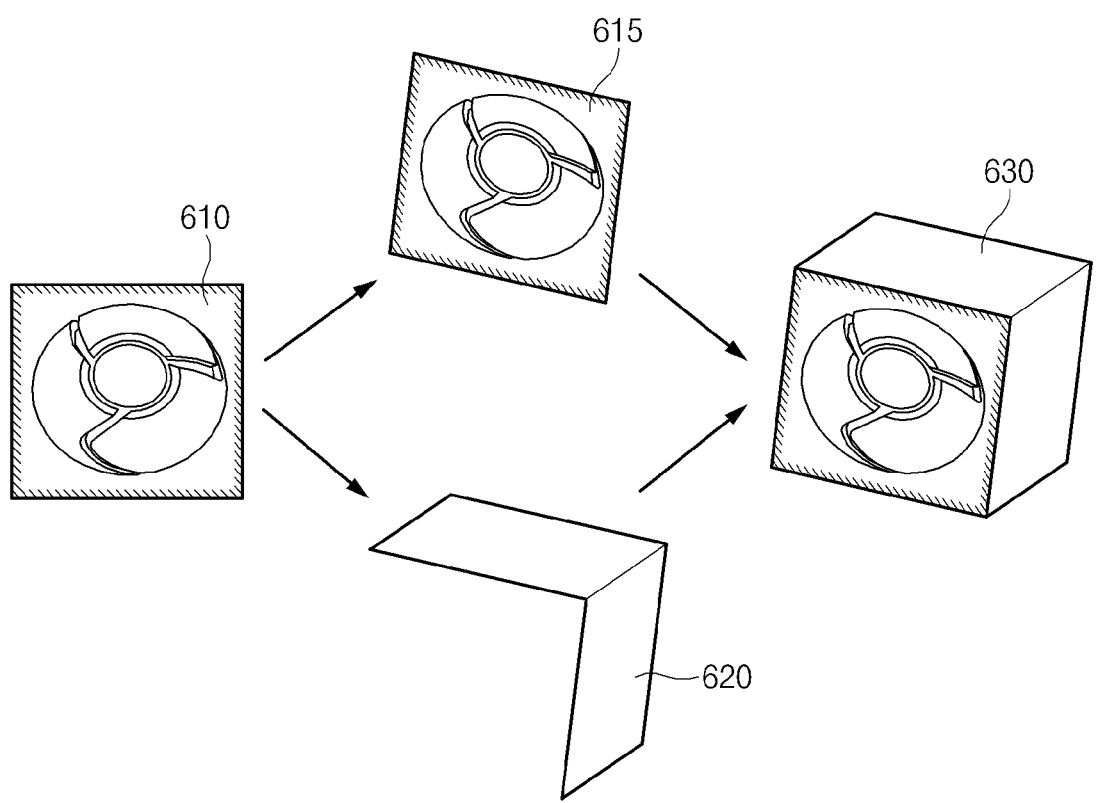
FIG. 6A is a view illustrating a 3-Dimensional (3D) effect display of an electronic device based on additional information according to various embodiments of the present disclosure.
Figure 6B:
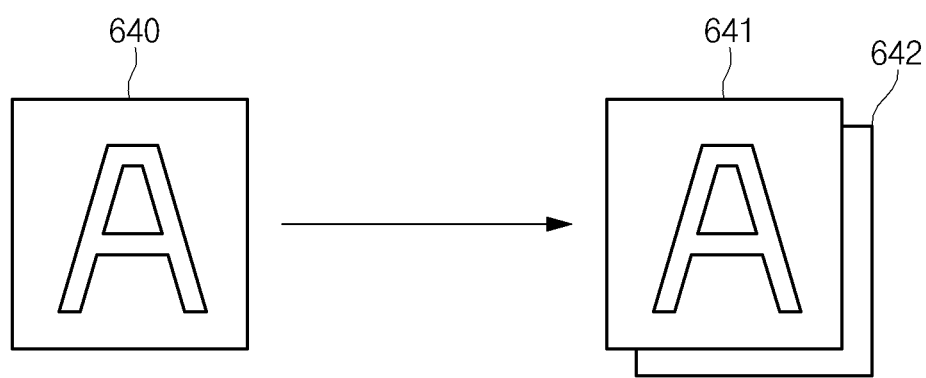
FIG. 6B is a view illustrating a 3D effect display of an electronic device based on image copy according to various embodiments of the present disclosure.
Figure 6C:
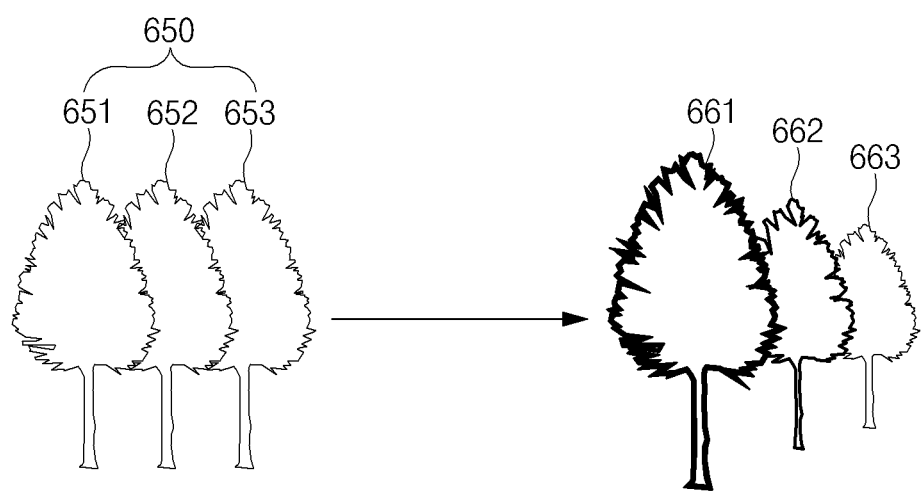
FIG. 6C is a view illustrating a 3D effect display of an electronic device based on image copy modification according to various embodiments of the present disclosure.

FIGS. 6A, 6B, and 6C are views of applying visual effect (for example, 3D effect) to information to be displayed through a plurality of displays in an electronic device according to various embodiments of the present disclosure. An electronic device (for example, the electronic device 101) may include a plurality of displays including at least a first display (for example, the first display 151) and a second display (for example, the second display 152). The second display 320, for example, may include a third display (for example, the transparent display area 153) and according to a relative position between the first display and the second display, at least part of information displayed on the first display may be formed to be seen through the transparent display area.

FIG. 6A is a view illustrating a 3D effect display of an electronic device based on additional information according to various embodiments of the present disclosure.

Referring to FIG. 6A, a display control module (for example, the display control module 170) of an electronic device may perform a control function on a plurality of displays to add visual effect to information to be displayed and display the information. The display control module may generate additional information (for example, first image information 615 or second image information 620) for adding visual effect (for example, 3D effect 630) to information to be displayed (for example, 2D image 610). According to an embodiment, a display control module may generate additional information based on at least of a property of information to be displayed (for example, display type or display depth) or a visual effect type (for example, embossing effects or engraving effects). According to an embodiment, when information to be displayed is an image, image processing may be applied to a process for generating additional information in a display control module. For example, a display control module may extract a property, such as the shape or depth of image information, to be displayed and may then generate additional information based on the extracted property. According to an embodiment, a display control module may determine a visual effect type based on at least one of information to be displayed, image analysis information reception form an external electronic device, and a user's input. For example, when information to be displayed is an icon, visual effect may be embossing effect.

According to various embodiments of the present disclosure, when it is recognized that information 610 (for example, a 2D image) to be displayed through a first display is transmitted through a transparent display area and displayed, a display control module may generate additional information for adding visual effect (for example, 3D effect) to the information 610. According to an embodiment, when the information 610 to be displayed is determined as an icon image, in order to add visual effect to the information 610 to be displayed with embossing effect, a display control module may generate first image information 615 to be displayed through a first display to be transmitted through a transparent display area and seen and second image information 620 to be displayed through a second display to be overlaid with the first image information 615 and seen.

According to an embodiment, the first image information 615 may be generated in the same manner as the information 610 to be displayed and the second image information 620 may be generated as an image to express visual effect of the information to be displayed. On the contrary to this, the second image information 620 may be generated in the same manner as information to be displayed and the first image information 615 may be generated as an image to express visual effect of information to be displayed. This is just one embodiment and the first image information 615 and the second image information 620 may be generated through various methods.

According to an embodiment, by applying at least one image processing technique among shift, equalization, sharpening, noise reduction, histogram conversion, face recognition, high frequency cut-off filtering, angle conversion, size conversion, saturation conversion, brightness conversion, or template matching to a process of generating at least one of the first image information 615 and the second image information, the first image information may be generated as another image information different from the information 610 to be displayed.

In an electronic device, a first display and a second display are disposed to overlap each other, so that a plurality of physical layers may be formed. For example, by implementing visual effect with a combination of visual representations of each of a plurality of physical layers, an electronic device may derive relatively excellent visual effect compared to when visual representation for the same or similar visual effect is implemented through software image processing on a display having a single physical layer.

FIG. 6B is a view illustrating a 3D effect display of an electronic device based on image copy according to various embodiments of the present disclosure.

Referring to FIG. 6B, a display control module (for example, the display control module 170) of an electronic device may copy the 2D image 640 to generate a plurality of copy images 641 and 642 in order to convert the 2D image to be displayed through the first display and/or the second display into a 3D image and display the 3D image. At this point, each of the plurality of copy images 641 and 642 may be the same image as the 2D image 640 or may be generated by applying image processing for 3D effect to the 2D image 640. According to an embodiment, a display control module may perform 3D rendering on a 2D image to generate the copy images 641 and 642.

FIG. 6C is a view illustrating a 3D effect display of an electronic device based on image copy modification according to various embodiments of the present disclosure.

Referring to FIG. 6C, when information to be displayed through the first display and/or the second display is a complex image 650 including a plurality of layers, a display control module (for example, the display control module 170) of an electronic device may distinguish objects 651, 652, and 653 for each layer to perform image processing (for example, 3D rendering) on the objects 651, 652, and 653 for each layer in the same manner or differently. According to an embodiment, a display control module may process the border for the first object 651 to be clear and adjusts the size of the first object 651 to a certain size or a size set according to a comparison with another object (for example, the second object 652 or the third object 653), so as to generate a first conversion object 661 corresponding to the first object 651. A display control module may adjust the sharpness and size of the second object 652 based on the first conversion object 661 to generate a second conversion object 662 corresponding to the second object 652. A display control module may adjust the sharpness and size of the third object 653 based on at least one of the first conversion object 661 and the second conversion object 662 to generate a third conversion object 663 corresponding to the third object 653. According to an embodiment, a display control module may adjust a relative arrangement position between the conversion objects 661, 662, and 663.

According to various embodiments of the present disclosure, a display control module may analyze a source image 610, 640, or 650, calculate a parameter to be applied to an expression of visual effect (for example, 3D or depth) according to an analysis result, and apply the calculated parameter to a source image or an object in a source image, so as to perform image processing.

Figure 7:
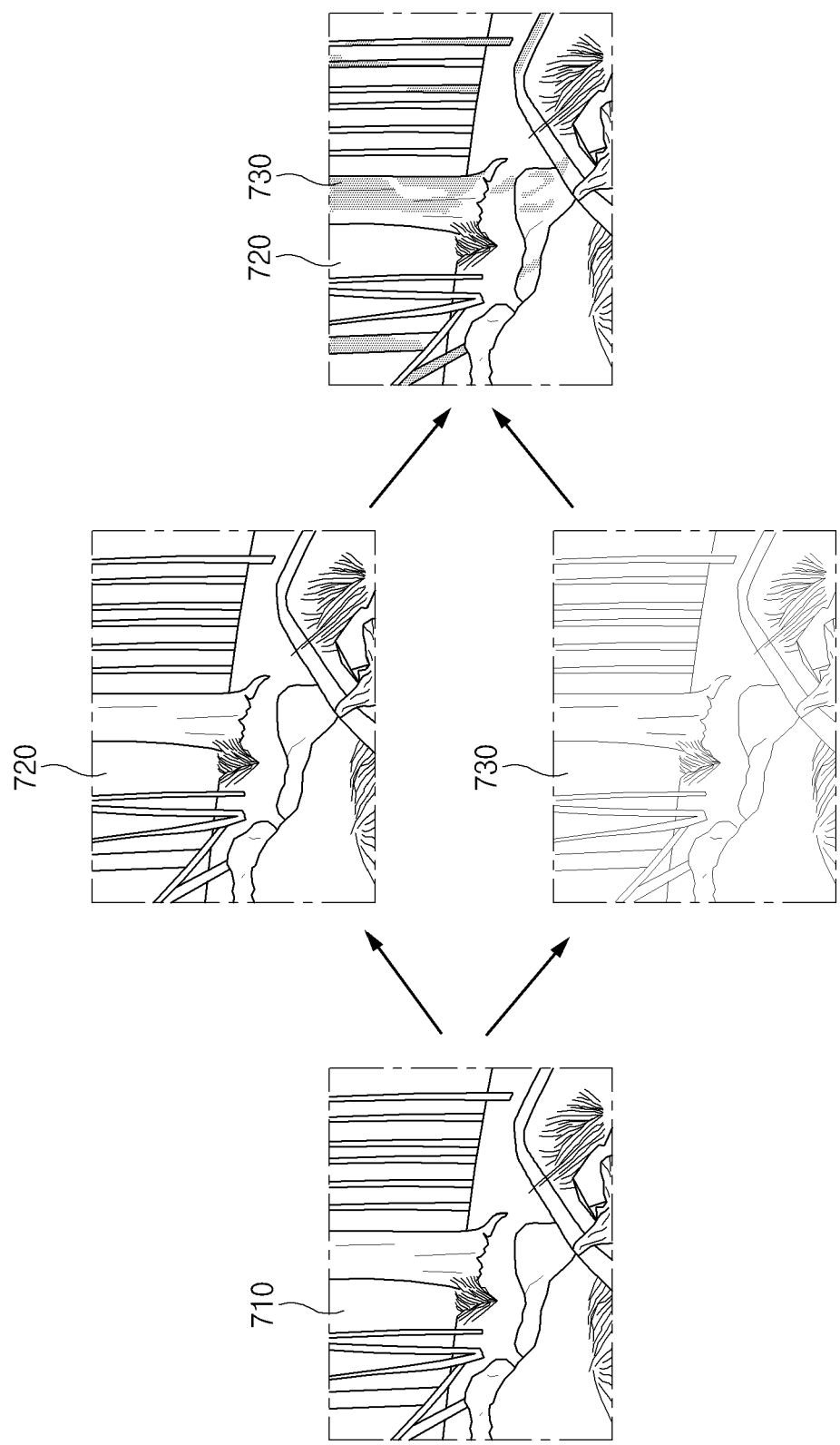
FIG. 7 is a view of displaying one 3D image for a given image through a plurality of displays functionally connected to an electronic device according to various embodiments of the present disclosure.

FIG. 7 is a view of displaying one 3D image for a given image through a plurality of displays functionally connected to an electronic device according to various embodiments of the present disclosure. An electronic device (for example, the electronic device 101) may include a plurality of displays including at least a first display (for example, the first display 151) and a second display (for example, the second display 152). The second display 320, for example, may include a transparent display area (for example, the transparent display area 153) and according to a relative position between the first display and the second display, at least part of information displayed on the first display may be formed to be seen through the transparent display area.

Referring to FIG. 7, a display control module (for example, the display control module 170) of an electronic device may perform a control function on a plurality of displays to display first information (for example, at least one of a left-eye image 720 and a right-eye image 730) relating to information 710 (for example, a 2D image) to be displayed through the first display and display second information (for example, the other one of the left-eye image 720 and the right-eye image 730) relating to information to be displayed through the second display. Through this, since first information and second information are provided through a method of overlapping and displaying information (for example, a 3D red/blue method), a method of displaying information through each display using an additional filter (for example, a polarization filter) in each display (for example, a 3D polarizing method), or a method of displaying information by a time-sharing through each display (for example, a 3D shutter glass method), more a variety of information may be provided or more visual effects may be derived.

According to an embodiment, a display control module may generate or obtain the left-eye image 720 and the right-eye image 730 of a 3D image to be displayed in order to effectively display the 3D image. The display control module 170 may assign the left-eye image 720 to one of the first display and the second display and the right-eye image 730 to the other one. The display control module may control the first display and the second display through various methods according to a 3D image implementation method (for example, a red/blue glasses method, a shutter glass method, or a polarization method).

According to an embodiment, when the left-eye image 720 is assigned to the first display, the right-eye image 730 is assigned to the second display, and a 3D image implementation method is a red/blue glasses method, the display control module may perform a control function to allow the first display to display the left-eye image 720 through a red filter based image processing process and allow the second display to display the right-eye image 730 through a blue filter based image processing process.

According to an embodiment, when a 3D image implementation method is a shutter glass method, a display control module may perform a control function on the first display and the second display to alternately display a first image (for example, the left-eye image 720) assigned to the first display and a second image (for example, the right-eye image 730) assigned to the second display through a time-sharing manner. Through this, an electronic device may implement a 3D image and derive the effect that an image is displayed at a frame rate obtained by combining each frame rate displayable in the first display and the second display. Therefore, a 3D image may be displayed with more excellent performance (for example, flicker phenomenon reduction). For example, an electronic device may display an image at 60 frames per second (FPS) through the first display and may display an image at 60 FPS through the second display. When a 3D image is displayed alternately in a time-sharing method through the first display and the second display by applying this embodiment, an electronic device provides the left-eye image 720 and the right-eye image 730 at 60 FPS, so that the effect that an image is displayed at a total of 30 FPS may be derived.

According to an embodiment, when a 3D image implementation method is a polarization method, a display control module may perform a control function on the first display and the second display to display a first image assigned to the first display by applying a polarization angle corresponding to one of the left eye and the right eye and display a second image assigned to the second display by applying a polarization angle corresponding to the other of the left eye and the right eye. Another 3D image implementation method may be also applicable and by using a plurality of displays, on the basis a multi-view image or gaze recognition, a 3D image may be implemented using a 2D image displaying method.

Figure 8A:
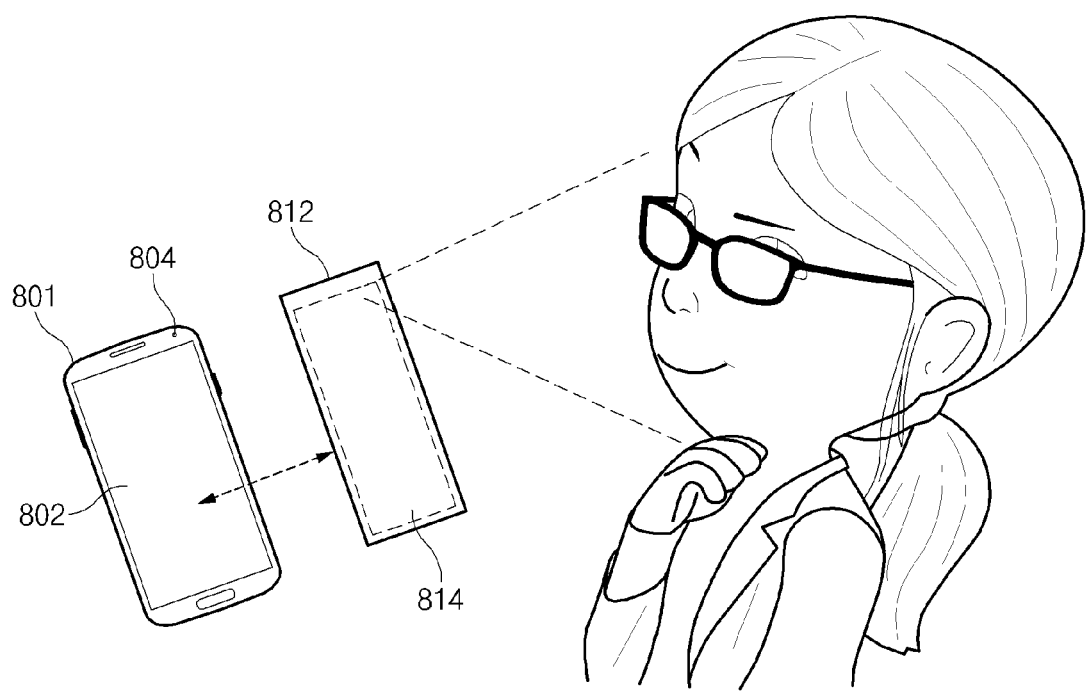
FIG. 8A is a view illustrating a mirror function of a face recognition based electronic device according to various embodiments of the present disclosure.
Figure 8B:
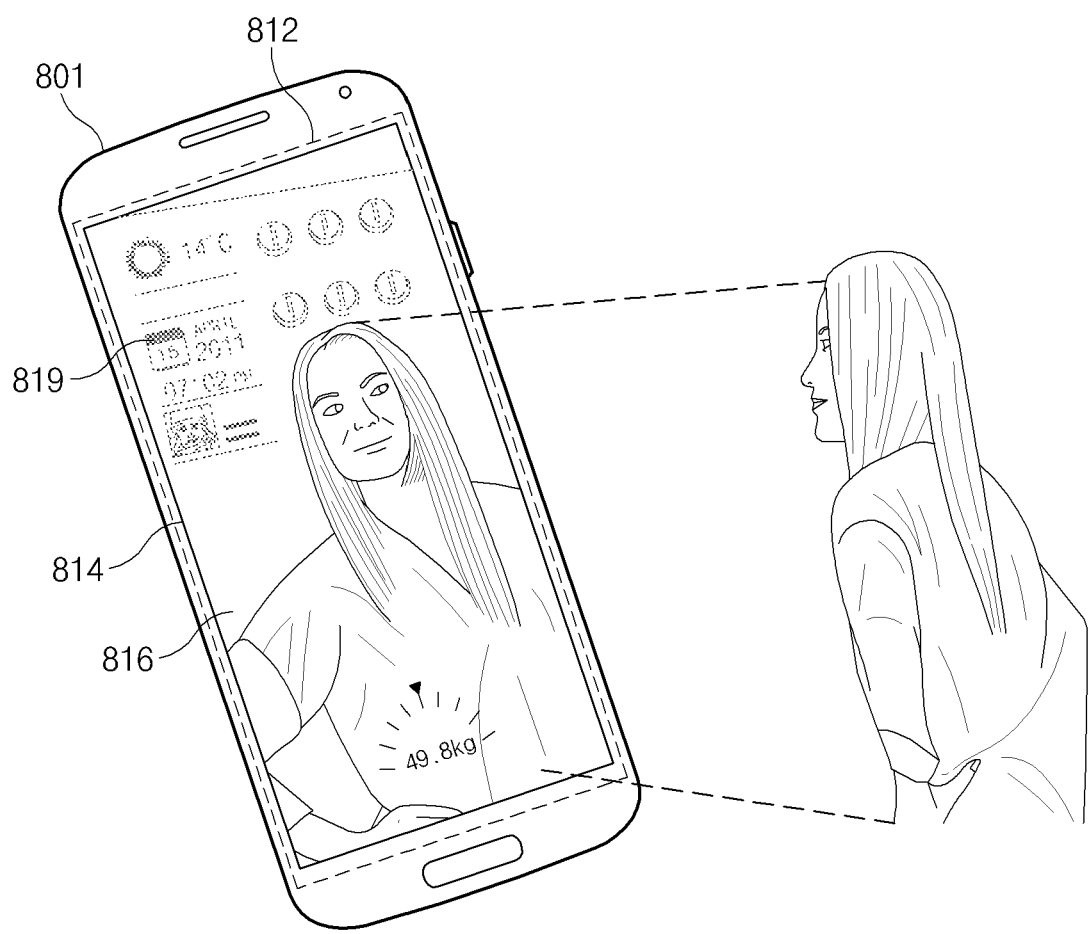
FIG. 8B is a view illustrating a mirror function of an electronic device for displaying additional information according to various embodiments of the present disclosure.
Figure 8C:
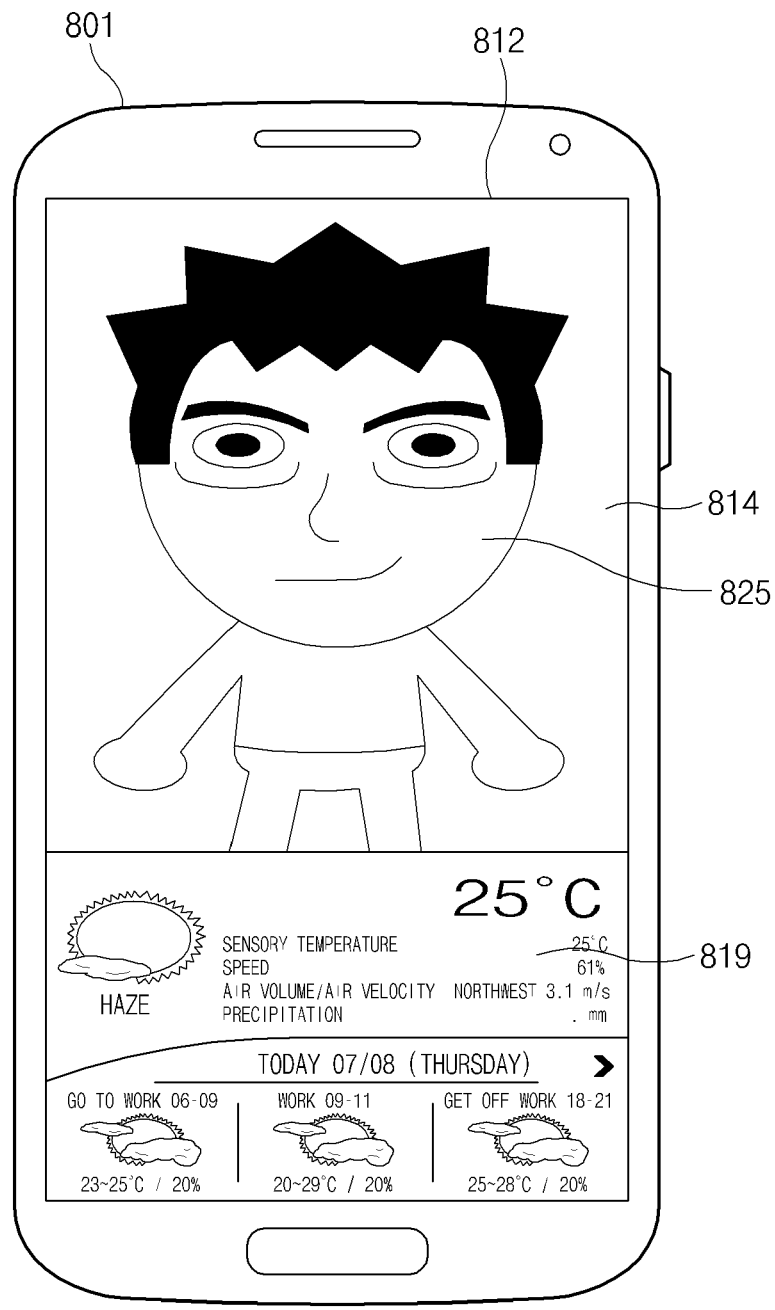
FIG. 8C is a view illustrating a mirror function of an electronic device for displaying avatar content according to various embodiments of the present disclosure.

FIGS. 8A, 8B, and 8C are views of using a transparent display area as a mirror display area in an electronic device according to various embodiments of the present disclosure. An electronic device (for example, the electronic device 101) may include a plurality of displays including at least a first display 802 (for example, the first display 151) and a second display 812 (for example, the second display 152). The second display 812, for example, may include a transparent display area 814 (for example, the transparent display area 153) and according to a relative position between the first display 802 and the second display 812, at least part of information displayed on the first display 802 may be formed to be seen through the transparent display area. In the transparent display area 814, transparency adjustment may be possible. An electronic device may additionally include a front camera sensor for recognizing a user's face.

FIG. 8A is a view illustrating a mirror function of a face recognition based electronic device according to various embodiments of the present disclosure.

Referring to FIG. 8A, an electronic device 801 may include a camera sensor for recognizing a use's face (for example, a front camera sensor 804 and a dynamic vision sensor (DVS)) or a motion recognition sensor (for example, an ambient light sensor, a 3D depth sensor, a gesture sensor, an acceleration sensor, a gyro sensor, and an earth magnetic sensor). According to an embodiment, the electronic device 801 may obtain information on a user's face or a user's movement through a partial transparent area or a partial blank area of the second display by using a camera sensor. According to another embodiment, the electronic device 801 may obtain information on a user's movement by using a motion recognition sensor.

Referring to FIG. 8A, when a user's face is recognized by using the front camera sensor 804, a display control module (for example, the display control module 170) of an electronic device may adjust the transparency or reflectivity of the transparent display area 814 to perform a control function on the second display to allow the transparent display area 814 to function as a mirror.

According to an embodiment, a display control module may adjust the transparency or reflectivity of a corresponding partial area to allow a specified partial area to function as a mirror based on a user's input in a transparent display area.

According to an embodiment, a display control module may adjust the transparency or reflectivity of a transparent display area to allow at least part of information of the first display area to be transmitted through the transparent display area and seen and also allow a user's face image to be reflected and seen while overlapping the transmitted at least part of information of the first display area at the same time.

FIG. 8B is a view illustrating a mirror function of an electronic device for displaying additional information according to various embodiments of the present disclosure.

Referring to FIG. 8B, when a user's face is recognized by using the front camera sensor 804, a display control module (for example, the display control module 170) of an electronic device may adjust the transparency of the transparent display area 814 to change it into a mirror display area 816 and simultaneously display additional information 819 (for example, date, weather, news, schedule, temperature, weight, environmental information, clock, calendar, image information, text information, icon, or situation recognition information) on the mirror display area 816. According to an embodiment, a display control module may perform a control function on the second display to allow additional information to overlap a user's face image reflected by a mirror display area.

According to an embodiment, the additional information may obtain user's context information (for example, position, time, surrounding environment, or health) by using a situation recognition technique and may generate additional information (for example, news, weather, schedule, content recommendation, action guide, appearance guide or health guide) to be displayed on a mirror display area based on the obtained context information.

According to an embodiment, a display control module may perform a control function on a second display to display additional information on a specified partial area based on a user's input in a mirror display area.

According to an embodiment, the transparent display area 814 and the mirror display area 816 may be the same area. For example, the transparent display area 814 and the mirror display area 816 may provide a transparent function and a mirror function in the same area. According to another embodiment, the transparent display area 814 and the mirror display area 816 may be formed with different areas divided in one display or each separated display. For example, the transparent display area 814 and the mirror display area 816 may provide a transparent function and a mirror function in different areas.

FIG. 8C is a view illustrating a mirror function of an electronic device for displaying avatar content according to various embodiments of the present disclosure.

Referring to FIG. 8C, a display control module (for example, the display control module 170) of an electronic device may provide (for example, display) additional information corresponding to a user's situation in various expressions (for example, avatars). According to an embodiment, a display control module may generate avatar content 825 delivering audiovisual additional information to a user based on a recognized user's face or an existing stored image in response to a user's face or movement recognized through a front camera sensor (for example, the front camera sensor 804 and a DVS) or a motion recognition sensor (for example, an ambient light sensor, a 3D depth sensor, a gesture sensor, an acceleration sensor, a gyro sensor, and an earth magnetic sensor). The display control module displays the avatar content 814 in an area that at least partially overlaps or does not overlap a user's face image seen by reflection, so that more user friendly interface may be provided.

Figure 9A:
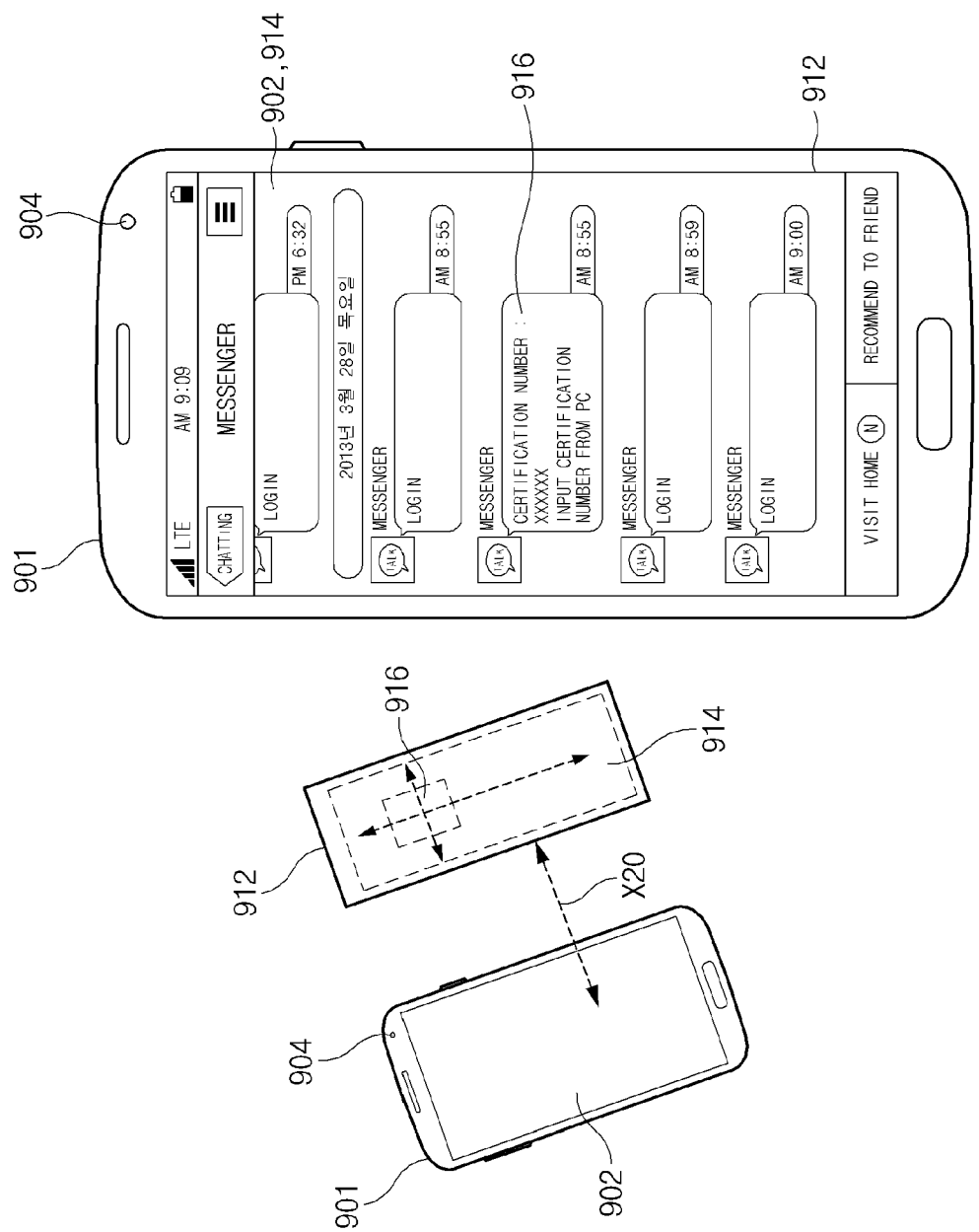
FIG. 9A is a view illustrating a partial non-transmission control in a transparent area of an electronic device according to various embodiments of the present disclosure.
Figure 9B:
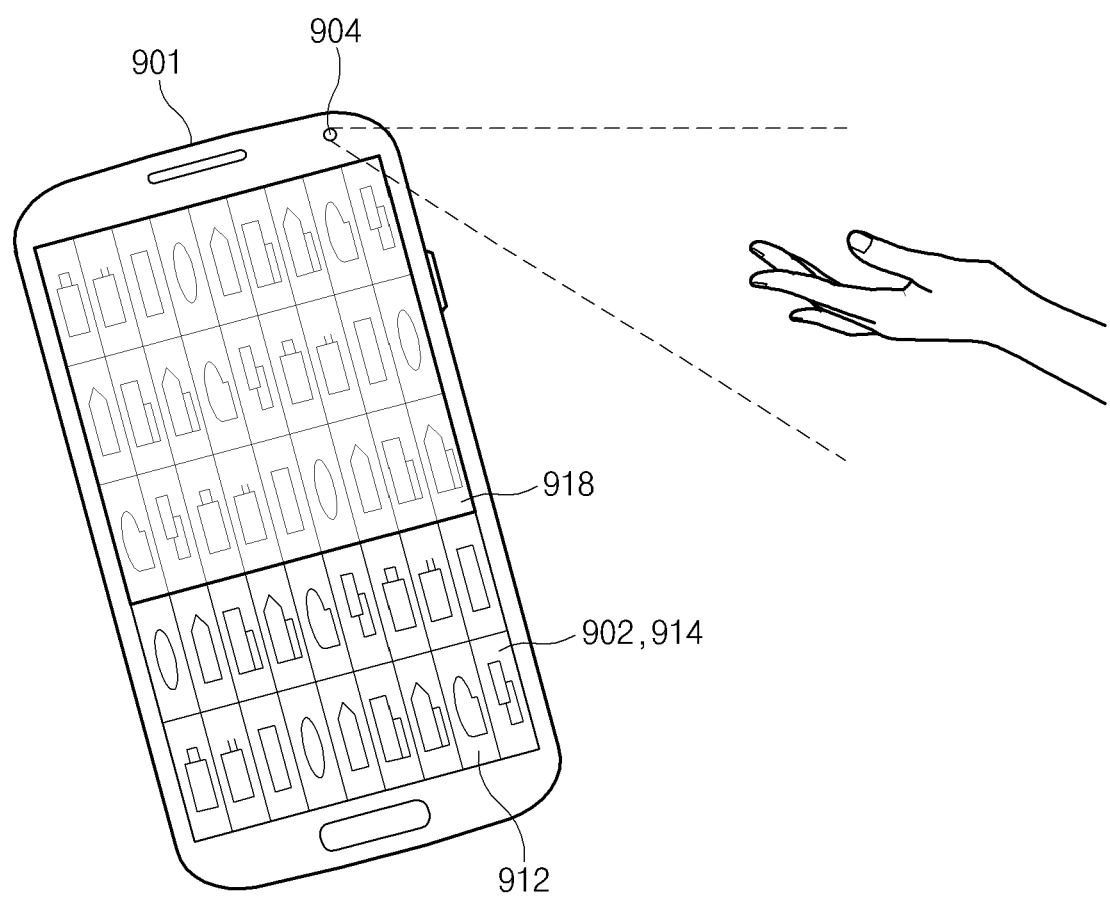
FIG. 9B is a view illustrating a display status control depending on a camera input according to various embodiments of the present disclosure.

FIGS. 9A and 9B are views of adjusting transparency of a portion of a transparent display area to selectively display information in an electronic device according to various embodiments of the present disclosure.

FIG. 9A is a view illustrating a partial non-transmission control in a transparent area of an electronic device according to various embodiments of the present disclosure.

Referring to FIG. 9A, an electronic device 901 (for example, the electronic device 101) may include a plurality of displays including at least a first display 902 (for example, the first display 151) and a second display 912 (for example, the second display 152). The second display 912, for example, may include a transparent display area 914 (for example, the transparent display area 153) and according to a relative position between the first display 902 and the second display 912, at least part of information displayed on the first display 902 may be formed to be seen through the transparent display area 914 and information may be displayed selectively by adjusting the transparency of a partial area 916 of the transparent display area 914. In the transparent display area 914, transparency adjustment may be possible. The electronic device 901 may further include a sensor for recognizing a user's input (for example, a touch sensor relating to at least one of first display 901 and the second display 912, a digitizer, a gesture sensor, a front camera sensor 904, a DVS or a motion recognition sensor (for example, an ambient light sensor, a 3D depth sensor, a gesture sensor, an acceleration sensor, a gyro sensor, and an earth magnetic sensor).

Referring to FIG. 9A, when at least a portion (for example, the transparent display area 914) of the second display 912 covers the first display 902, the electronic device 901 may specify part of information displayed on the first display 902 based on a user's input recognized through a front camera sensor (for example, the front camera sensor 904, a DVS or a motion recognition sensor (for example, an ambient light sensor, a 3D depth sensor, a gesture sensor, an acceleration sensor, a gyro sensor, and an earth magnetic sensor). The user input may be an input for designating a partial area of the first display 902 and in this case, information displayed in the specified partial area may be specified as partial information.

According to an embodiment, a display control module (for example, the display control module 170) of the electronic device 902 may adjust the transparency of the partial area 916 in the transparent display area so as to prevent the specified partial information from being transmitted and seen through the transparent display area 914 or the first display 902. The partial area 916 in the transparent display area may be an area (for example, an area specified with the same relative coordinates as a partial area of the first display 902) corresponding to a partial area of the first display 902.

According to an embodiment, a display control module (for example, the display control module 170) of the electronic device 901 may differently adjust the transparencies of the partial area 916 of the transparent display specified through the transparent display area 914 or the first display 902 and the remaining transparent display area other than the specified partial area. The partial area 916 of the transparent display area may adjust its transparency to allow the visibility of information of the first display 902 to be a first visibility state (for example, when the information of the first display 902 is not seen or even though it is seen, its content is illegible) and also the remaining transparent display area may adjust its transparency to allow the visibility of the information of the first display 902 to be a second visibility state (for example, the information of the first display 902 is barely legible).

According to an embodiment, a display control module (for example, the display control module 170) of the electronic device 902 may adjust the transparency of the transparent display area 914 so as to prevent the information displayed on the first display 902 from being transmitted and seen through the transparent display area 914.

According to various embodiments of the present disclosure, a display control module of the electronic device 901 may change the position of the partial area 916 of a transparent display area corresponding to specified partial information based on the movement of the specified partial information of the first display 902. The display control module may adjust the partial area 916 of the transparent display area to be opaque in response to a user input and may change the position of the partial area 916 of the transparent display area based on that the specified partial information is moved and displayed through the first display 902 due to the display of another information (for example, messenger input, screen scroll, or screen movement).

According to an embodiment, a display control module may adjust a property (for example, brightness, size, shape, color, saturation, sharpness, contrast, or an array of liquid crystal molecules) other than the transparency of the partial area 916 of the transparent display area. The display control module may set different viewing angles of image information seen through the partial area 916 of the transparent display area by adjusting the property of the partial area 916 of the transparent display area. A display control module may perform a control function on at least a partial area of the second display 912 to be seen from the front but not seen from the side when the viewing angle of image information displayed through a partial area of a transparent display area is adjusted and information is shown through a corresponding partial area.

FIG. 9B is a view illustrating a display status control depending on a camera input according to various embodiments of the present disclosure.

Referring to FIG. 9B, while at least a portion (for example, the transparent display area 914) of the second display 912 covers the first display 902, the electronic device 901 may recognize a gesture input through the front camera sensor 904. A display control module (for example, the display control module 170) of the electronic device may adjust the transparency of at least a portion of a transparent display area based on the recognized gesture input to perform a control function on the second display 912 to allow at least a portion of the transparent display area 914 to change into an opaque display area 918. The opaque display area 918 may be specified based on a gesture input (for example, a gesture direction, such as up, down, left, right, front, or back, a gesture size, a gesture form, a gesture time, or a gesture range). The display control module may perform a control function to allow at least part of the information displayed on the first display 902 to be hidden and invisible by the specified opaque display area 916. According to an embodiment, the display control module may control the first display through at least one of the brightness adjustment, pixel control (for example, pixel off), or color change of the first display 902 corresponding to the opaque display area. According to an embodiment, the display control module may perform a control function on the second display 912 through at least one of the brightness adjustment, size adjustment, transparency adjustment, form change, position change, saturation adjustment, sharpness adjustment, contrast adjustment, or array adjustment of liquid crystal molecules of the opaque display area 916.

FIGS. 10A, 10B, 10C, 10D, 10E, 10F, 10G, 10H, 10I, 10J, and 10K are views when an electronic device controls a plurality of displays according to a user input according to various embodiments of the present disclosure.

Figure 10A:
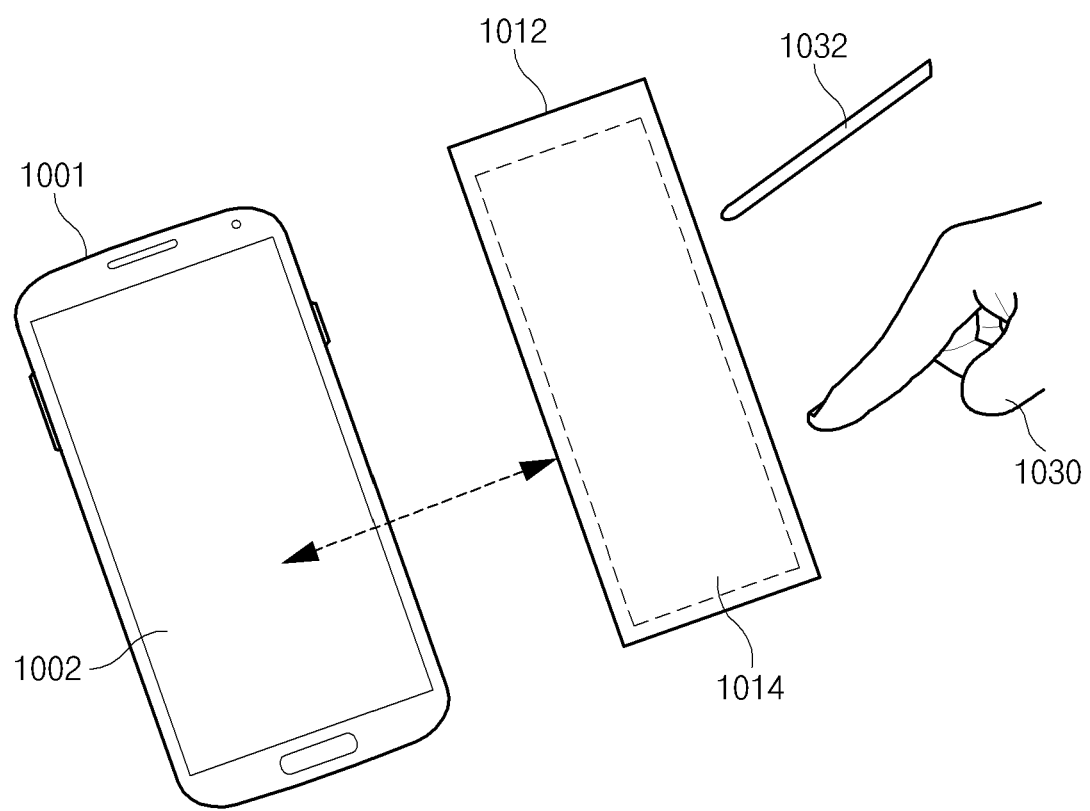
FIG. 10A is a view illustrating a touch input of a display in an overlapping state according to various embodiments of the present disclosure.

FIG. 10A is a view illustrating a touch input of a display in an overlapping state according to various embodiments of the present disclosure.

Referring to FIG. 10A, an electronic device 1001 (for example, the electronic device 101) may include a plurality of displays including at least a first display 1002 and a second display 1012. The second display 1012, for example, may include a transparent display area 1014 and according to a relative position between the first display 1002 and the second display 1012, at least part of information displayed on the first display 1002 may be formed to be seen through the transparent display area 1014. In the transparent display area, transparency adjustment may be possible. The electronic device 1001 may further include a sensor (for example, a touch sensor, a digitizer, a gesture sensor, a proximity sensor, an image sensor, and a 3D depth sensor) detecting a touch input or proximity input (for example, hovering) relating to at least one of the first display 1002 and the second display 1012.

Referring to FIG. 10A, while at least a portion (for example, a transparent display area) of the second display 1012 covers the first display 1002, the electronic device 1001 may detect at least one of a touch input, a gesture input, or a proximity input relating to at least the portion (for example, a transparent display area) of the second display 1012. At least one of a touch input, a gesture input, or a proximity input may be performed by part of a user's body (for example, a finger 1030) or another object (for example, an e-pen 1032). According to an embodiment, the electronic device 1001 may control the transparent display area 1014 and the second display 1012 and also the first display 1002 based on a user input (for example, the finger 1030, a gesture, or the e-pen 1032) relating to the transparent display area 1014. The electronic device 1001 may adjust the property of the first display 1002 or may determine information to be displayed on the first display 1002 and a function or application to be executed in the first display 1002 based on a user input (for example, the finger 1030, a gesture, or the e-pen 1032) relating to the transparent display area 1014.

According to an embodiment, while the first display 1002 is partially opened to the second display 1012, the electronic device 1001 may detect at least one of a touch input, a gesture input, or a proximity input relating to the first display 1012. At least one of a touch input, a gesture input, or a proximity input may be performed by part of a user's body (for example, a finger) or another object (for example, an e-pen). According to an embodiment, the electronic device 1001 may control at least one of the transparent display area 1014 and the second display 1012 in addition to the first display 1002 based on a user input relating to the first display 1002. The electronic device 1001 may adjust the property of the transparent display area 1014 (for example, size, shape, brightness, color, saturation, sharpness, contrast, permeability, transparency, gamma, resolution, contrast ratio, viewing angle, color reproduction, color temperature, or tone linearity) or may determine information to be displayed on the transparent display area 1014 and a function or application to be executed in the transparent display area 1014 based on a user input relating to the first display 1002.

Figure 10B:
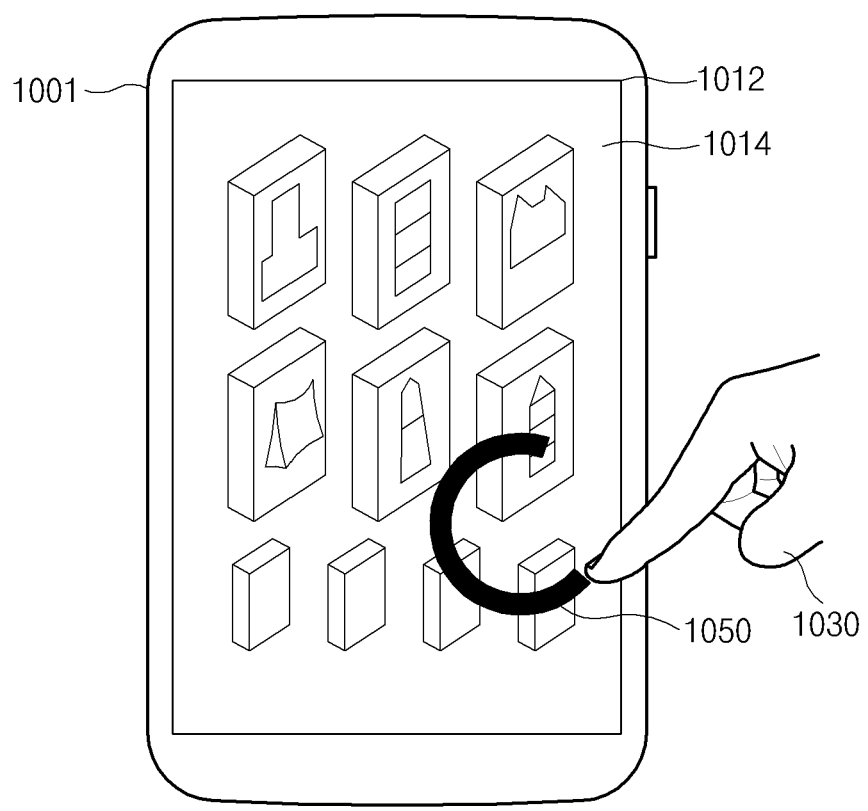
FIG. 10B is a view illustrating a gesture input of a display in an overlapping state according to various embodiments of the present disclosure.

FIG. 10B is a view illustrating a gesture input of a display in an overlapping state according to various embodiments of the present disclosure.

Referring to FIG. 10B, while at least a portion (for example, the transparent display area 1014) of the second display 1012 covers the first display 1002, the electronic device 1001 may recognize characters from a user input (for example, a swipe input, a gesture input, or a writing input) relating to at least a portion (for example, the transparent display area 1014) of the second display 1012. Herein, the characters may include alphabets, numbers, Chinese, Korean, or symbols. The electronic device 1001 may recognize a continuous touch or proximity input by an external object (for example, the finger 1030 or the e-pen 1032) to obtain a plurality of positions (for example, coordinates) corresponding to a touch or proximity input and may compare the shape formed by connecting the obtained positions and pre-stored characters to extract the character having the highest similarity. The electronic device 1001 may execute a function or application corresponding to the extracted character through at least one of the first display 1002, the second display 1012, and the transparent display area 1014.

According to an embodiment, when a specific character 1050 (for example, "C") is inputted, the electronic device 1001 may perform an application or function mapping into the specific character and stored in advance. According to an embodiment, the function mapping into the specific character may include a function for capturing information displayed on the first display 1002 or information displayed on the transparent display area 1014. For example, by recognizing the information displayed on the first display 1002 and the information displayed on the transparent display area 1014 as images, at least one of a capture image of the first display 1002 and a capture image of the transparent display area 1014 may be generated or an image combining the capture image of the first display 1002 and the capture image of the transparent display area 1014 may be generated. According to an embodiment, one image may include a display layer (for example, S/W, a graphic processor, or a graphic display layer configured by a processor) corresponding to the capture image of the first display 1002 and a display layer corresponding to the capture image of the transparent display area 1014 and may be stored.

According to an embodiment, additionally or alternately, at least part of the information (for example, text, image, or video) displayed on the first display 1002 may be captured or stored through touch, proximity input, or key input in the transparent display area 1014 partially overlapping the first display 1002.

Figure 10C:
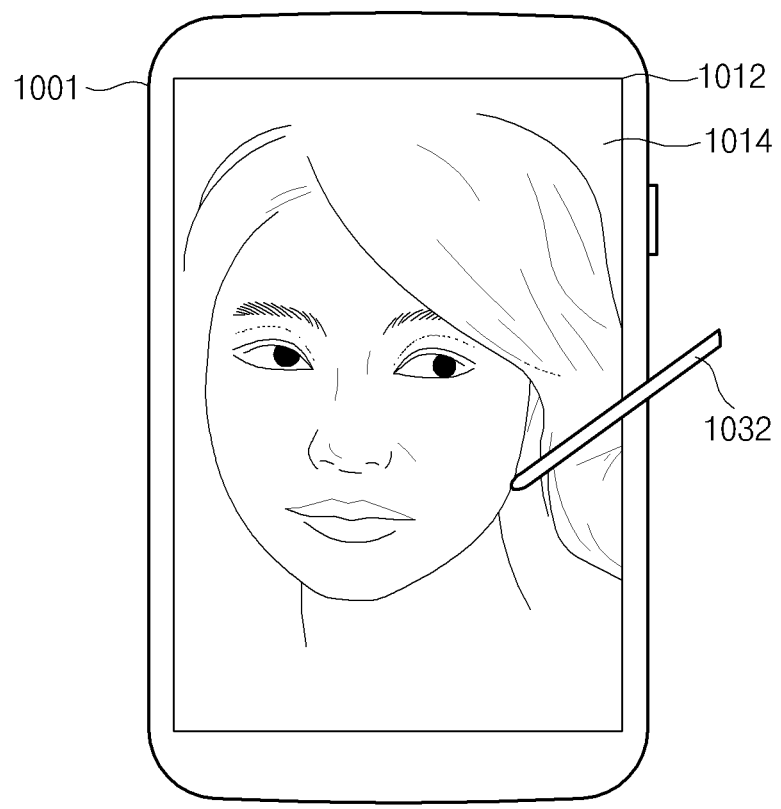
FIG. 10C is a view illustrating a drawing input of a display in an overlapping state according to various embodiments of the present disclosure.

FIG. 10C is a view illustrating a drawing input of a display in an overlapping state according to various embodiments of the present disclosure.

Referring to FIG. 10C, while at least a portion (for example, the transparent display area 1014) of the second display 1012 covers the first display 1002, the electronic device 1001 may recognize sketch or drawing created by a user from a user input 1032 relating to at least the portion (for example, the transparent display area 1014) of the second display 1012. According to an embodiment, the electronic device 1001 recognizes the recognized sketch or drawing as a result that the user traces information (for example, an image) displayed on the first display 1002, thereby mapping the result into the information displayed on the first display 1002 and storing it. According to an embodiment, the electronic device 1001 may generate an image combining the recognized sketch or drawing and the information displayed on the first display 1002. The electronic device 1001 may map the generated image into the information displayed on the first display 1002 or may store the generated image separately from the information displayed on the first display 1002. According to an embodiment, one image may be stored including a display layer corresponding to the information displayed on the first display 1002 or a display layer corresponding to sketch or drawing.

According to an embodiment, when the transparent display area 1014 is at least partially opened to the first display 1002 by the position movement of the second display 1012, the electronic device 1001 (for example, the electronic device 101) may display sketch or drawing inputted through the transparent display area 1014 on the first display 1002. Sketch or drawing may be displayed in addition to the information displayed on the first display 1002 or may be displayed instead of the information displayed on the first display 1002.

Figure 10D:
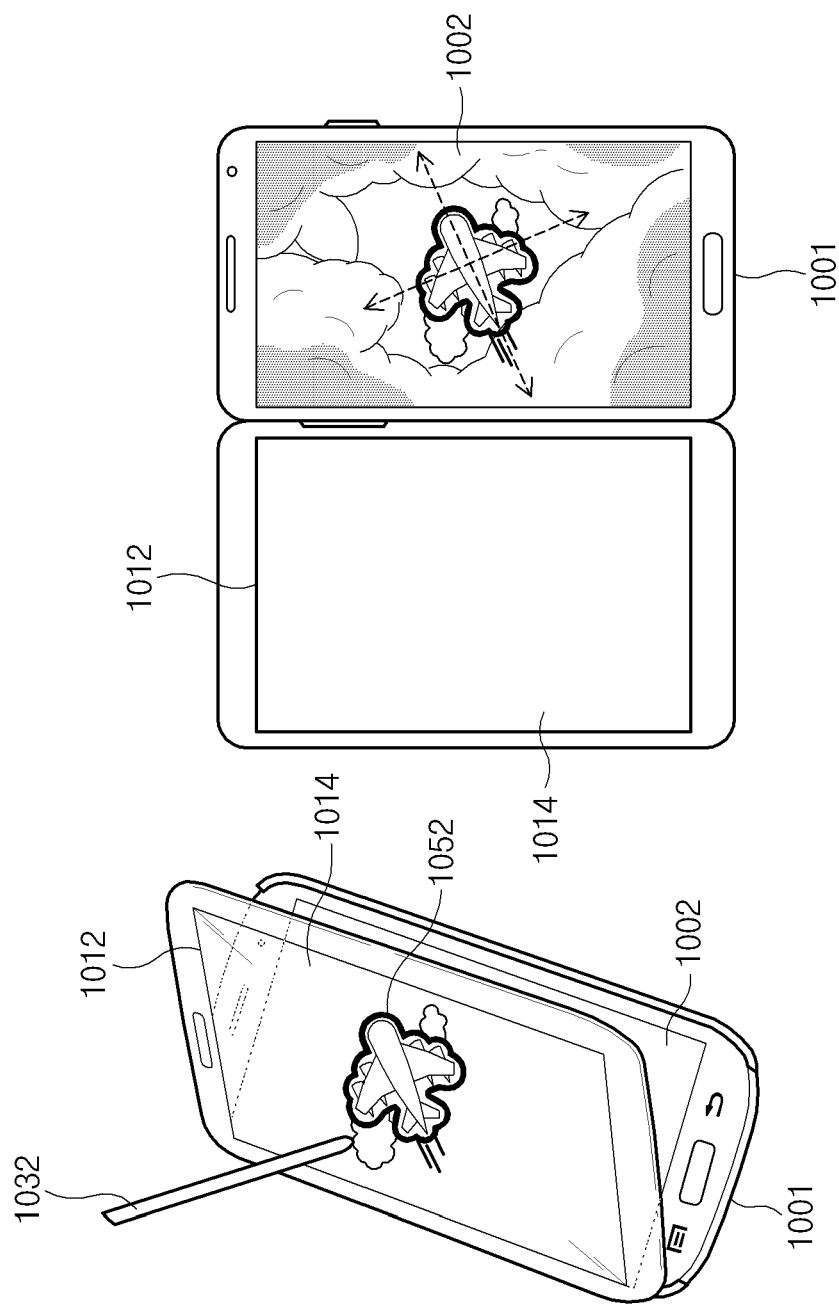
FIG. 10D is a view illustrating information clipping of a display in an overlapping state according to various embodiments of the present disclosure.

FIG. 10D is a view illustrating information clipping of a display in an overlapping state according to various embodiments of the present disclosure.

Referring to FIG. 10D, the electronic device 1001 may select (for example, clip) at least one object 1052 from objects (contents, such as a text, an image, video, and the like, or interface objects, such as a window, a button, a menu, a bar, and the like) displayed on the first display 1002 or the transparent display area 1014, based on a user input (a touch input or proximity input (for example, hovering or gesture) by using the e-pen 1032 or a user's hand) detected in relation to at least a portion (for example, the transparent display area 1014) of the second display 1012. For example, when the first display 1002 is covered by the transparent display area 1014, an object displayed on the first display 1002 may be clipped through the transparent display area 1014. When the first display 1002 is partially opened to the transparent display area 1014, an object displayed on the first display 1002 may be clipped through the transparent display area 1014.

According to various embodiments of the present disclosure, the electronic device 1001 may display the form or movement of the generated (for example, sketched or drawn) or clipped object 1052 in relation to another information displayed on at least one corresponding display or separately from the other information through at least one of the first display 1002 and the second display 1012. According to an embodiment, the electronic device 1001 may generate a video or motion image (for example, gif file) obtained by reflecting the form or movement of the object 1052 to store it or display it through at least one proper display (for example, the first display 1002).

In order to display the form or movement for the object 1052, at least one display layer may be used. According to an embodiment, the object 1052 may be displayed using at least one display layer provided (rendered) through the first display 1002 or another information relating to the object 1052 may be displayed using another display layer provided (for example, rendered) through the first display 1002. The two display layers (or image information displayed therein) may be controlled (for example, rendered) separately based on a user input or image characteristic. According to an embodiment, the electronic device 1001 may display the clipped or generated object 1052 in addition to existing information displayed on the first display 1002. While the transparent display area 1014 covers the first display 1002, as the second display 1012 moves to at least partially open the first display 1002 or a user input (for example, a gesture, a swipe, a single side touch, or a double sides touch) is inputted, the electronic device 1001 may move an object displayed to the transparent display area 1014 and may then display the object.

According to another embodiment, the electronic device 1001 may generate a new image object, for example, an image having the lines connecting user's inputs as the outline or a video in which such an image is configured to move according to an additional user input, in addition to the object displayed on the display 1002 or the transparent display area 1014, based on a user's line form input.

The electronic device 1001 may store the clipped or generated object 1052 in various forms. According to an embodiment, the object 1052 may be synthesized into an image obtained by capturing a screen of the first display 1002 and may then be stored. According to an embodiment, an image obtained by capturing the object 1052 may be stored separated from the image capturing the screen of the first display 1002. According to an embodiment, one image may be stored including a display layer corresponding to a screen of the first display 1002 and another display layer corresponding to the object 1052.

Figure 10E:
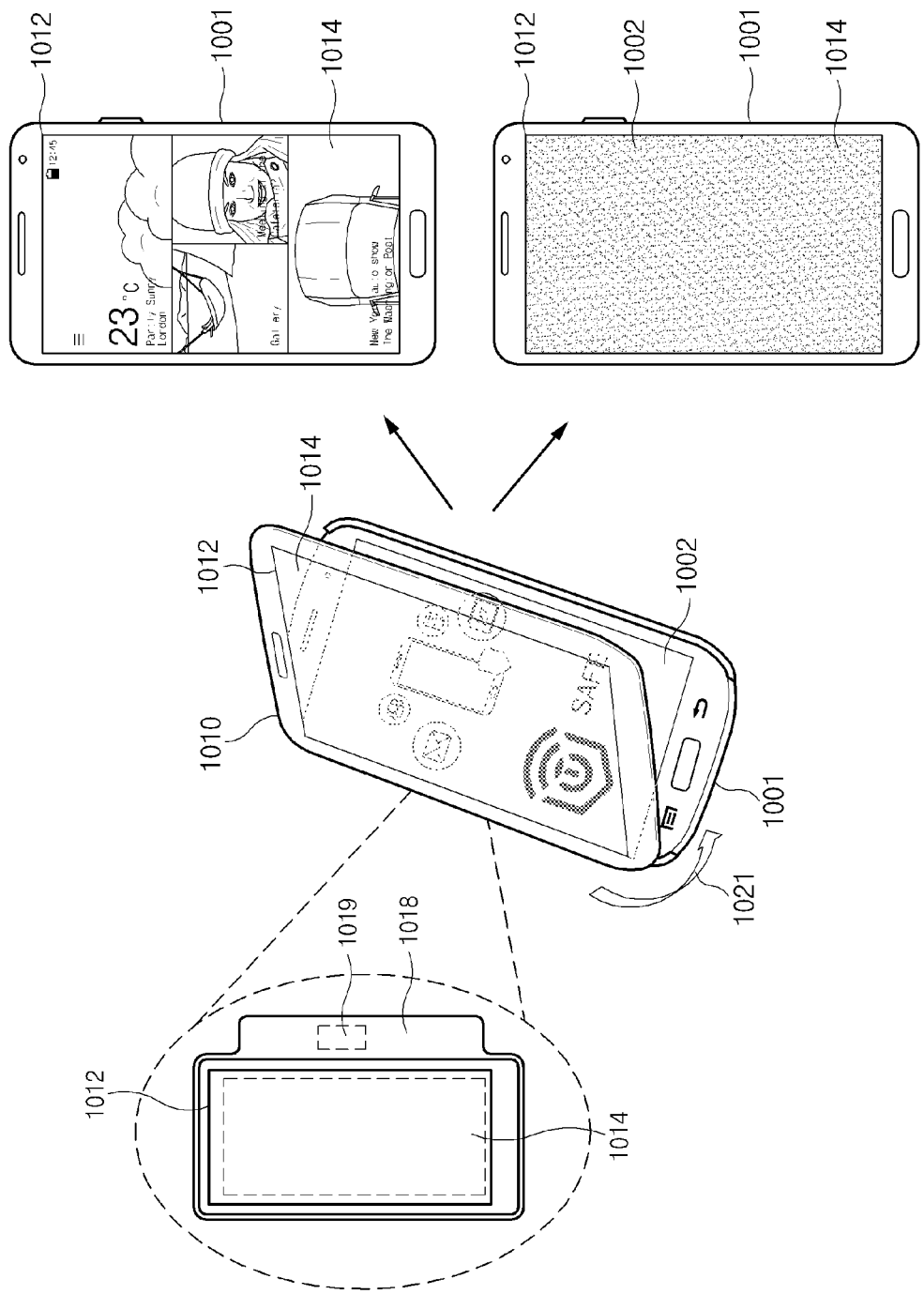
FIG. 10E is a view illustrating transparency adjustment according to opening information of a display according to various embodiments of the present disclosure.

FIG. 10E is a view illustrating transparency adjustment according to opening information of a display according to various embodiments of the present disclosure.

Referring to FIG. 10E, the electronic device 1001 may be connected to a cover 1010 including the second display 1012. For example, an angle detection sensor 1019 (for example, an angle detection sensor, an ambient light sensor, or a hole sensor) for detecting a connection angle between the electronic device 1001 and the cover 1010 is equipped on at least a portion (for example, a connection part 1018) of the electronic device 1001 or the cover 1010. Therefore, the opening degree 1021 (for example, angle, opening status, or ratio) of the cover 1010 may be detected.

According to an embodiment, the electronic device 1001 may execute a function, application, or security mode corresponding to a corresponding opening degree based on the opening degree of the cover 1010 detected through the angle detection sensor 1019. For example, while the cover 1010 is at least partially opened, as the cover 1010 is closed, if an application (for example, e-mail, personal information, a web browsing secure function, interne banking, or a security content displaying function) requiring security is executed through the first display 1002 and the cover 1010 is closed, the electronic device 1001 may adjust the transparency of a transparent display area to allow a corresponding application to be invisible or may provide a user interface (for example, background screen, application, watch, calendar, schedule, magazine, e-book, gallery, a phone function, or a messenger function) through a transparent display area.

According to an embodiment, the electronic device 1001 may display a visual representation corresponding to a corresponding opening degree (for example, an animation that a closed book is opened according to an opening degree or an effect that an activated area of the first display 1010 is increased or decreased according to an opening degree) through a first display or a transparent display based on the opening degree (for example, angle, opening status, or ratio) of the cover 1010 detected through the angle detection sensor 1019.

According to various embodiments of the present disclosure, the first display 1002 and the second display 1012 are connected to each other so that they may configure one flexible display module. According to an embodiment, while at least a partial area of a flexible display module is bent, the electronic device 1001 may detect the bending degree by using a sensor functionally connected to the electronic device 1001 and may control the display of the flexible display module based on the bending degree. For example, in order to prevent the display of another area hidden by a bent partial area from being transmitted through the bent partial area and seen, the transparency of the bent partial area may be adjusted or another information may be displayed in the bent partial area. According to an embodiment, at least one of the bent partial area or the hidden another area may be selected by a user's both sides touch on a corresponding display, additionally or alternately.

Figure 10F:
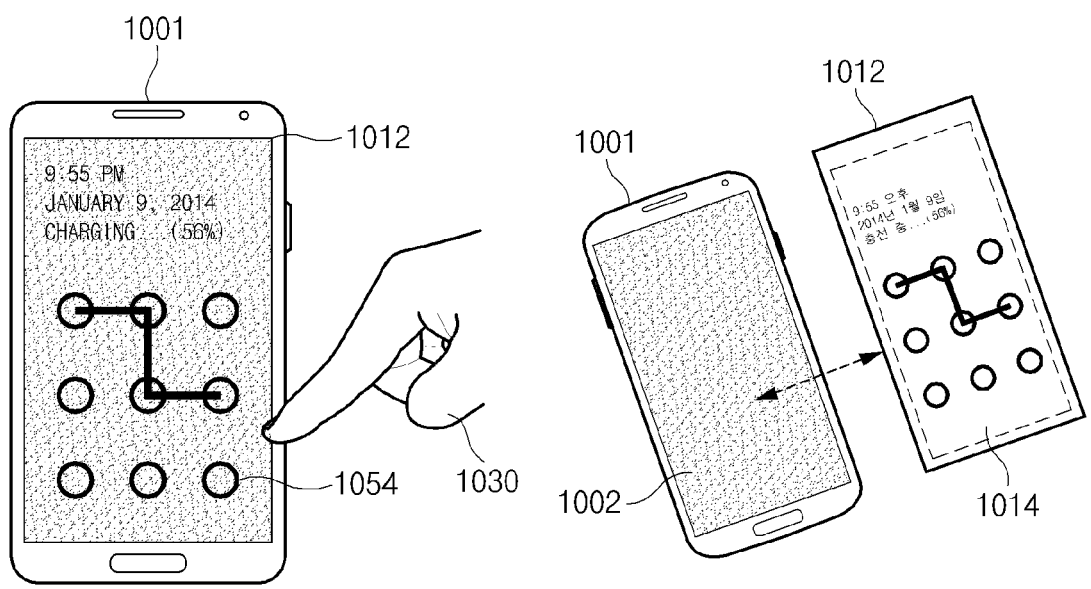
FIG. 10F is a view illustrating a lock function of an electronic device having a transparent area according to various embodiments of the present disclosure.

FIG. 10F is a view illustrating a lock function of an electronic device having a transparent area according to various embodiments of the present disclosure.

Referring to FIG. 10F, while at least a portion (for example, the transparent display area 1014) of the second display 1012 covers the first display 1002, if the electronic device 1001 enters a lock mode for limiting at least part of a display function of information through the first display 1002 or the second display 1012, the electronic device 1001 may receive a user input (for example, a pattern or a password) for releasing the lock mode through at least a portion (for example, the transparent display area 1014) of the second display 1012. The electronic device 1001 may release the lock mode by comparing a user input and pre-stored lock release information and may then activate the display function of information through the first display 1002 and the second display 1012.

According to an embodiment, while at least a portion (for example, the transparent display area 1012) of the second display 1012 covers the first display 1002, the electronic device 1002 may display a user interface screen for receiving a user input to release the lock mode. For example, a user interface screen for receiving a user input as a pattern displays a plurality of graphic components 1054 arranged spaced from each other, so that a user may be induced to input a pattern based on the displayed graphic components. The electronic device 1001 may recognize a continuous touch or proximity input by an external object (for example, the finger 1030 or the e-pen 1032) to obtain a plurality of positions (for example, coordinates) corresponding to a touch or proximity input and may then display a form formed by connecting the obtained positions through a user interface screen. The electronic device 1001 may adjust a setting (for example, brightness, display color (for example, black), and display on/off) of the first display 1002 and may then display such a user interface at least a portion (for example, the transparent display area 1014) of the second display 1012. Therefore, current consumption used for displaying the user interface may be reduced.

According to an embodiment, a screen lock mode may be released without displaying an additional graphic component for receiving a user input pattern. For example, according to an embodiment, while at least one display of the first display 1002 and the second display 1012 is being touched or at least a partial section is being placed at a proximity position (for example, in the case of hovering), on the basis that a user input (for example, finger movement) moving one point to another point in the at least one display, a screen lock mode for the first display 1002, the second display 1012, or the transparent display area 1014 may be simultaneously or separately released.

According to various embodiments of the present disclosure, while at least a portion (for example, the transparent display area 1014) of the second display 1012 covers the first display 1002, the electronic device 1001 may reduce the current consumption for displaying additional information (for example, watch, notification information, image information, text information, weather information, and status information of an electronic device). According to an embodiment, the electronic device 1001 may display additional information through at least a portion (for example, the transparent display area 1014) of the second display 1012 and may reduce the current consumption used for displaying the additional information by adjusting a setting (for example, brightness, display color (for example, black), or display on/off) of the first display 1002.

Figure 10G:
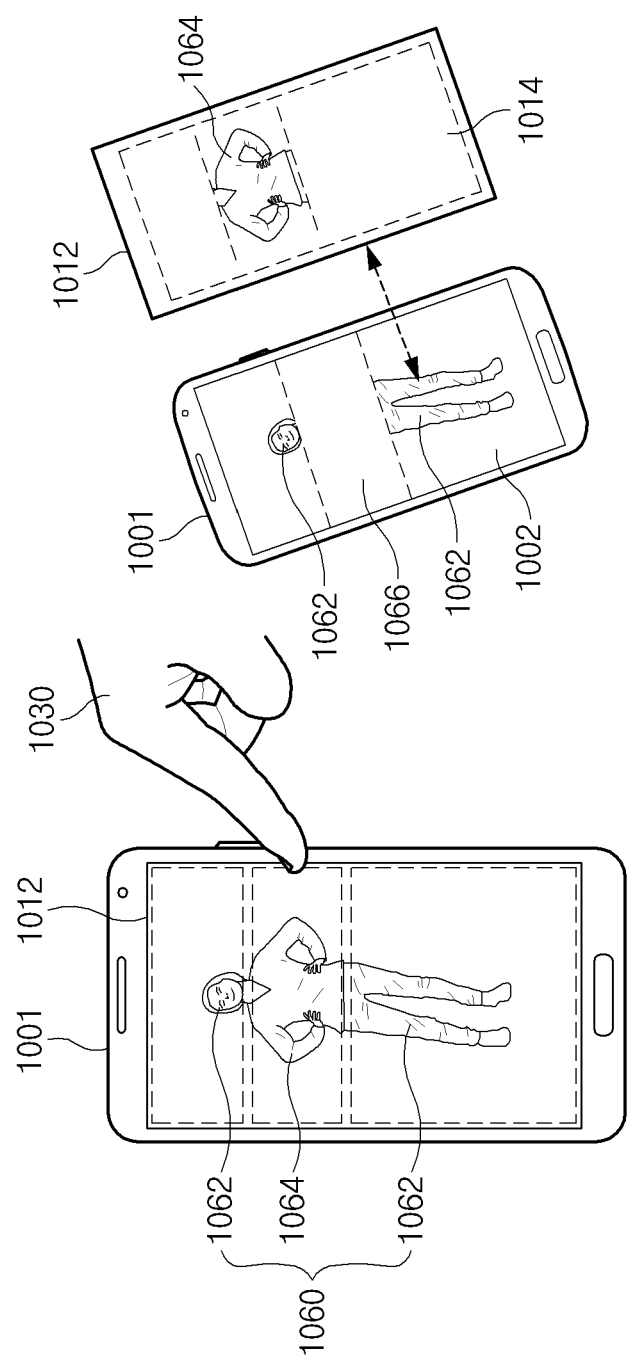
FIG. 10G is a view illustrating a content partial display of a display in an overlapping state according to various embodiments of the present disclosure.

FIG. 10G is a view illustrating a content partial display of a display in an overlapping state according to various embodiments of the present disclosure.

Referring to FIG. 10G, while at least a portion (for example, the transparent display area 1014) of the second display 1012 covers the first display 1002, the electronic device 1001 may display second information 1064 (for example, a second image) in the transparent display area 1014 at the same time in addition to first information 1062 (for example, a first image) displayed on the first display 1002, so that a state in which the first information 1062 and the second information 1064 are displayed at the same time may be delivered to a user as a kind of single information (for example, a third image 1060 obtained by synthesizing the first image and the second image).

According to an embodiment, if there is the possibility that part of information corresponding to transparent display area in the first information 1062 displayed on the first display blocks the display of the second information 1064 displayed on the transparent display area, a display control module of an electronic device may replace the express of the at least part of the information in the first information 1062 with another expression 1066 (for example, a white or black blank image or another image relating to the second information 1064), or may differently control a display function of a portion corresponding to the second information 1064 of the transparent display area 1014 in the first display 1002, than the remaining portion of the first display 1002 (for example, display white or black color, viewing angle adjustment, display by mirror, or brightness adjustment).

According to an embodiment, the electronic device 1001 may obtain one of the first information 1062 and the second information 1064 based on information received through communication (for example, WiFi, BT, NFC, GPS, cellular communication, USB, HDMI, RS-232, or POTS) between an external another device (for example, the electronic device 104) or a server (for example, the server 106). For example, the electronic device 1001 may recognize an NFC tag located at a specific place (for example, a store) and may generate or obtain additional information (for example, information of a store or information of products sold by a store) based on tagging information of the recognized NFC tag. The electronic device 1001 may display the additional information as at least one of the first information 1062 and the second information 1064 on at least one of the first display 1002 and the second display 1012 (for example, the transparent display area 1014). For example, when the electronic device 1001 recognizes an NFC tag of a clothing store, it may display a pre-stored body image for a user of the electronic device 1001 as the first information 1062 on the first display 1002. At the same time, the electronic device 1001 may display products for sale in the clothing store in the transparent display area 1014, so that virtual fitting service may be provided by expressing an image similar to that the user wears a corresponding product.

Figure 10H:
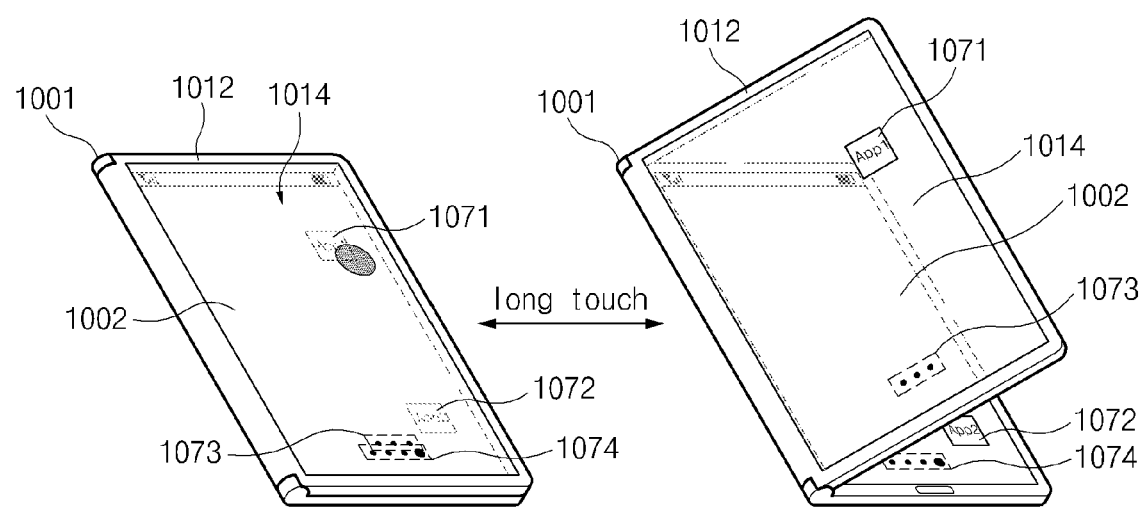
FIG. 10H is a view illustrating content movement of a display in an overlapping state according to various embodiments of the present disclosure.

FIG. 10H is a view illustrating content movement of a display in an overlapping state according to various embodiments of the present disclosure.

Referring to FIG. 10H, a display control module (for example, the display control module 170) of the electronic device 1001 may display at least one icon (for example, a first icon 1071 or a second icon 1072) through the first display 1002. The icon may be a widget or a specific content.

According to an embodiment, as at least a portion (for example, the transparent display area 1014) of the second display 1012 covers the first display 1002, if the transparent display area 1014 is disposed to at least partially overlap the first display 1002, a sensor (for example, a second touch sheet) for deterring a touch input or proximity input relating to the second display 1012 may be activated. Additionally, a sensor (for example, a first touch sheet) for deterring a touch input or proximity input relating to the first display 1002 may be switched into a deactivation state.

According to an embodiment, when an input relating to an area where the first icon 1071 of the first display 1002 is disposed is received, the display control module may control the position movement of the first icon 1071 based on the received input. The display control module may perform a control function on the first display 1002 and the transparent area 1014 to move the first icon 1071 from the first display 1002 to the transparent display area 1014 where an input occurs and then display the first icon 1071 through the transparent display area 1014. The input may be a long touch input or a double tap input.

According to an embodiment, when at least one icon (for example, the first icon 1071) is displayed through the transparent display area 1014, if an input relating to an area where the first icon 1071 of the transparent display area 1014 is disposed is received, the display control module may control the first display 1002 and the transparent display area 1014, thereby moving the first icon 1071 of the transparent display area 1014 to the first display 1002 and displaying the first icon 1071. The input may be a long touch input or a double tap input.

According to various embodiments of the present disclosure, the display control module may distinguish an icon to be displayed through the first display 1002 from an icon to be displayed through the transparent display area 1014 and may then store them. Additionally, the display control module may distinguish icon information displayed on the first display 1002 from icon information displayed on the transparent display area 1014 according to additional positions and may then store them and may change the storage position of information of a location moved icon as the position of an icon is moved. For example, when the first display 1002 and/or the transparent display area 1014 changes from a deactivated state (for example, sleep mode release, lock screen release, or turn-off) into an activated state (for example, turn-on), the display control module may load an icon stored at the storage position corresponding to a corresponding display (for example, the first display 1002 or the transparent display area 1014) switched into an activated state and may then display it through a corresponding display (for example, the first display 1002 or the transparent display area 1014).

According to various embodiments of the present disclosure, the display control module may display an interface object (for example, a first search interface 1073 or a second search interface 1074) for selecting a search page displayed on the first display 1002 and/or the transparent display 1014, through the first display 1002 and/or the transparent display 1014. The first search interface 1073 may be an interface object for selecting a search page to be displayed through the transparent display area 1014. The second search interface 1074 may be an interface object for selecting a search page to be displayed through the first display 1002.

According to an embodiment, when a search related input is received through the second search interface 1074, the display control module may perform a control function on the first display 1002 to display another page corresponding to the input through the first display 1002. A page displayed on the first display 1002 may be a page relating to at least one of a standby screen of the electronic device 1001 and execution of a specific function. According to an embodiment, a user may search for an object (for example, an icon) disposed in another page that is not currently displayed on a first display or a transparent display area by using the first search interface 1073 or the second search interface 1074.

According to an embodiment, when the first display 1002 and the transparent display area 1014 overlap at least partially each other, if an object (for example, an icon) displayed through the first display 1002 and an object (for example, an icon) displayed through the transparent display area 1014 are displayed overlapping each other, the display control module may perform on the first display 1002 and the transparent display area 1014, so as to automatically adjust the position of at least one of the two objects, so that the two objects may be shown to a user clearly and a user input for each of the two objects may be easily recognized.

Figure 10I:
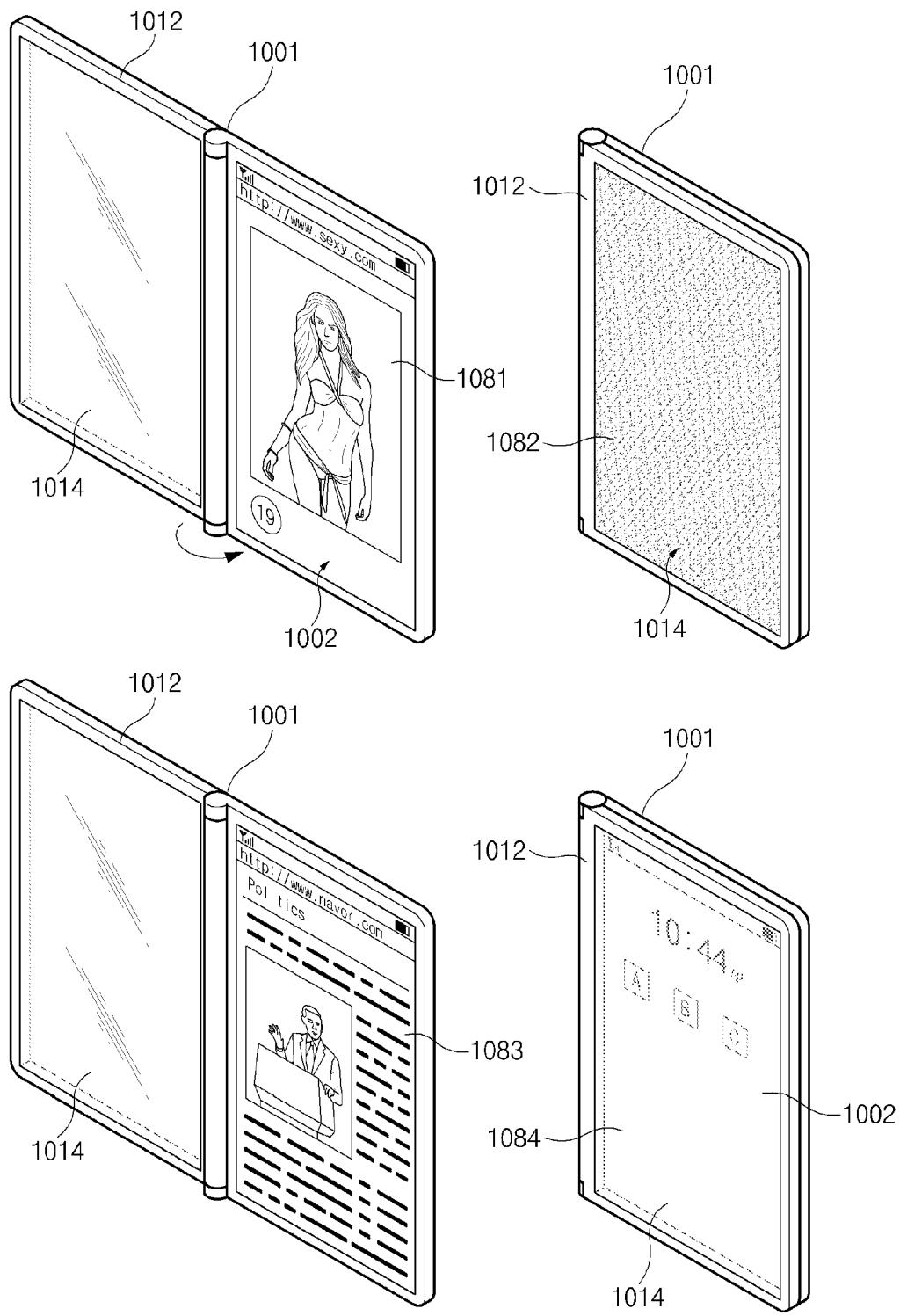
FIG. 10I is a view illustrating display of contents depending on a display hinge angle according to various embodiments of the present disclosure.

FIG. 10I is a view illustrating display of contents depending on a display hinge angle according to various embodiments of the present disclosure.

Referring to FIG. 10I, when the first display 1002 and the second display 1012 of the electronic device 1001 are unfolded, the display control module 170 may display a first function screen 1081 corresponding to a specific function through the first display 1002. The first function screen 1081 may be a webpage screen received from an accessed server as accessing a specific website. The display control module 170, for example, may perform on the transparent display area 1014 to be in a transparent state 1082. Additionally, the display control module 170 may display another webpage received from the server providing the webpage of the first function screen 1081 through the transparent display area 1014.

According to an embodiment, the display control module 170 may adjust the transparency of at least a portion 1083 of the transparent display area 1014 to be opaque in response to the operation (for example, a hinge operation of the second display 1012) that at least a portion (for example, the transparent display area 1014) of the second display 1012 of the electronic device 1001 covers the first display 1002. This may prevent the unintentional exposure of the information displayed on the first display 1002.

According to an embodiment, the display control module 170 may display the second function screen 1083 corresponding to a specific function through the first display 1002 in response to the operation (for example, a hinge operation of the second display 1012) that at least a portion (for example, the transparent display area 1014) of the second display 1012 of the electronic device 1001 is opened to the first display 1002. The second function screen 1083 may be a webpage screen received from a specific server.

According to an embodiment, the display control module 170 may display the third function screen 1084 corresponding to a specific function through the first display 1002 in response to the operation (for example, a hinge operation of the second display 1012) that at least a portion (for example, the transparent display area 1014) of the second display 1012 of the electronic device 1001 covers the first display 1002. The second function screen 1084 may be a standby screen of the electronic device 1001. The display control module 170, for example, may perform on the transparent display area 1014 to be in a transparent state, so that the third function screen 1084 is transmitted through the transparent display area 1014 and seen.

According to various embodiments of the present disclosure, the electronic device 1001 may adjust the transparency of the transparent display area 1014 or output a screen of a specific function on the first display 1002 and/or the transparent display area 1014, or automatically output a webpage of a specific server, based on at least one of the type of a specific application or function being executed in the electronic device 1001, the type of information (for example, a screen or a page) being displayed through the first display 1002 and/or the transparent display area 1014, or an opened/closed state of a cover with respect to the body of the electronic device 1001.

Figure 10J:
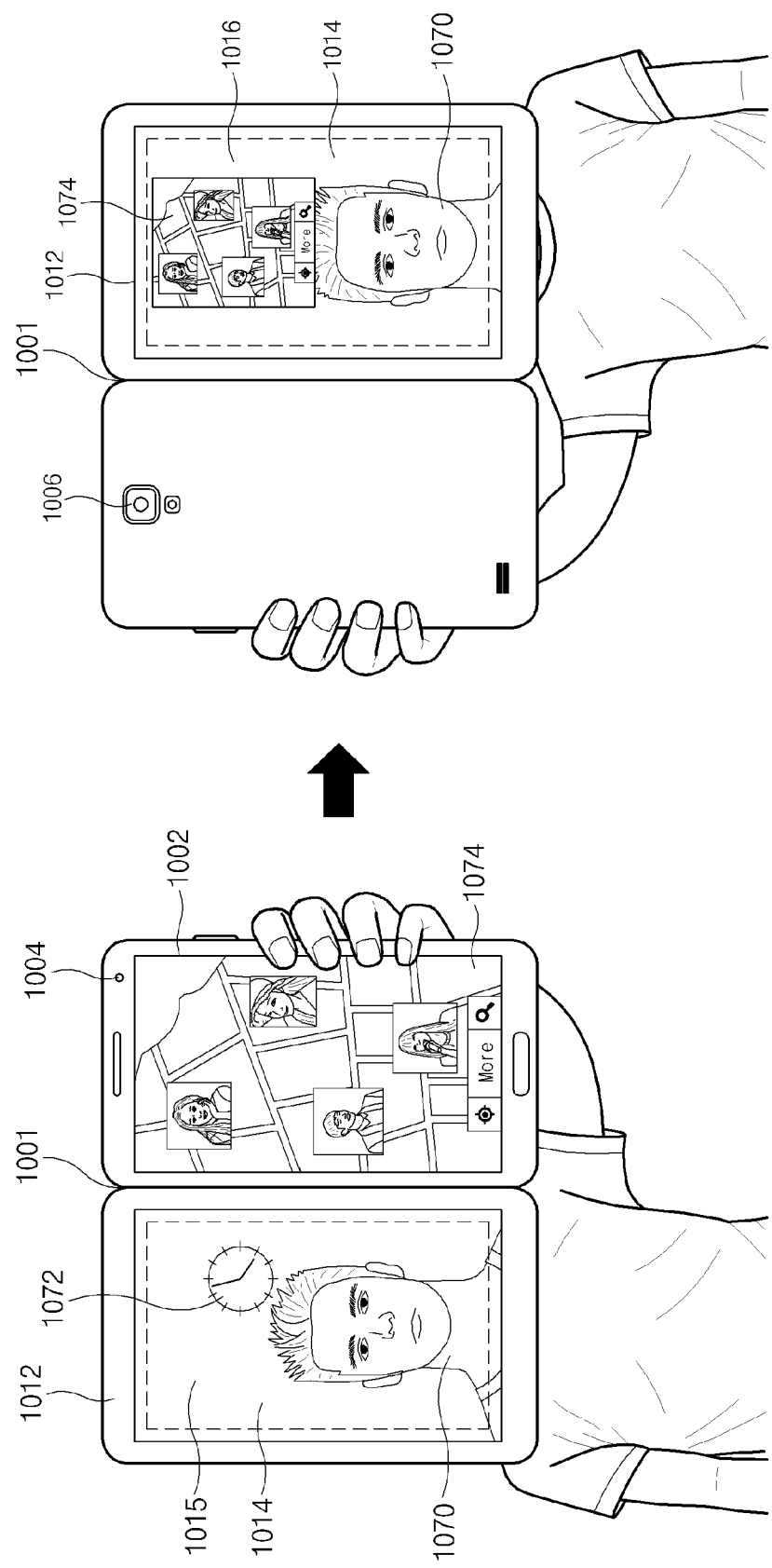
FIG. 10J is a view illustrating information display depending on a user's position according to various embodiments of the present disclosure.

FIG. 10J is a view illustrating information display depending on a user's position according to various embodiments of the present disclosure.

Referring to FIG. 10J, the display control module 170 of the electronic device 1001 may determine a display for displaying information from a plurality of displays (for example, the display 1002 and the display 1012) according to a user's position. The display control module 170 may determine a user's position or gaze of a display and may display specified information through a display (for example, the display 1012) corresponding to the user's position or gaze among the plurality of displays.

The display control module 170 may display a variety of information through the surface corresponding to a user's position or gaze among the both surfaces (for example, a back 1015 and a front 1016) of the transparent display area 1014 in the display 1012. When the back 1015 of the display 1012 is disposed toward the user direction (for example, the front 1016 of the display 1002 faces the user at the same time), the display control module 170 performs a control on the transparent display 1012 to allow an object 1070 (for example, another user or object) positioned at the outside of the electronic device 1001 to be transmitted through the back 1015 and seen or the information 1072 (for example, watch information or schedule information) to be displayed.

When the front 1016 of the transparent display area 1014 is disposed toward the user direction (for example, the back of the display 1002 is opened toward the user at the same time), the display control module 1014 performs a control on the transparent display 1012 to allow the object 1070 (for example, another user or object) positioned at the outside of the electronic device 1001 to be transmitted through the front 1016 and seen or information 1074 (for example, at least part of information displayed on the display 1002 or additional information relating thereto) different from the information 1072 displayed through the back 1015 to be displayed. According to an embodiment, the display control module 170 may determine a user's position or gaze direction through at least one sensor 1004 (for example, a front camera sensor an ambient light sensor, or a motion recognition sensor (for example, a 3D depth sensor, a gesture sensor, an acceleration sensor, a gyro sensor, and an earth magnetic sensor)) or short range communication (for example, WiFi, WiFi-direct, WiGig, BT, BLE, Zigbee, UWB, NFC, RFID, audio synch, HBC, or VLC).

Additionally or selectively, the display control module 170 may adjust information seen or displayed through at least one display (for example, the display 1012) among a plurality of displays (for example, the display 1002 and the display 1012) according to an opened/closed state of a display.

According to various embodiments of the present disclosure, the electronic device 1001 may adjust at least one of the type and format of information displayed on at least one of the front or back of the display 1014 and the display 1002 by using at least one camera sensor 1004 or 1006. For example, the display control module 170 of the electronic device 1001 may recognize a face or determine a people shape from a captured image whether there is a specified subject (for example, a specified user face or a specific user face) in a certain direction (for example, a certain range for capturing an image by the camera sensor 1004 or 1006) by activating at least one of the camera sensors 1004 and 1006. When a specified subject is captured by the camera sensor 1004, the display control module 170 may output specified first information to the first surface 1015 of the display 1014. Additionally, the display control module 170 may output specified second information to the display 1002.

According to various embodiments of the present disclosure, when an image including a specified subject is obtained by the camera sensor 1006, the display control module 170 may output specified third information to the second surface 1016 of the display 1014. The third information may include at least one of first information and second information. Alternatively, the third information may include information (for example, information including at least part of the first information and the second information or information obtained by reducing the first information and the second information) adjusted to correspond to the second surface of the display 1014. While outputting the third information to the second surface 1016 of the display 1014, the display control module 170 may output specified information (for example, a background screen of a specified color, a background of a specified transparency, or a specified sentence or image) to the first surface of the display 1014. While outputting the third information to the second surface 1016 of the display 1014, the display control module 170 may turn off the display 1002 or may output fourth information to the display 1002.

According to various embodiments of the present disclosure, when an image including a specified subject is not obtained by the camera sensor 1006, the display control module 170 may limit the output of the third information or output specified information (for example, a specified color screen, a background of a specified transparency, or a specified sentence) to the second surface 1016 of the display 1014. Alternatively, when an image including a specified subject is not obtained by the camera sensor 1006, the display control module 170 may turn off the display 1014.

According to various embodiments of the present disclosure, when an image including a specified subject is obtained by the camera sensor 1004 and the camera sensor 1006, the display control module 170 outputs the first information to the first surface 1015 of the display 1014, the second information to the display 1002, and the third information to the second surface 1016 of the display 1014.

According to various embodiments of the present disclosure, while a specified subject is detected by the camera sensor 1006 to output the third information to the second surface 1016 of the display 1014, if a specified subject is detected by the camera sensor 1005, the display control module 170 outputs the first information or the second information to the first surface 1015 of the display 1014 or the display 1002, respectively. During this operation, the display control module 170 may stop outputting the third information to the second surface 1016 of the display 1014.

According to various embodiments of the present disclosure, the display control module 170 may output the third information to the first surface 1015 of the display 1014. After outputting the third information for a specified time, the display control module 170 may change the third information into the second information being displayed through the display 1002.

According to various embodiments of the present disclosure, when outputting the third information to the first surface 1015 of the display 1014, the display control module 170 may change a displayed information direction (for example, information arrangement change from the left to the right or information arrangement change from the right to the left) through the rotation of the electronic device 1001 or user input.

The above display 1014 may be a transparent display. Accordingly, while outputting the first information to the first surface 1015 in relation to visibility improvement, the display control module 170 may adjust the transparency (or background) of the second surface 1016 or while outputting the third information to the second surface 1016, may adjust the transparency (or background) of the second surface 1016.

As mentioned above, the electronic device 1001 may adjust at least one of the type, format, and output location of information displayed on displays based on at least one of the camera sensor 1004 and the camera sensor 1006. According to various embodiments, the electronic device 1001 may output a variety of information (for example, information previously mapped into each figure) according to the type (for example, figures distinguished according to face recognition) of a subject. According to various embodiments of the present disclosure, the electronic device 1001 may determine an arrangement state of the electronic device 1001 by using at least one of the above-mentioned various sensors besides a camera sensor and may control at least one of the output, change or output stop of the first information, the second information, and the third information.

Figure 10K:
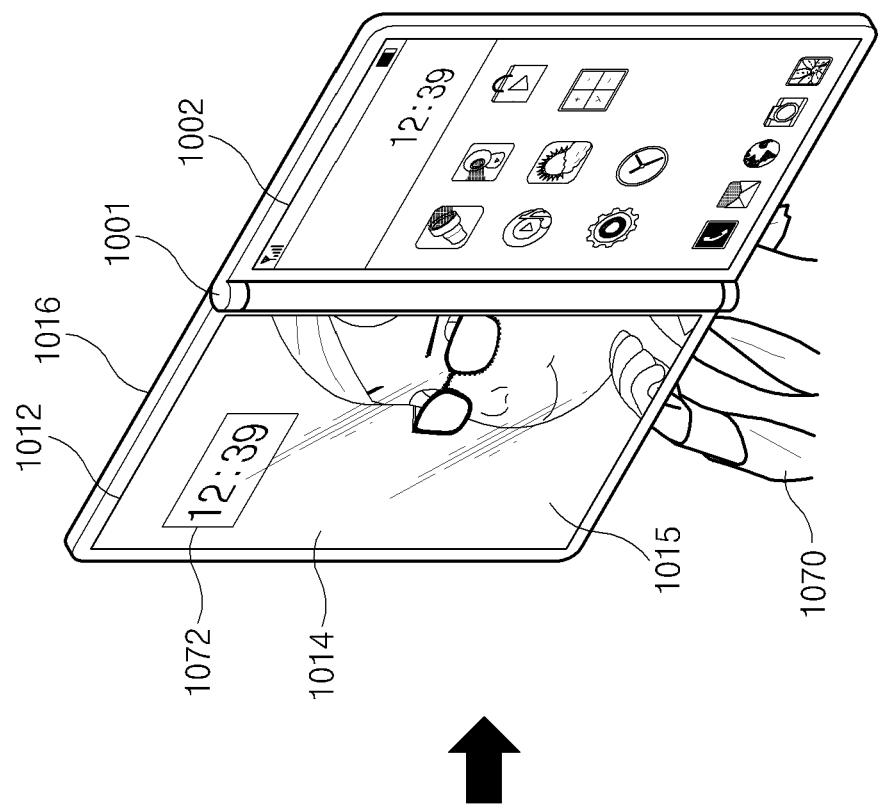
FIG. 10K is a view illustrating a display status or information adjustment depending on a display opening angle according to various embodiments of the present disclosure.
Figure 10K:
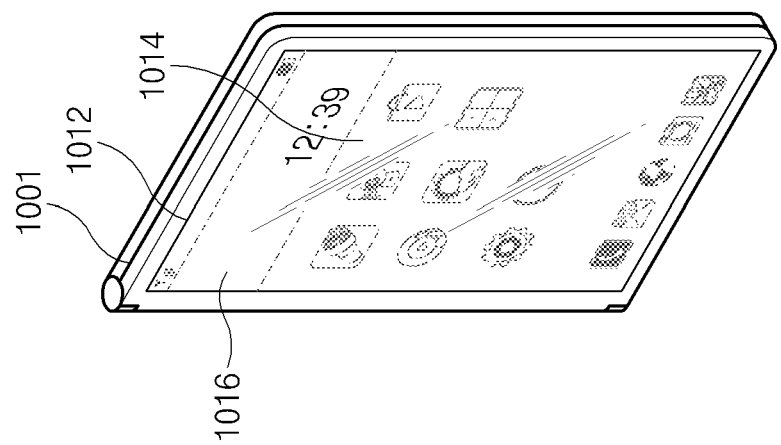

FIG. 10K is a view illustrating a display status or information adjustment depending on a display opening angle according to various embodiments of the present disclosure.

Referring to FIG. 10K, the display control module 170 of the electronic device 1001 may display a variety of information according to the position of the display 1012 with respect to the display 1002, or a user's position for at least one surface of the both surfaces (for example, the back 1015 and the front 1016) of the transparent display area 1014 in the display 1012.

According to an embodiment, when the display 1012 is closed with respect to the display 1002 (for example, the two displays 1002 and 1012 contact each other or are spaced from each other within a specified distance (for example, 1 cm or 5 cm)), the display control module 170 may adjust the visibility to allow at least part of information displayed through the display 1002 to be seen through the transparent display area 1014.

According to an embodiment, when the display 1012 is opened with respect to the display 1002 (for example, the two displays 1002 and 1012 are spaced from each other more than a specified distance (for example, 0.5 cm, 5 cm, or 10 cm), the display control module 170 may display another information 1072 (for example, text, image, or information relating to the information displayed through the display 1002) through at least a partial area of the transparent display area 1014. Additionally or selectively, the display control module 170 may adjust the visibility of the object 1070 (for example, another user or external object) disposed at a peripheral part (for example, a rear part) of the display 1012 through at least another partial area of the transparent display area 1014.

According to an embodiment, the display control module 170 may automatically display the other information 1072 in the partial area or may adjust the visibility of the at least the other partial area to allow the object 1070 not to be transmitted through the transparent display area 1014 and seen, based on an operation for opening the display 1012 with respect to the display 1002.

In this disclosure, for convenience of description, although a specific distance (for example, 0.5 cm, 5 cm, or 10 cm) for determining a closed or opened state between the display 1002 and the display 1012 is used, and another distance value may be used.

According to an embodiment, while the display 1012 is detachable from the display 1002, it may allow a user to see an external object through the transparent display area 1014 or may display information. For example, when the display 1012 is laid with one surface (for example, the front 1016) toward a user, the object 1070 (for example, another user or external object) disposed at a peripheral part (for example, a rear part) of the display 1012 may be seen through at least a partial area of the transparent display area 1014. Selectively or additionally, when the display 1012 is laid with the other surface (for example, the back 1015) toward a user (for example, when flipped), it may display information (for example, text or image) through at least a partial area of the transparent display area 1014.

Figure 11:
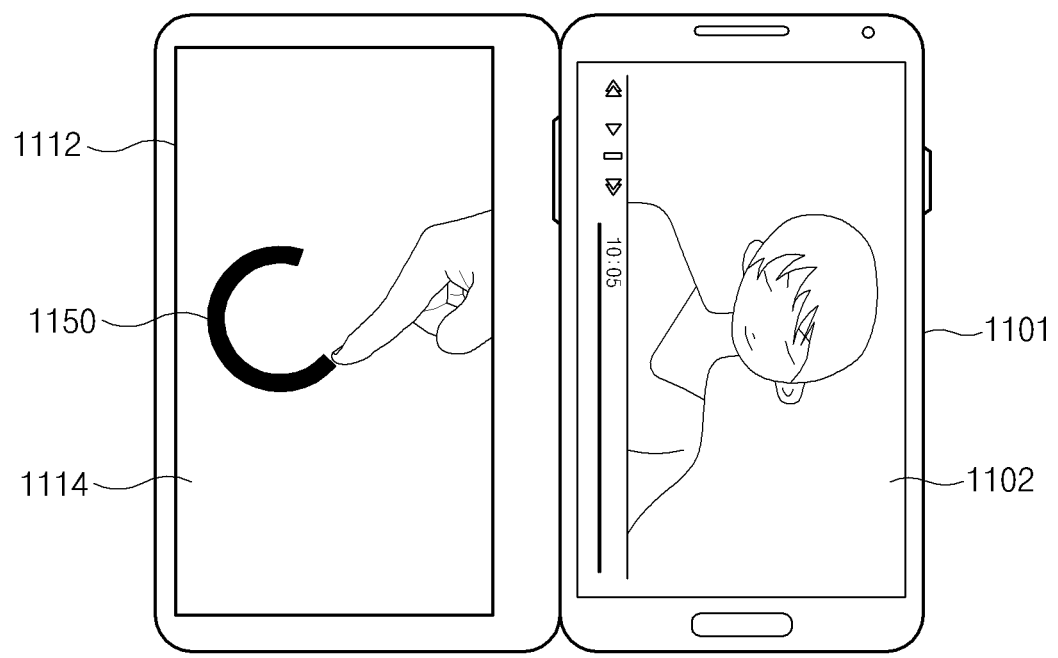
FIG. 11 is a view of using a transparent display area formed on at least a portion of a plurality of displays functionally connected to an electronic device as an input means for another display according to various embodiments of the present disclosure.

FIG. 11 is a view of using a transparent display area formed on at least part of a plurality of displays as an input means while a cover of an electronic device is opened according to various embodiments of the present disclosure. An electronic device 1101 may include a sensor (for example, a touch sensor, a digitizer, a gesture sensor, a proximity sensor, an image sensor, and a 3D depth sensor) detecting a touch input, gesture input, or proximity input (for example, hovering) relating to a transparent display area 1114 formed at a display (for example, a second display 1112).

Referring to FIG. 11, while not displaying additional information on the transparent display area 1114, in response to a user input 1150 (for example, a single side touch input, a both sides touch input, a hovering input, a swipe input, a gesture input, or a writing input) relating to the transparent display area 1114, the electronic device 1101 (for example, the electronic device 101) may control a function or application executed through the first display 1102 (for example, capturing an image displayed on the first display 1102, executing an application stored in the electronic device 1101, or changing a setting of the electronic device 1101), or may perform a function using another component of the electronic device 1101 (for example, audio output or camera shooting) or a function using an external electronic device (for example, the electronic device 104 or the electronic device 108 (for example, TV remote control, remote control, data transmission, text information transmission, or voice information transmission).

Figure 12:
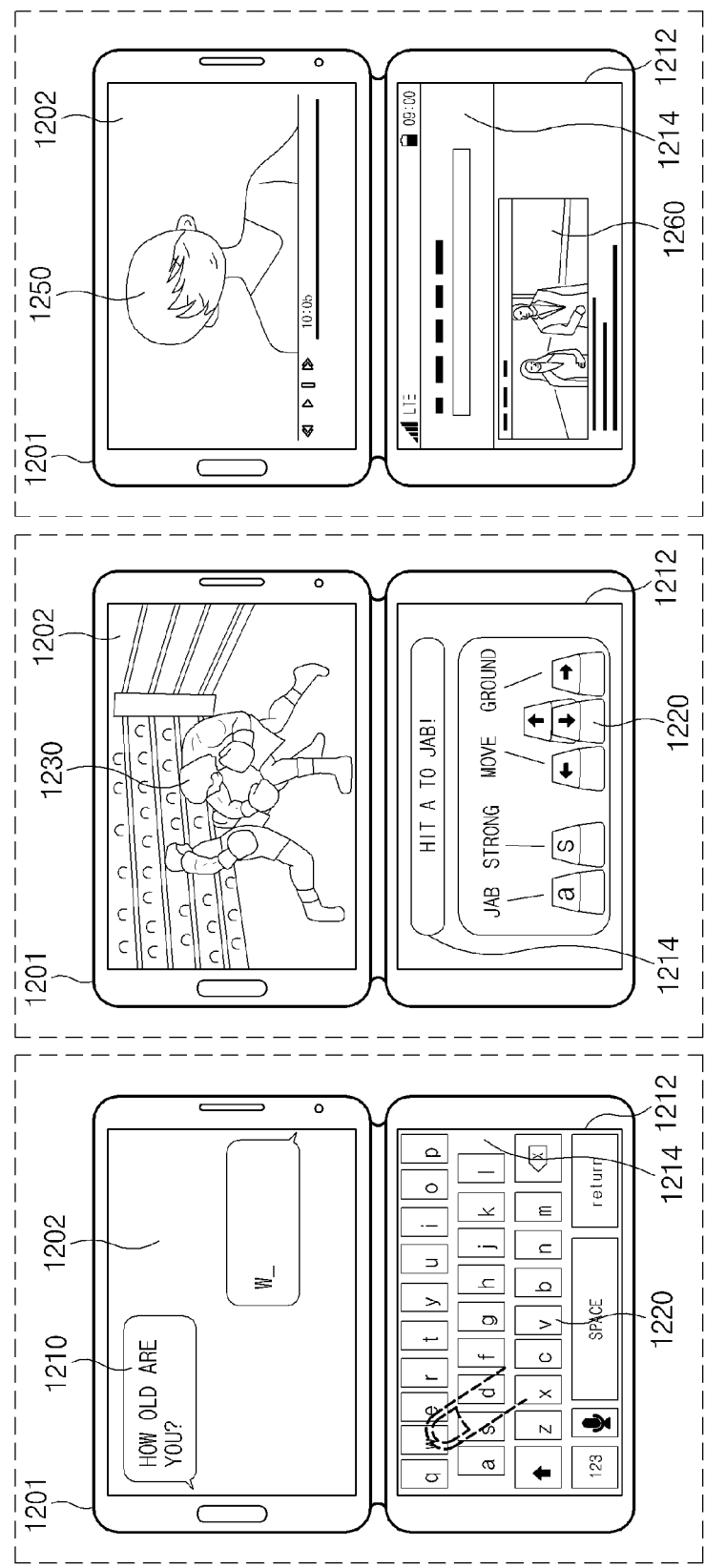
FIG. 12 is a view of using a transparent display area formed on at least a portion of a plurality of displays functionally connected to an electronic device as an input means for another display according to various embodiments of the present disclosure.

FIG. 12 is a view of using a transparent display area formed on at least part of a plurality of displays as an input means while a cover of an electronic device is opened according to various embodiments of the present disclosure. An electronic device 1201 may include a sensor (for example, a touch sensor, a digitizer, a gesture sensor, a proximity sensor, an image sensor, and a 3D depth sensor) detecting a single side touch input, a both sides touch input, gesture input, or proximity input (for example, hovering) relating to a transparent display area 1214.

Referring to FIG. 12, while a first body part (for example, a cover part) of the electronic device 1201 is partially opened, information or functions displayed on another display (for example, a first display 1202) disposed at a second part (for example, a body part) of the electronic device 1201 may be controlled by using a transparent display area formed at a display (for example, a second display 1212) disposed at the first body part as an input means. An electronic device 1201 (for example, the electronic device 101) may include a plurality of displays including at least the first display 1202 and the second display 1212. The second display 1212, for example, may include a transparent display area 1214. The electronic device 1201 may further include a sensor (for example, a touch sensor, a digitizer, a gesture sensor, a proximity sensor, an image sensor, and a 3D depth sensor) detecting a touch input or proximity input (for example, hovering) relating to the transparent display area 1214.

According to various embodiments of the present disclosure, the electronic device 1201 may display a virtual input tool (for example, a virtual keyboard 1220 or a game pad 1240) for a function or application (for example, a chatting program 1210 or a game 1230) to be executed through the first display 1202, through at least a portion (for example, the transparent display area 1214) of the second display.

According to an embodiment, the electronic device 1201 may execute a text input application (for example, a chatting program 1210, a web browser 1260, or a message (SMS/MMS) program) through the first display 1202 and when a user input (for example, touch, gesture, swipe, hovering, or pen input) is detected from at least a portion of a text input application, may display a virtual input tool (for example, the virtual keyboard 1220 or a text input window) for the text input application through the second display 1212.

According to various embodiments of the present disclosure, the electronic device 1201 may execute a function or application (for example, the web browser 1260) different from a function or application (for example, an image playback program 1250) executed in the first display 1202 through at least a portion (for example, the transparent display area 1214) of the second display 1212.

Figure 13:
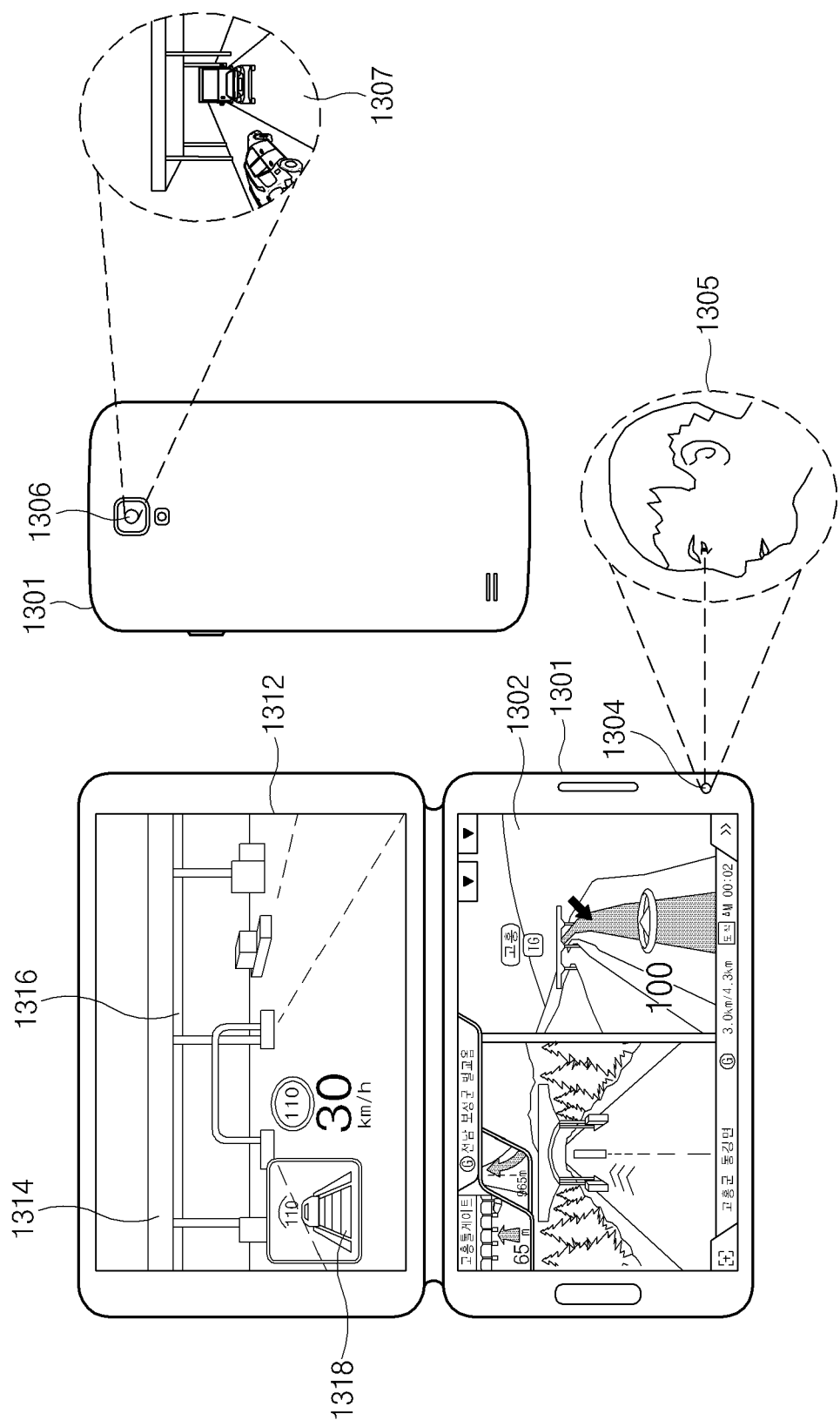
FIG. 13 is a view of providing augmented reality content by using a transparent display area functionally connected to an electronic device according to various embodiments of the present disclosure.

FIG. 13 is a view of providing augmented reality content by using a transparent display area in an electronic device according to various embodiments of the present disclosure. An electronic device 1301 (for example, the electronic device 101) may include a plurality of displays including at least a first display 1302 and a second display 1312. The second display 1312, for example, may include a transparent display area 1314 and according to a relative position between the first display 1302 and the second display 1312, at least part of information displayed on the first display 1302 may be formed to be seen through the transparent display area 1314. In the transparent display area 1314, transparency adjustment may be possible. The electronic device 1301 may further include a sensor for recognizing a user's input (for example, a touch sensor relating to at least one of the first display 1302 and the second display 1312, a gesture sensor, a front camera sensor 1304, a rear camera sensor 1306, a digitizer, a DVS, proximity sensor, or a 3D depth sensor).

Referring to FIG. 13, the electronic device may implement augmented reality by displaying second information relating to first information 1316 transmitted through a transparent display area and seen while a cover of the electronic device 1301 is opened.

According to an embodiment, the electronic device 1301 may predict the first information 1316 based on context information 1307 obtained through a sensor (for example, the rear camera sensor 1306) functionally connected to the electronic device 1301. According to an embodiment, the electronic device 1301 may predict the first information 1316 by using gaze or face recognition information 1305 in addition to the context information 1307.

According to an embodiment, the second information 1318 may be obtained based on the predicted first information 1316 (for example, information predicted based on the context information 1307 and the gaze or face recognition information 1305 or information predicted based on the context information 1307). For example, when obtaining the predicted first information according to a control of the display control module 170, the electronic device 1301 may transmit the predicted first information to a server (for example, the server 106 or an external electronic device (the electronic device 104 or the electronic device 108)), may receive server processing information based on the predicted first information from a server (for example, the server 106 or an external electronic device (the electronic device 104 or the electronic device 108)), may display second information 1318 based on the processed information through the transparent display area 1314.

According to another embodiment, an electronic device may obtain predicted first information and additional information through a communication module (for example, WiFi, BT, NFC, GPS, or cellular communication) included in the electronic device to process information based on the predicted first information and the additional information through a processor (for example, the processor 120) and then display the second information 1318 based on the information processed by the processor through the transparent display area 1314.

According to an embodiment, a position that the second information is displayed in a transparent display area may be determined based on the first information, and by additionally using gaze or face recognition information, the first information, may be adjusted to be identical or close to a direction in which the first information is transmitted through a current transparent display area and seen to a user.

According to an embodiment, the electronic device may display third information relating to the predicted first information through the first display or may execute an additional application relating to the first information. For example, the electronic device provides augmented reality navigation information through the transparent display area and may provide map navigation information through the first display at the same time.

Figure 14:
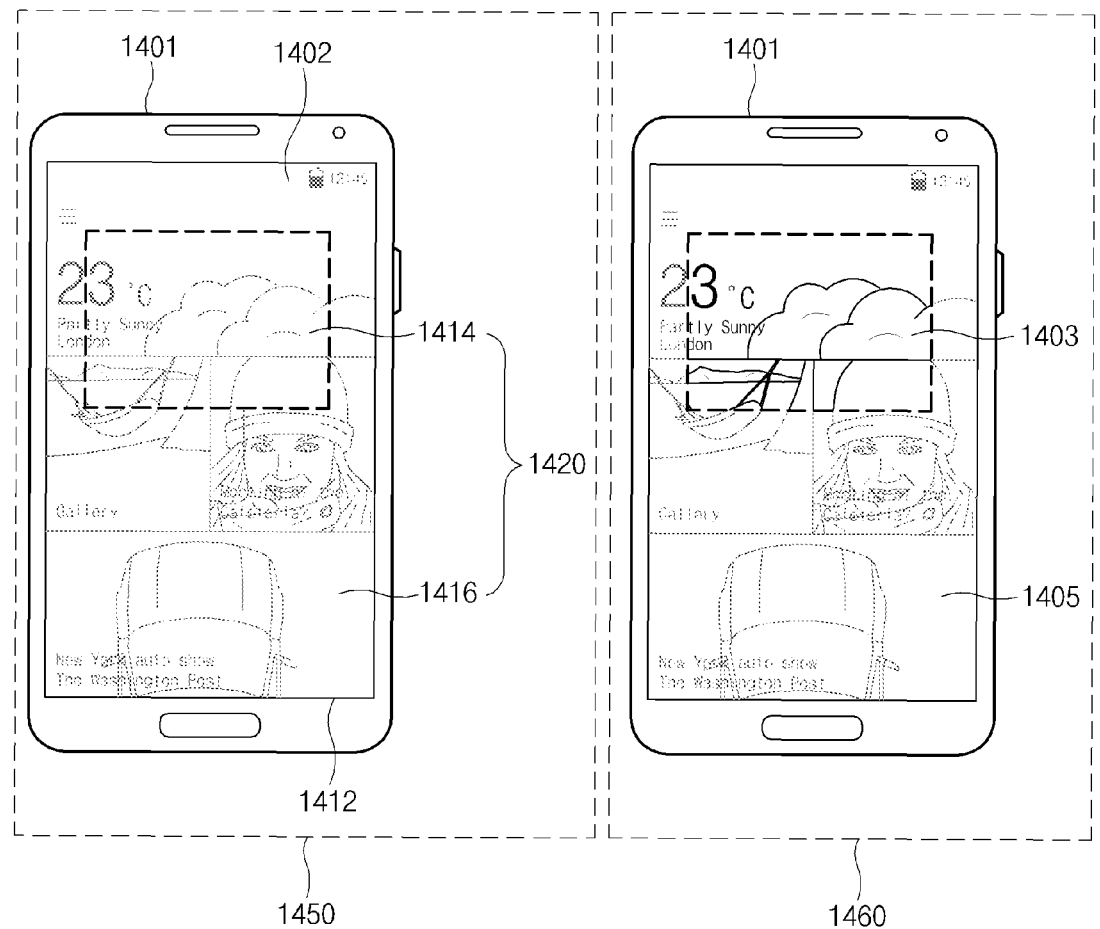
FIG. 14 is a view of changing and displaying a setting of a display overlapping a transparent display area among a plurality of displays functionally connected to an electronic device according to various embodiments of the present disclosure.

FIG. 14 is a view of changing and displaying a setting of a display overlapping a transparent display area among a plurality of displays in an electronic device according to various embodiments of the present disclosure. An electronic device 1401 (for example, the electronic device 101) may include a plurality of displays including at least a first display 1402 and a second display 1412. The second display 1412, for example, may include a transparent display area 1414 and according to a relative position between the first display 1402 and the second display 1412, at least part of information displayed on the first display 1402 may be formed to be seen through the transparent display area 1414. In the transparent display area 1414, transparency adjustment may be possible.

Referring to FIG. 14, while at least a portion (for example, the transparent display area 1414) of the second display 1412 covers the first display 1402 in a screen 1450, if the information displayed on the first display 1402 is transmitted through the transparent display area 1414 and a material having a different transparency than a transparent display and seen in a screen 1420, according to the transparency of a transparent display area, there may be a visual difference in luminosity, saturation, contrast, luminance or brightness. For example, when the transparent display area 1414 is transmitted and seen, a relatively low visibility (luminosity, saturation, contrast, luminance, or brightness) compared to when the information displayed on the first display is seen as it is without transmitting another material or when the information displayed on the first display is transmitted through a material having a relatively high transparency (for example, glass and transparent plastic) in a screen 1416.

According to an embodiment, when at least part of the information displayed on the first display 1402 is transmitted through the transparent display area 1414 and seen, the electronic device 1401 may adjust a setting of at least a partial area 1403 corresponding to the transparent display area 1414 in an area of the first display 1402 by stages (for example, scale 0 to 10).

For example, when the second display 1412 covers on the first display 1402, the electronic device may increase the brightness of at least a portion of the first display 1402 compared to the brightness before the second display 1412 covers the first display 1402 or the brightness of the remaining portion of the first display 1402.

According to various embodiments of the present disclosure, while at least a portion (for example, the transparent display area 1414) of the second display 1412 covers the first display 1402, if the operation of the first display 1402 is separated and seen in a screen 1460, each setting (for example, luminosity, saturation, contrast, luminance or brightness) for at least a partial area 1403 corresponding to the transparent display area 1414 and at least a partial area 1405 corresponding to a material having a high transparency may vary. According to an embodiment, at least one setting (for example, luminosity, saturation, contrast, luminance or brightness) of at least a partial area 1403 corresponding to the transparent display area 1414 or at least a partial area 1405 corresponding to a material having a high transparency may be changed.

Figure 15:
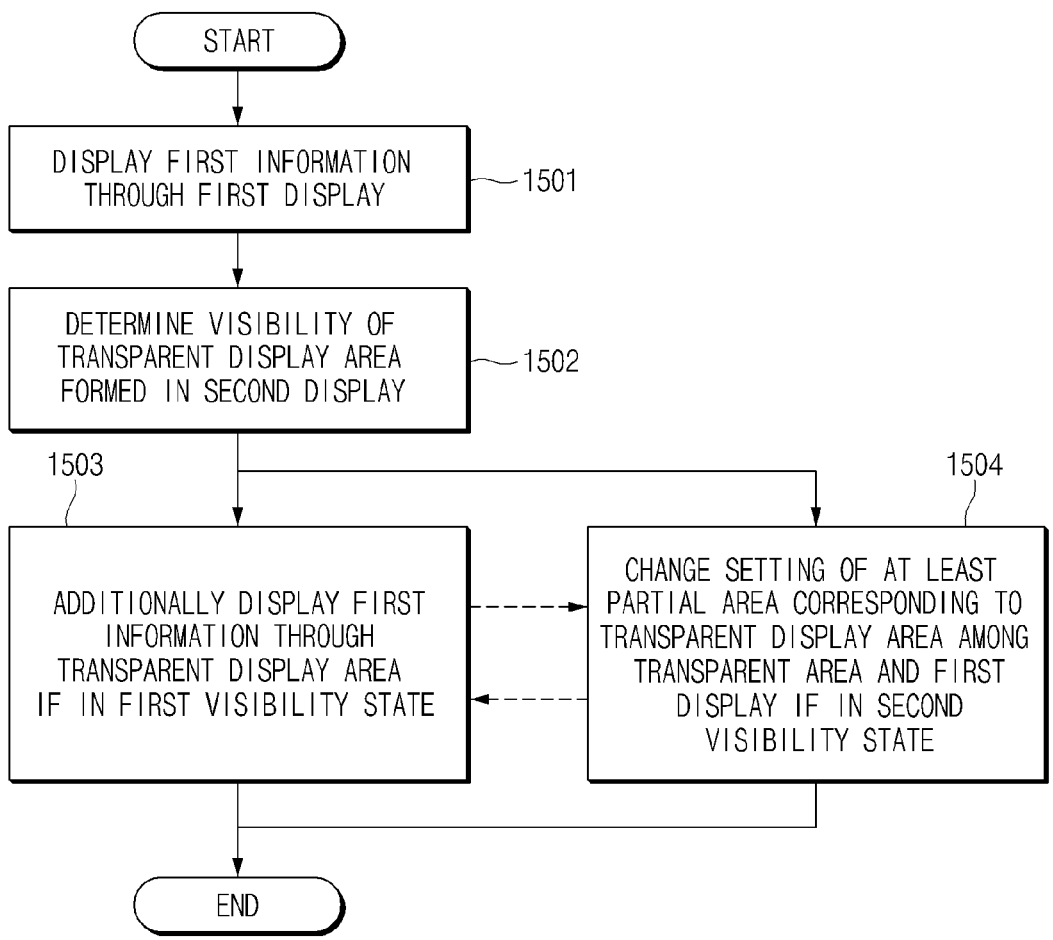
FIG. 15 is a flowchart illustrating a method of controlling a plurality of displays to display information using the plurality of displays functionally connected to an electronic device according to various embodiments of the present disclosure.

FIG. 15 is a flowchart illustrating a method of controlling a plurality of displays to display information using the plurality of displays functionally connected to an electronic device according to various embodiments of the present disclosure. An electronic device (for example, the electronic device 101) may include a plurality of displays including at least a first display (for example, the first display 151) and a second display (for example, the second display 152). The second display 320, for example, may include a transparent display area (for example, the transparent display area 153) and according to a relative position between the first display and the second display, at least part of information displayed on the first display may be formed to be seen through a transparent display area.

Referring to FIG. 15, the first electronic device (for example, the electronic device 101) may display first information through the first display by using a display control module (for example, the display control module 170) in operation 1501.

In operation 1502, determination is made on the visibility on whether at least part of the first information is transmitted and seen or not seen through the transparent display area of the second display.

In operation 1503, when a visibility state determined in relation to a transparent display area is a first visibility state (for example, when the at least part of the information is seen), second information may be additionally displayed through the transparent display area. The additionally displayed second information may be information relating to the at least part of the information or unrelated information.

In operation 1504, in addition to operation 1503 or replacing operation 1503, when a visibility state determined in relation to a transparent display area is a second visibility state (for example, when the at least part of the information is not shown, when it is shown but illegible, or when it is shown vaguely), a setting of at least a partial area corresponding to a transparent display area in the first display may be changed. According to an embodiment, after operation 1504, operation 1503 may be executed additionally.

Figure 16:
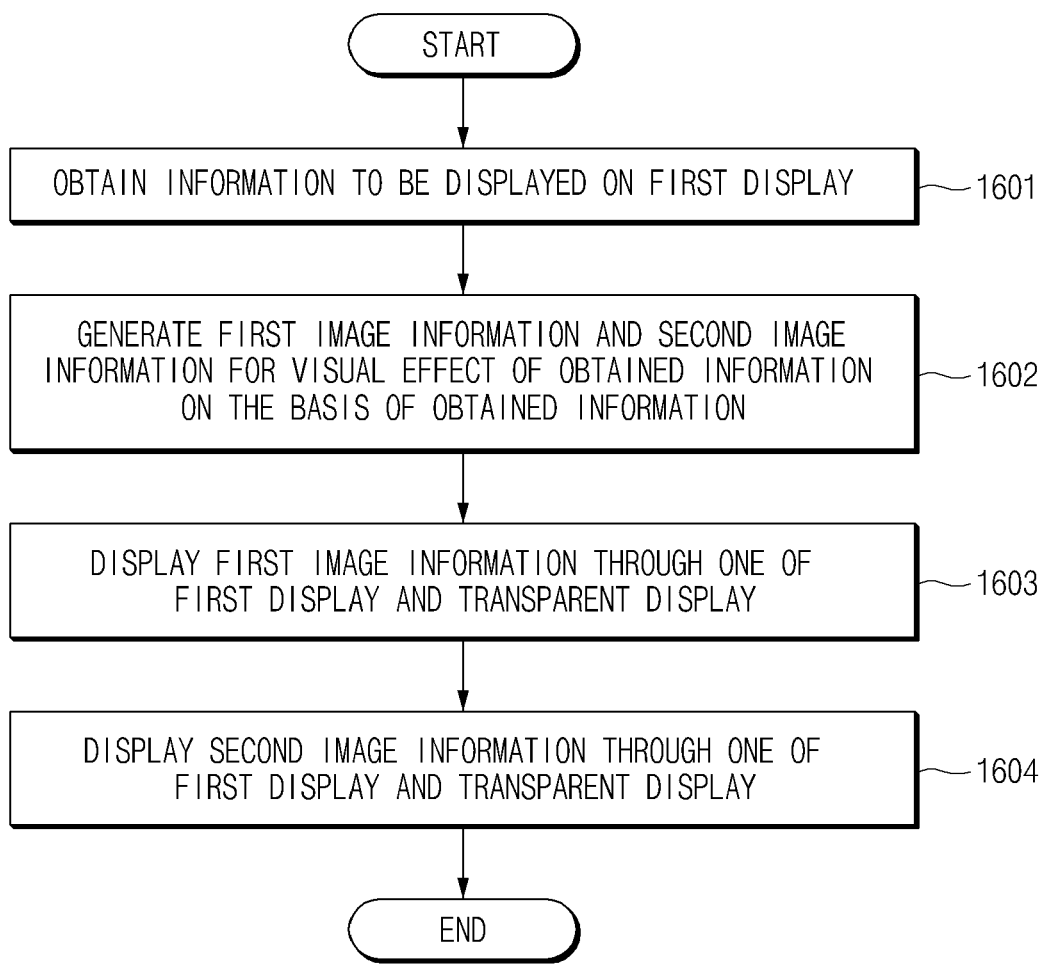
FIG. 16 is a flowchart illustrating a method of generating a visual effect for given information by using a plurality of displays functionally connected to an electronic device according to various embodiments of the present disclosure.

FIG. 16 is a flowchart illustrating a method of generating visual effect for given information by using a plurality of displays functionally connected to an electronic device according to various embodiments of the present disclosure. An electronic device (for example, the electronic device 101) may include a plurality of displays including at least a first display (for example, the first display 151) and a second display (for example, the second display 152). The second display 320, for example, may include a third display (for example, the transparent display area 153) and according to a relative position between the first display and the second display, at least part of information displayed on the first display may be formed to be seen through the transparent display area.

Referring to FIG. 16, in operation 1601, a display control module (for example, the display control module 170) of an electronic device (for example, the electronic device 210) may obtain first information to be displayed on the first display.

In operation 1602, the display control module may generate first image information and second image information for visual effect of first information based on the first information. According to an embodiment, at least one image processing technique among shift, equalization, sharpening, noise reduction, histogram conversion, face recognition, high frequency cut-off filtering, angle conversion, size conversion, saturation conversion, brightness conversion, or template matching may be applied to the image of the first information during a process for generating at least one of the first image information and the second image information. According to an embodiment, the first image information may be identical to the first information and the second image information may be an image generated by applying the image processing to the first image.

According to an embodiment, when the first information is a 3D image including a left-eye image and a right-eye image, the first image information is one of the left-eye image and the right-eye image and the second image information is the other one image.

In order to express a visual effect of the first information, in operation 1603, the electronic device may display the first image information through one of the first display and the transparent display area and in operation 1604, may display the second image information through the other one of the first display and the transparent display area. According to an embodiment, the first image information and the second image information may be displayed at the same time.

According to an embodiment, when the first image information is one of a left-eye image and a right-eye image and the second image information is the other one, the first image information and the second image information may be displayed simultaneously or may be displayed sequentially by time-sharing.

Figure 17:
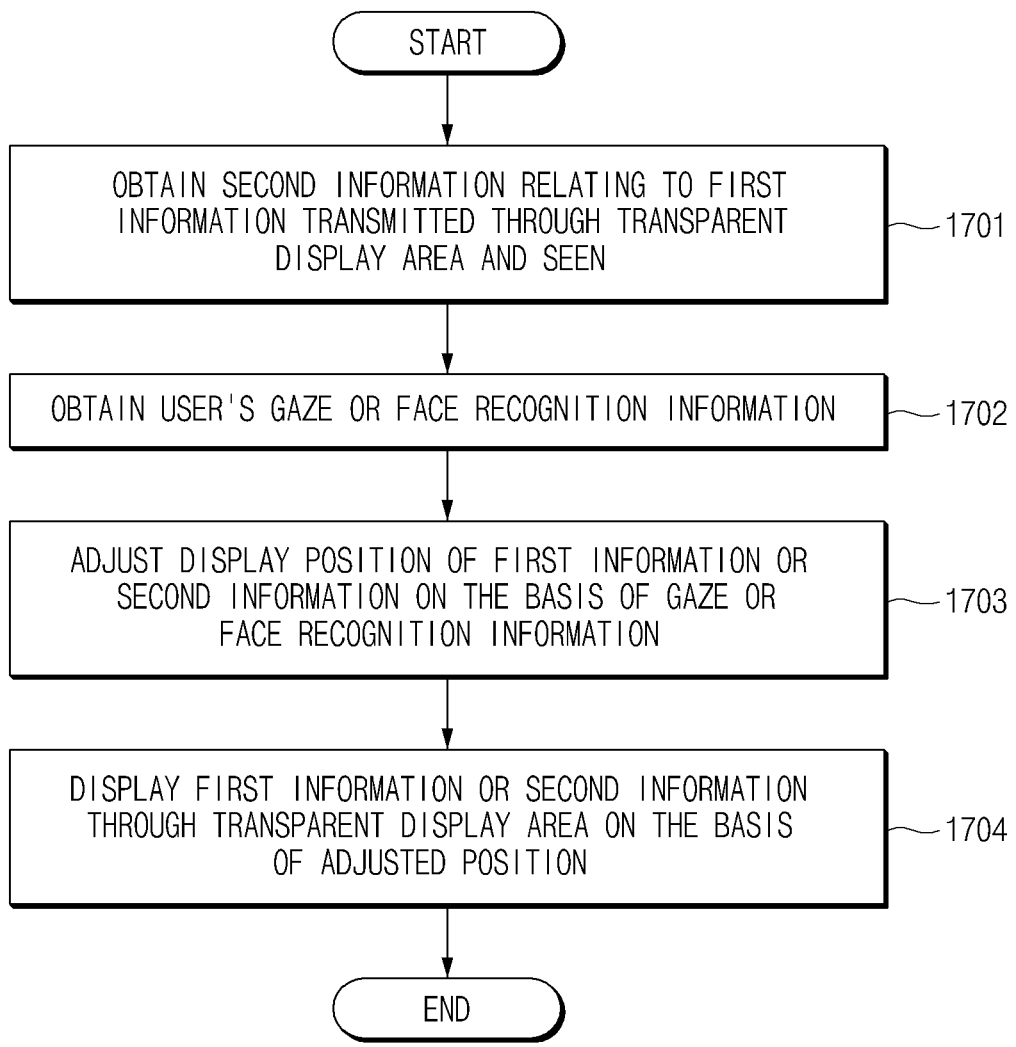
FIG. 17 is a flowchart illustrating a method of displaying information based on user's gaze or face recognition information by using a plurality of displays functionally connected to an electronic device according to various embodiments of the present disclosure.

FIG. 17 is a flowchart illustrating a method of displaying information based on user's gaze or face recognition information by using a plurality of displays functionally connected to an electronic device according to various embodiments of the present disclosure. An electronic device (for example, the electronic device 101) may include a plurality of displays including at least a first display (for example, the first display 151) and a second display (for example, the second display 152). The second display 320, for example, may include a third display (for example, the transparent display area 153) and according to a relative position between the first display and the second display, at least part of information displayed on the first display may be formed to be seen through the transparent display area.

Referring to FIG. 17, in operation 1701, the display control module (for example, the display control module 170) of the electronic device may obtain second information (for example, position, time, surrounding environment, or health) relating to first information (for example, news, weather, schedule, content recommendation, action guide, appearance guide, health guide, or augmented reality content) transmitted through a transparent display area and seen by using a sensor functionally connected to the electronic device. According to an embodiment, the display control module may obtain context information relating to a user by using a rear camera sensor of the electronic device and may generate the second information based on the obtained context information.

In operation 1702, the display control module may obtain user's gaze or face recognition information by using another sensor functionally connected to the electronic device. In operation 1703, the display control module may adjust (or determine) the display position of the second information based on the user's gaze or face recognition information obtained through operation 1703.

In operation 1704, the electronic device may display the second information through the transparent display area. The electronic device may display the second information obtained through operation 1701 as it is through the transparent display area after omitting operation 1702 and operation 1703.

Operations performed by the method shown in FIGS. 15 to 17 may be processed through a sequential, parallel, repetitive, or heuristics method, or may be executed in the order different from that shown in a corresponding drawing. Alternatively, some operations may be omitted or other operations may be added.

According to various embodiments of the present disclosure, a method for controlling a plurality of displays in an electronic device may include displaying first information through a first display functionally connected to the electronic device and when at least part of the first information is displayed partially through a transparent display area of a second display connected to the electronic device to change a position for the first display, additionally displaying second information in relation to the at least part of the information through the transparent display area.

According to various embodiments of the present disclosure, the additionally displaying operation may include dynamically changing at least one of the size, shape, brightness, color, saturation, sharpness, contrast, permeability, transparency, gamma, resolution, contrast ratio, viewing angle, color reproduction, color temperature, or tone linearity of the transparent display area.

According to various embodiments of the present disclosure, the additionally displaying operation may include generating visual effect by using the second information in order to allow the at least part of the information to be seen three-dimensionally.

According to various embodiments of the present disclosure, the additionally displaying operation may include generating the second information based on the first information, displaying first part of the second information through the first display in order to allow the first part to be transmitted through a transparent display area and seen, and simultaneously displaying the first part of the second information and a second part of the second information through the transparent display area.

According to various embodiments of the present disclosure, the visual effect may include a depth effect image for the at least part of the information.

According to various embodiments, the generating of the visual effect may include applying at least one image processing among shift, equalization, sharpening, noise reduction, histogram conversion, face recognition, high frequency cut-off filtering, angle conversion, size conversion, saturation conversion, brightness conversion, and template matching.

According to various embodiments of the present disclosure, the first information includes a 3D image including a left-eye image and a right-eye image. The generating of the second information includes displaying the left-eye image through one of the first display and the transparent display area and displaying the right-eye image through the other one.

According to various embodiments of the present disclosure, the first information may include one of a left-eye image and a right-eye image for one object and the second information may include the other one.

According to various embodiments of the present disclosure, the left-eye image and the right-eye image may be time-shared and performed alternately.

According to various embodiments of the present disclosure, the additionally displaying operation may include recognizing a user's face or gaze of the electronic device and adjusting at least one of the transparency, luminance, brightness, or reflectivity of the first display or the transparent display area, or a display position of the at least part of the information or the second information in the transparent display, based on the face or gaze in order to allow the transparent display area to serve as a mirror.

According to various embodiments of the present disclosure, the additionally displaying operation may include obtaining context information relating to the user of the electronic device and generating an augmented reality effect relating to the at least part of the information as the second information based on the context information.

According to various embodiments of the present disclosure, the additionally displaying operation may include generating avatar content corresponding to the user of the electronic device and displaying the avatar content as at least part of the second information by using the transparent display area.

According to various embodiments of the present disclosure, the additionally displaying operation may include specifying at least part of the first information based on a user input for one of the first display and the second display and adjusting the transparency of at least a partial area of the transparent display area in order not to allow the at least part of the first information to be seen through the transparent display area.

According to various embodiments of the present disclosure, the additionally displaying operation may include specifying at least a partial area of the transparent display area based on a user input relating to the second display and adjusting the transparency of the at least a partial area in order not to allow the at least part of the first information to be seen through the at least partial area.

According to various embodiments of the present disclosure, the additionally displaying operation may execute a function or application of the electronic device or change a setting of the electronic device in response to a user input relating to at least one of the top surface and the bottom surface of the transparent display area.

According to various embodiments of the present disclosure, the additionally displaying operation may include storing at least one of a first capture image corresponding to the at least part of the first information and a second capture image relating to the second information as at least one image file.

According to various embodiments of the present disclosure, the additionally displaying operation may include storing at least one of the at least part of the information, the at least part of the second information, and a combination thereof.

According to various embodiments of the present disclosure, the storing operation may include performing a storing operation based on a user input detected through the transparent display area.

According to various embodiments of the present disclosure, the additionally display operation may include displaying a user interface for authenticating the user of the electronic device through the second display when a lock for limiting at least part of functions of the electronic device is set, authenticating the user based on a user input relating to the user interface, and releasing the lock based on the authentication.

According to various embodiments of the present disclosure, the additionally displaying operation may include changing an expression corresponding to the at least part of the first information in response to the display of the second information, or controlling a partial area corresponding to the transparent area in the first display differently from another area of the first display.

According to various embodiments of the present disclosure, the additionally displaying operation may include changing the at least part of the information in response to the display of the second information, or controlling a partial area corresponding to the transparent area in the first display differently from another area of the first display.

According to various embodiments of the present disclosure, the method may further include recognizing a user input relating to the transparent display area when it is determined that the first information is not seen through the transparent display area and executing a function or application of the electronic device through the display based on the user input.

According to various embodiments of the present disclosure, the additionally displaying operation may include changing at least one of the size, shape, brightness, color, saturation, sharpness, permeability, transparency, contrast, gamma, resolution, contrast ratio, viewing angle, color reproduction, color temperature, or tone linearity of at least one of the first display and the second display based on a user input relating to at least one of an opened/closed state of a cover with respect to the body of the electronic device, the first display, and the second display.

According to various embodiments of the present disclosure, the additionally displaying operation may include displaying as the second information a virtual input tool for a function or application to be executed through the first display.

According to various embodiments of the present disclosure, the additionally displaying operation may include generating an image corresponding to a user input relating to the transparent display area as the second information and displaying the image through the first display.

According to various embodiments of the present disclosure, the displaying of the image may include displaying the image and the at least part of the information or another information displayed on the first display at the same time.

According to various embodiments of the present disclosure, the displaying of the image simultaneously may include displaying the image as a first display layer and displaying corresponding information of the at least part of the information or the other information as a second display layer.

According to various embodiments of the present disclosure, the displaying of the image includes dynamically changing at least one of the movement, form, or content for the image and displaying it.

According to various embodiments of the present disclosure, the additionally displaying operation may include displaying a visual representation corresponding to an opened/closed state of a cover with respect to the body of the electronic device through at least one of the first display and the second display.

According to various embodiments of the present disclosure, a method of an electronic device may include displaying first information through a first display functionally connected to the electronic device and when at least part of the first information is displayed partially through a transparent display area of a second display functionally connected to the electronic device to change a position for the first display, automatically changing a setting of at least a partial area corresponding to the transparent display area in the first display.

According to various embodiments of the present disclosure, the changing operation may include changing at least one of the luminosity, saturation, contrast, luminance, and brightness of the at least partial area.

According to various embodiments of the present disclosure, an electronic device includes a first display formed on at least a portion of the body of the electronic device and a second display formed on at least a portion of the top surface of a cover functionally connected to the body and including a transparent display area. A displaying method of the electronic device includes obtaining second information relating to first information transmitted through the transparent display area and seen by using a sensor functionally connected to the electronic device and displaying the second information through the transparent display area.

According to various embodiments of the present disclosure, the obtaining of the second information includes obtaining context information relating to a user of the electronic device by using the sensor and generating the second information based on the context information.

According to various embodiments of the present disclosure, the displaying of the second information may include obtaining gaze or face recognition information of the user of the electronic device by using another sensor functionally connected to the electronic device and adjusting a display position of the second information based on the gaze or face recognition information.

According to various embodiments of the present disclosure, the second information may include an augmented reality content relating to the first information.

Figure 18:
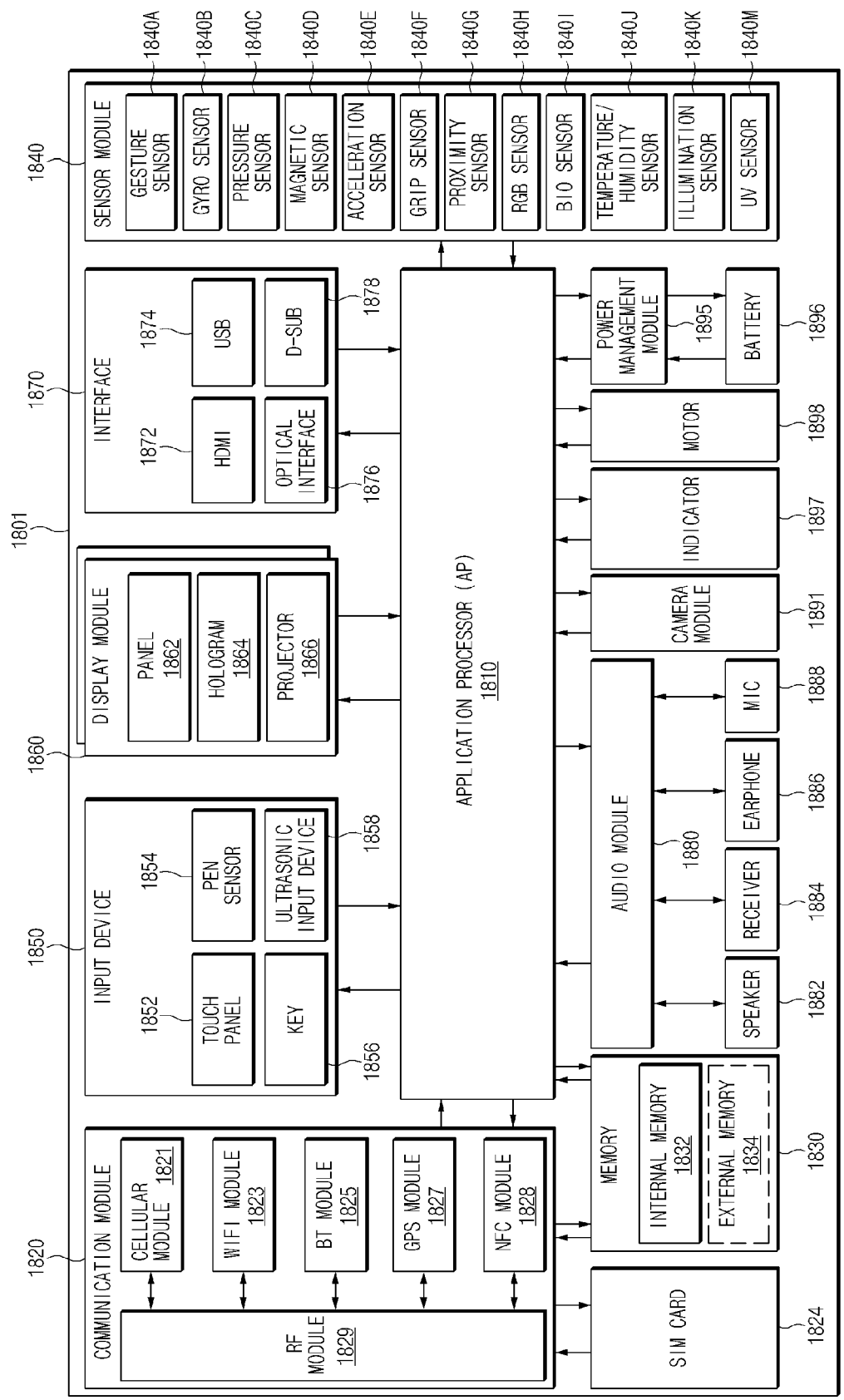
FIG. 18 is a block diagram illustrating an electronic device according to various embodiments of the present disclosure.

FIG. 18 is a block diagram illustrating an electronic device according to various embodiments of the present disclosure. The electronic device 1801, for example, may configure all or part of the above-mentioned electronic device 101 shown in FIG. 1.

Referring to FIG. 18, an electronic device 1801 includes at least one AP 1810, a communication module 1820, a subscriber identification module (SIM) card 1824, a memory 1830, a sensor module 1840, an input device 1850, a display 1860, an interface 1870, an audio module 1880, a camera module 1891, a power management module 1895, a battery 1896, an indicator 1897, and a motor 1898.

The AP 1810 may control a plurality of hardware or software components connected to the AP 1810 and also may perform various data processing and operations with multimedia data by executing an operating system or an application program. The AP 1810 may be implemented with a system on chip (SoC), for example. According to an embodiment of the present disclosure, the processor 1810 may further include a graphic processing unit (GPU) (not shown).

The communication module 1820 (for example, the communication interface 160) may perform data transmission through a communication between other electronic devices (for example, the electronic device 104 or the server 106) connected to the electronic device 1801 (for example, the electronic devices 101) via a network. According to an embodiment of the present disclosure, the communication module 1820 may include a cellular module 1821, a WiFi module 1823, a BT module 1825, a GPS module 1827, an NFC module 1828, and a radio frequency (RF) module 1829.

The cellular module 1821 may provide voice calls, video calls, text services, or interne services through a communication network (for example, LTE, LTE-A, CDMA, WCDMA, UMTS, WiBro, or GSM). The cellular module 1821 may perform a distinction and authentication operation on an electronic device in a communication network by using a SIM (for example, the SIM card 1824), for example. According to an embodiment of the present disclosure, the cellular module 1821 may perform at least part of a function that the AP 1810 provides. For example, the cellular module 1821 may perform at least part of a multimedia control function.

According to an embodiment of the present disclosure, the cellular module 1821 may further include a communication processor (CP). Additionally, the cellular module 1821 may be implemented with SoC, for example. As shown in FIG. 18, components, such as the cellular module 1821 (for example, a CP), the memory 1830, or the power management module 1895 are separated from the AP 1810, but according to an embodiment of the present disclosure, the AP 1810 may be implemented including some of the above-mentioned components (for example, the cellular module 1821).

According to an embodiment of the present disclosure, the AP 1810 or the cellular module 1821 (for example, a CP) may load instructions or data, which are received from a nonvolatile memory or at least one of other components connected thereto, into a volatile memory and then may process them. Furthermore, the AP 1810 or the cellular module 1821 may store data received from or generated by at least one of other components in a nonvolatile memory.

Each of the WiFi module 1823, the BT module 1825, the GPS module 1827, and the NFC module 1828 may include a processor for processing data transmitted/received through a corresponding module. Although the cellular module 1821, the WiFi module 1823, the BT module 1825, the GPS module 1827, and the NFC module 1828 are shown as separate blocks in FIG. 18, according to an embodiment of the present disclosure, some (for example, at least two) of the cellular module 1821, the WiFi module 1823, the BT module 1825, the GPS module 1827, and the NFC module 1828 may be included in one integrated chip (IC) or an IC package. For example, at least some (for example, a CP corresponding to the cellular module 1821 and a WiFi processor corresponding to the WiFi module 1823) of the cellular module 1825, the WiFi module 1827, the BT module 1828, the GPS module 1821, and the NFC module 1823 may be implemented with one SoC.

The RF module 1829 may be responsible for data transmission, for example, the transmission of an RF signal. Although not shown in the drawings, the RF module 1829 may include a transceiver, a power amp module (PAM), a frequency filter, or a low noise amplifier (LNA). Additionally, the RF module 1829 may further include components for transmitting/receiving electromagnetic waves on a free space in a wireless communication, for example, conductors or conducting wires. Although the cellular module 1821, the WiFi module 1823, the BT module 1825, the GPS module 1827, and the NFC module 1828 share one RF module 1829 shown in FIG. 18, according to an embodiment of the present disclosure, at least one of the cellular module 1821, the WiFi module 1823, the BT module 1825, the GPS module 1827, and the NFC module 1828 may perform the transmission of an RF signal through an additional RF module.

The SIM card 1824 may be a card including a SIM and may be inserted into a slot formed at a specific position of an electronic device. The SIM card 1824 may include unique identification information (for example, an integrated circuit card identifier (ICCID)) or subscriber information (for example, an international mobile subscriber identity (IMSI)).

The memory 1830 (for example, the memory 130) may include an internal memory 1832 or an external memory 1834. The internal memory 1832 may include at least one of a volatile memory (for example, dynamic Random Access Memory (DRAM), static RAM (SRAM), synchronous dynamic RAM (SDRAM)) and a nonvolatile memory (for example, one time programmable Read-Only Memory (OTPROM), programmable ROM (PROM), erasable and programmable ROM (EPROM), electrically erasable and programmable ROM (EEPROM), mask ROM, flash ROM, NAND flash memory, and NOR flash memory).

According to an embodiment of the present disclosure, the internal memory 1832 may be a Solid State Drive (SSD). The external memory 1834 may further include flash drive, for example, compact flash (CF), secure digital (SD), micro secure digital (Micro-SD), mini secure digital (Mini-SD), extreme digital (xD), or memory stick. The external memory 1834 may be functionally connected to the electronic device 1801 through various interfaces. According to an embodiment of the present disclosure, the electronic device 1801 may further include a storage device (or a storage medium), such as a hard drive.

The sensor module 1840 measures physical quantities or detects an operating state of the electronic device 1801, thereby converting the measured or detected information into electrical signals. The sensor module 1840 may include at least one of a gesture sensor 1840A, a gyro sensor 1840B, a pressure sensor 1840C, a magnetic sensor 1840D, an acceleration sensor 1840E, a grip sensor 1840F, a proximity sensor 1840G, a color sensor 1840H (for example, a red, green, blue (RGB) sensor), a bio sensor 1840I, a temperature/humidity sensor 1840J, an illumination sensor 1840K, and an ultra violet (UV) sensor 1840M. Additionally/alternately, the sensor module 1840 may include an E-nose sensor (not shown), an electromyography (EMG) sensor, an electroencephalogram (EEG) sensor (not shown), an electrocardiogram (ECG) sensor (not shown), an infra-red (IR) sensor (not shown), an iris sensor (not shown), or a fingerprint sensor (not shown). The sensor module 1840 may further include a control circuit for controlling at least one sensor therein.

The input module 1850 may include a touch panel 1852, a (digital) pen sensor 1854, a key 1856, or an ultrasonic input device 1858. The touch panel 1852 may recognize a touch input through at least one of capacitive, resistive, infrared, or ultrasonic methods, for example. Additionally, the touch panel 1852 may further include a control circuit. In the case of the capacitive method, both direct touch and proximity recognition are possible. The touch panel 1852 may further include a tactile layer. In this case, the touch panel 1852 may provide a tactile response to a user.

The (digital) pen sensor 1854 may be implemented through a method similar or identical to that of receiving a user's touch input or an additional sheet for recognition. The key 1856 may include a physical button, a touch key, an optical key, or a keypad, for example. The ultrasonic input device 1858, as a device detecting data by detecting sound waves through a MIC (for example, a MIC 1888) in the electronic device 1801, may provide wireless recognition through an input tool generating ultrasonic signals. According to an embodiment of the present disclosure, the electronic device 1801 may receive a user input from an external device (for example, a computer or a server) connected to the electronic device 1801 through the communication module 1820.

The display 1860 (for example, the display 150) may include a panel 1862, a hologram device 1864, or a projector 1866. The panel 1862, for example, may include a liquid-crystal display (LCD) or an active-matrix organic light-emitting diode (AM-OLED). The panel 1862 may be implemented to be flexible, transparent, or wearable, for example. The panel 1862 and the touch panel 1852 may be configured with one module. The hologram 1864 may show three-dimensional images in the air by using the interference of light. The projector 1866 may display an image by projecting light on a screen. The screen, for example, may be placed inside or outside the electronic device 1801. According to an embodiment of the present disclosure, the display 1860 may further include a control circuit for controlling the panel 1862, the hologram device 1864, or the projector 1866.

The interface 1870 may include a HDMI 1872, a USB 1874, an optical interface 1876, or a D-subminiature (sub) 1878, for example. The interface 1870 may be included in the communication interface 160 shown in FIG. 1, for example. Additionally/alternately, the interface 1870 may include a mobile high-definition link (MHL) interface, a SD card/multi-media card (MMC) interface, or an infrared data association (IrDA) standard interface.

The audio module 1880 may convert sound and electrical signals in both directions. At least some components of the audio module 1880 may be included in the input/output interface 140 shown in FIG. 1, for example. The audio module 1880 may process sound information inputted/outputted through a speaker 1882, a receiver 1884, an earphone 1886, or the MIC 1888.

The camera module 1891, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 1895 may manage the power of the electronic device 1801. Although not shown in the drawings, the power management module 1895 may include a power management integrated circuit (PMIC), a charger IC, or a battery or fuel gauge, for example.

The PMIC may be built in an IC or SoC semiconductor, for example. A charging method may be classified into a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit, such as a coil loop, a resonant circuit, a rectifier circuit, and the like, may be added.

The battery gauge may measure the remaining amount of the battery 1896, or a voltage, current, or temperature of the battery 396 during charging. The battery 1896 may store or generate electricity and may supply power to the electronic device 1801 by using the stored or generated electricity. The battery 1896, for example, may include a rechargeable battery or a solar battery.

The indicator 1897 may display a specific state of the electronic device 1801 or part thereof (for example, the AP 1810), for example, a booting state, a message state, or a charging state. The motor 1898 may convert electrical signals into mechanical vibration. Although not shown in the drawings, the electronic device 1801 may include a processing device (for example, a GPU) for mobile TV support. A processing device for mobile TV support may process media data according to the standards, such as digital multimedia broadcasting (DMB), digital video broadcasting (DVB), media flow, and the like.

According to various embodiments of the present disclosure, an electronic device and a method may effectively deliver information that each of a plurality of displays is to provide or additional information to a user by using the transparent display area. Additionally, various user interfaces using the fact that as the position of at least one of a plurality of displays moves, the plurality of displays are positioned continuously without partially overlapping or overlapping each other may improve user convenience.

Each of the above-mentioned components of the electronic device according to various embodiments of the present disclosure may be configured with at least one component and the name of a corresponding component may vary according to the kind of an electronic device. An electronic device according to an embodiment of the present disclosure may be configured including at least one of the above-mentioned components or additional other components. Additionally, some components of an electronic device according to an embodiment of the present disclosure are combined and configured as one entity, so that functions of previous corresponding components are performed identically.

The term "module" used in this disclosure, for example, may mean a unit including a combination of at least one of hardware, software, and firmware. The term "module" and the term "unit", "logic", "logical block", "component", or "circuit" may be interchangeably used. "module" may be a minimum unit or part of an integrally configured component. "module" may be a minimum unit performing at least one function or part thereof "module" may be implemented mechanically or electronically. For example, "module" used in this disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 210) executes an instruction, it may perform a function corresponding to the instruction. The computer-readable storage media may include the memory 120, for example. At least part of a programming module may be implemented (for example, executed) by processor 110, for example. At least part of a programming module may include a module, a program, a routine, sets of instructions, or a process to perform at least one function, for example.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module of a programming module according to various embodiments may include at least one of the above-mentioned components or additional other components. Alternatively, some programming modules may be omitted. Operations performed by a programming module or other components according to various embodiments of the present disclosure may be executed through a sequential, parallel, repetitive or heuristic method. Additionally, some operations may be executed in a different order or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for controlling a plurality of displays, the electronic device comprising:
    a first display formed on at least a portion of a body of the electronic device;
    a second display formed on at least a portion of a cover functionally connected to the body and including a transparent display area; and
    at least one processor configured to:
        determine at least one object visible through the transparent display area, and
        display information on the transparent display area based on the determined at least one object,
    wherein the at least one processor is further configured to adjust at least one of a brightness, saturation, sharpness, permeability, transparency, contrast, gamma, resolution, contrast ratio, color reproduction, color temperature, or output direction of the display information dynamically in response to an angle between the first display and the second display.

2. The electronic device of claim 1, wherein at least one of the first display and the second display is configured to detect at least one of a touch input and a proximity input.

3. The electronic device of claim 1, further comprising a third display formed at another portion of the cover.

4. The electronic device of claim 3, wherein at least one of the first display, the second display, and the third display comprises at least one transparent display area or at least one mirror display area.

5. The electronic device of claim 1, further comprising a third display formed on at least one of at least a portion of a back of the body, at least a portion of a bottom surface of the cover, at least a portion covering at least a portion of a side of the body in a top surface of the cover, and a portion covering at least a portion of a side of the body in the bottom surface of the cover.

6. The electronic device of claim 5, wherein the third display comprises at least one of a transparent display area and a mirror display area.

7. The electronic device of claim 5, further comprising a fourth display formed at another portion of at least one of the back of the body and a back of the cover.

8. The electronic device of claim 1, further comprising at least one of an audio output module and an energy harvester formed on at least one of another portion of a top surface of the cover, at least a portion of a bottom surface of the cover, and at least a portion of a back of the body.

9. The electronic device of claim 8, wherein the audio output module comprises a thin film speaker.

10. The electronic device of claim 8, wherein the energy harvester is configured to generate power based on at least one of light, temperature, vibration, pressure, and sun.

11. The electronic device of claim 1, further comprising an input module configured to recognize an input relating to at least a portion of the transparent display area.

12. The electronic device of claim 11, wherein the input module is configured to recognize at least one of a first input relating to a top surface of the cover and a second input relating to a bottom surface of the cover as the input.

13. The electronic device of claim 11, wherein the input module comprises at least one of a touch sensor and a pressure sensor.

14. The electronic device of claim 1, further comprising a display control module configured to control at least one of the first display and the second display,
    wherein, when at least part of information displayed on the first display is displayed through the transparent display area, the display control module is configured to display another information different from the at least part of the information through the transparent display area in addition to or instead of the at least part of the information.

15. The electronic device of claim 14, wherein the display control module is further configured to determine the other information based on an opened/closed state of at least one of the cover front and the cover back with respect to the body, information to be displayed on the first display, at least one of a function and application to be executed through the first display, information to be displayed on the second display, at least one of a function and application to be executed through the second display, and a user input.

16. The electronic device of claim 14, wherein the display control module is further configured to determine the other information based on power state information of the electronic device, communication state information between the electronic device and an external device, external environment information of the electronic device, and situation recognition information relating a user of the electronic device.

17. The electronic device of claim 1, wherein the cover is detachably coupled to the body.

18. The electronic device of claim 1, wherein the cover is connected to the body through at least one of holder, hinge, flip, and slide structures that are opened/closed with respect to the body.

19. The electronic device of claim 1, further comprising a solar cell integrally formed with the second display.

* * * * *